July 30, 1963 W. BORNEMANN ETAL 3,099,199

APPARATUS FOR REPRODUCING AND RECORDING INFORMATION

Filed Feb. 9, 1959 55 Sheets-Sheet 1

WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 2

WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

July 30, 1963 W. BORNEMANN ETAL 3,099,199

APPARATUS FOR REPRODUCING AND RECORDING INFORMATION

Filed Feb. 9, 1959 55 Sheets-Sheet 3

WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 5

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

July 30, 1963 W. BORNEMANN ETAL 3,099,199

APPARATUS FOR REPRODUCING AND RECORDING INFORMATION

Filed Feb. 9, 1959 55 Sheets-Sheet 6

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 7

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

July 30, 1963 W. BORNEMANN ETAL 3,099,199

APPARATUS FOR REPRODUCING AND RECORDING INFORMATION

Filed Feb. 9, 1959 55 Sheets-Sheet 9

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 10

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 11

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 12

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Sudach
ATTORNEY & AGENT

APPARATUS FOR REPRODUCING AND RECORDING INFORMATION

Filed Feb. 9, 1959 55 Sheets-Sheet 13

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Liebach
ATTORNEY & AGENT July 30, 1963 W. BORNEMANN ETAL 3,099,199

APPARATUS FOR REPRODUCING AND RECORDING INFORMATION

Filed Feb. 9, 1959 55 Sheets-Sheet 14

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 15

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 16

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY [signature]
[signature]
ATTORNEY & AGENT

APPARATUS FOR REPRODUCING AND RECORDING INFORMATION

Filed Feb. 9, 1959

55 Sheets-Sheet 18

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

WILLIAM BORNEMANN
ROBERT H. BECHTOLD
PETER D. J. FREEMAN
NORMAN F LORETZ
GEORGE O. NEUMAN
HARLOW D. PHILIPS
INVENTORS

BY R. Frank Smith
Lloyd F. Liebach
ATTORNEY & AGENT

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 21

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

CORE OUTPUT DRIVER

FILTER

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 23

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 24

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 26

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 29

FILM MONITOR

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

Fig. 51 INITIAL CLEAR
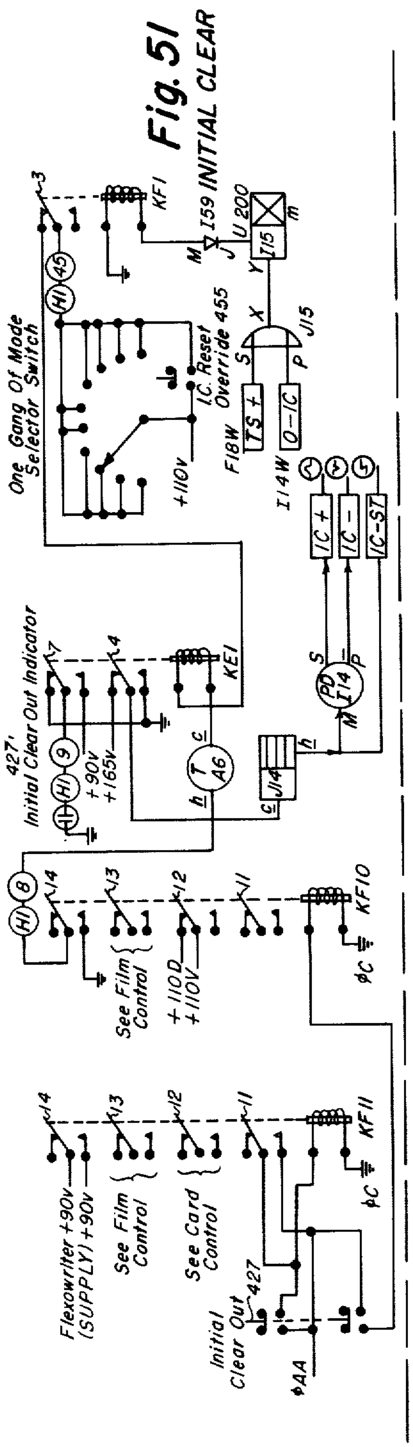
Fig. 42 CARD CYCLE CONTROL
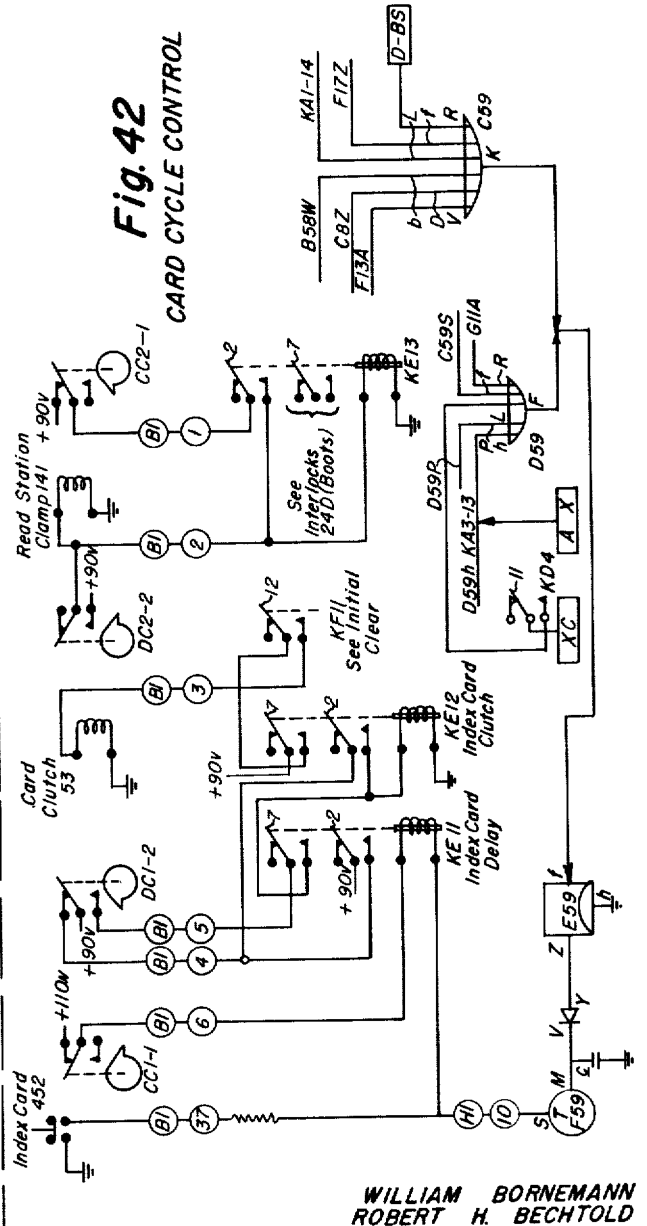
WILLIAM BORNEMANN
ROBERT H. BECHTOLD
PETER D.J. FREEMAN
NORMAN F. LORETZ
GEORGE O. NEUMAN
HARLOW D. PHILIPS
INVENTORS
BY R. Frank Smith
Lloyd L. Seebach
ATTORNEY & AGENT July 30, 1963 W. BORNEMANN ET AL 3,099,199

APPARATUS FOR REPRODUCING AND RECORDING INFORMATION

Filed Feb. 9, 1959 55 Sheets-Sheet 31

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION
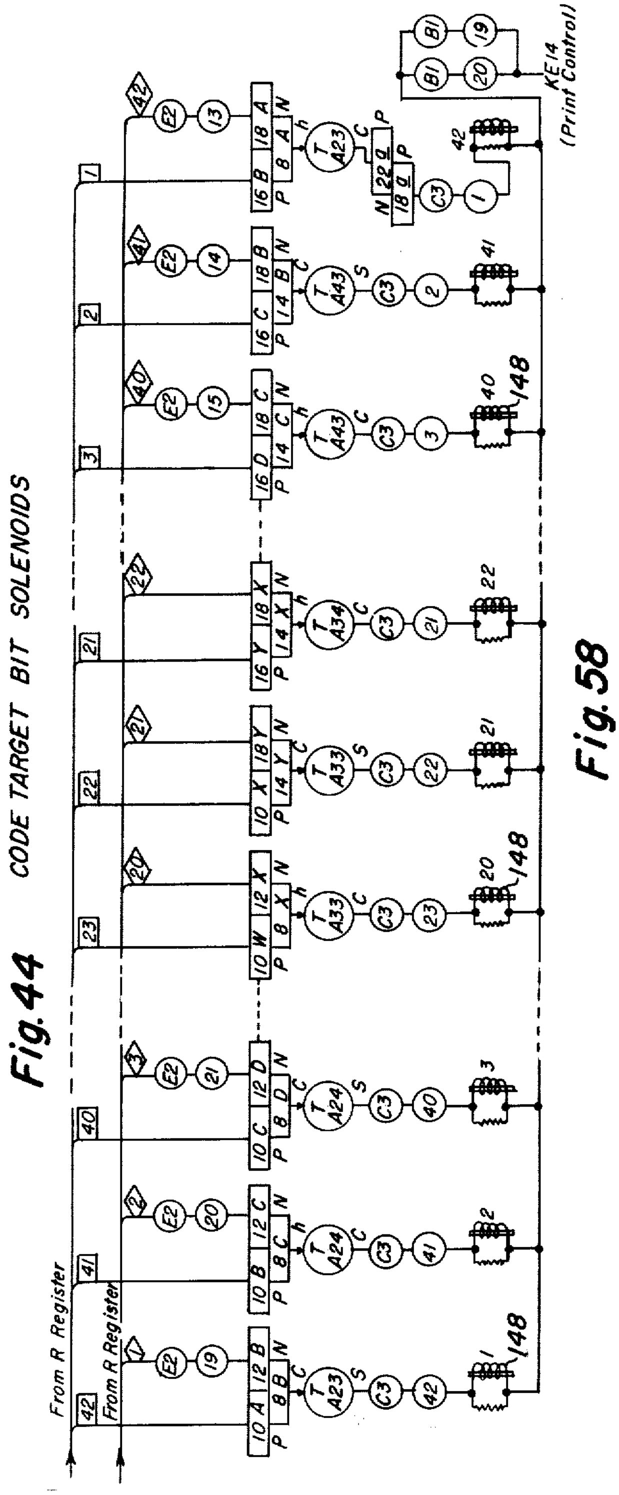
Fig. 44 CODE TARGET BIT SOLENOIDS
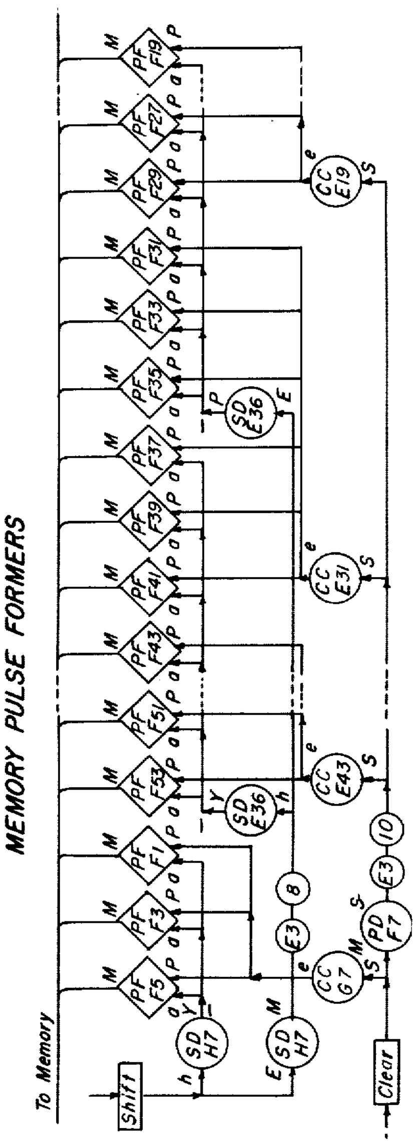
Fig. 58 MEMORY PULSE FORMERS
WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 33

EDGE MARK CONTROL

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 34

Fig. 46 FILM CYCLE CONTROL, Fig. 48 PRINT CONTROL

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd J. Siebach
ATTORNEY & AGENT

APPARATUS FOR REPRODUCING AND RECORDING INFORMATION

Filed Feb. 9, 1959 55 Sheets-Sheet 35

FILM CYCLE DETECTOR "L" REGISTER

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

R. Frank Smith

BY Lloyd J. Seebach

ATTORNEY & AGENT

July 30, 1963 W. BORNEMANN ETAL 3,099,199
APPARATUS FOR REPRODUCING AND RECORDING INFORMATION
Filed Feb. 9, 1959 55 Sheets-Sheet 36
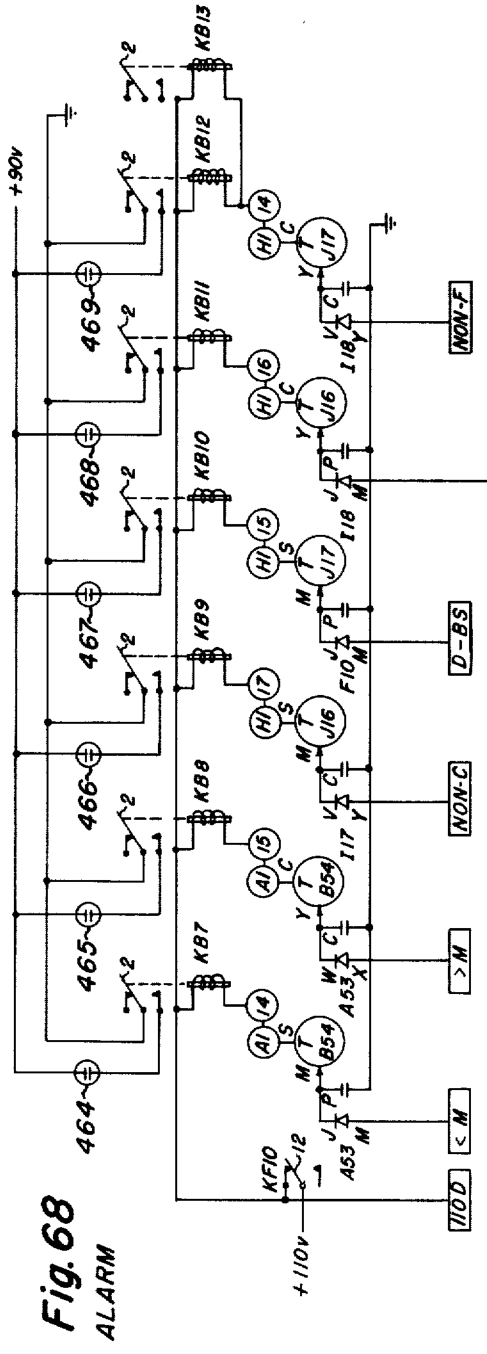
Fig.68 ALARM
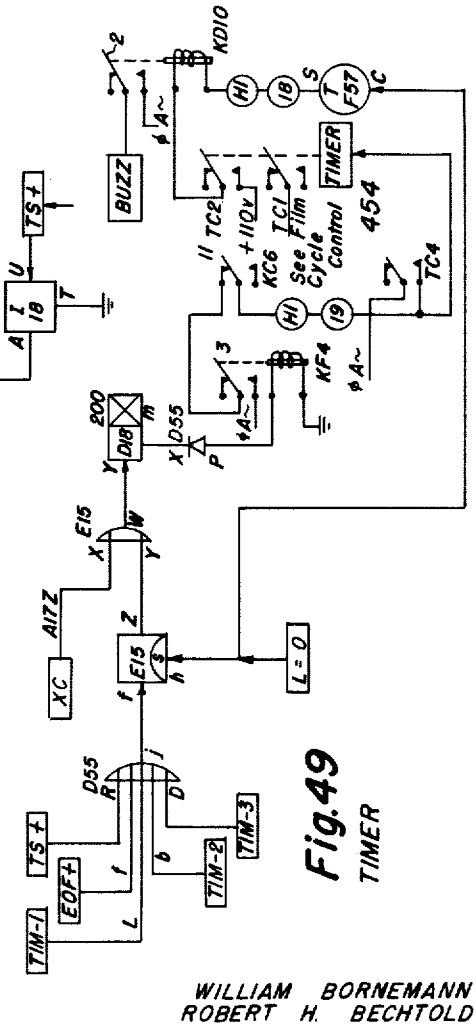
Fig.49 TIMER
WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT July 30, 1963 W. BORNEMANN ETAL 3,099,199

APPARATUS FOR REPRODUCING AND RECORDING INFORMATION

Filed Feb. 9, 1959 55 Sheets-Sheet 37

INTERLOCKS

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959

Fig. 53 MODE SELECTOR SWITCH

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Auerbach
ATTORNEY & AGENT

APPARATUS FOR REPRODUCING AND RECORDING INFORMATION

Filed Feb. 9, 1959 55 Sheets-Sheet 39

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION
Filed Feb. 9, 1959 55 Sheets-Sheet 40
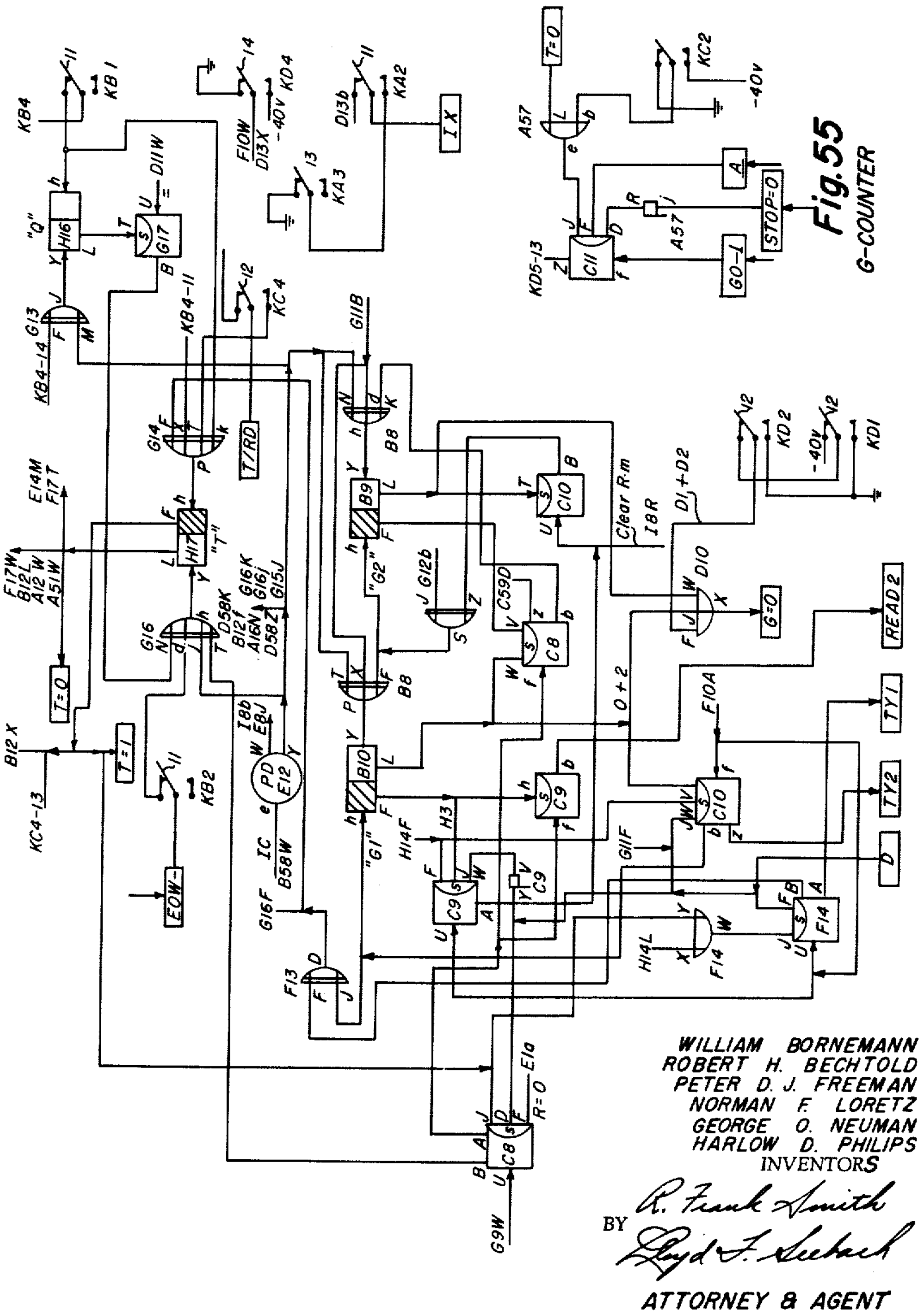
Fig. 55 G-COUNTER
WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT July 30, 1963 W. BORNEMANN ETAL 3,099,199
APPARATUS FOR REPRODUCING AND RECORDING INFORMATION
Filed Feb. 9, 1959 55 Sheets-Sheet 41
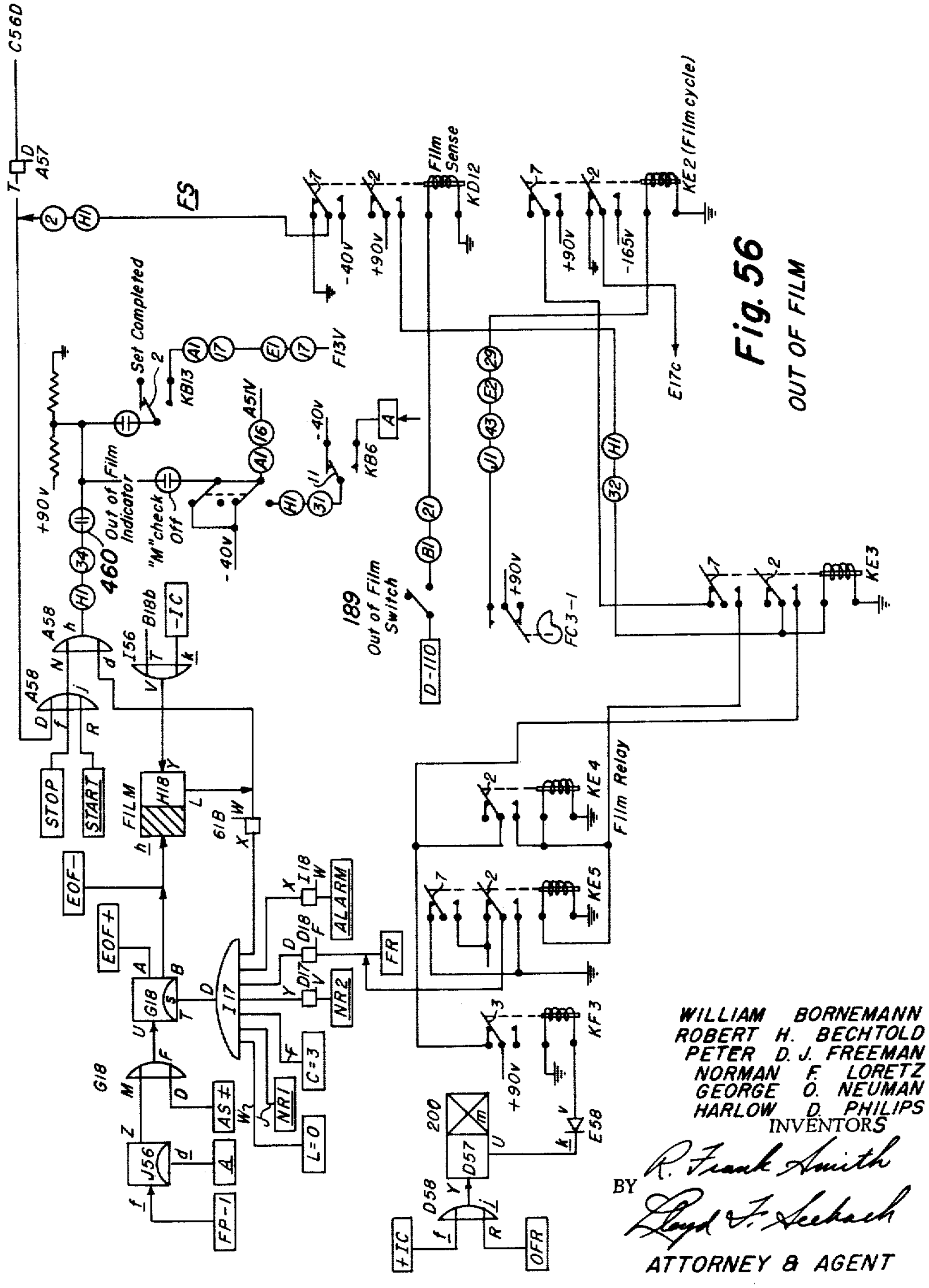
Fig. 56 OUT OF FILM
WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 42

MEMORY & R-REGISTOR

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT

MEMORY & R-REGISTOR

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY [signature] [signature]

ATTORNEY & AGENT

APPARATUS FOR REPRODUCING AND RECORDING INFORMATION
Filed Feb. 9, 1959 55 Sheets-Sheet 44
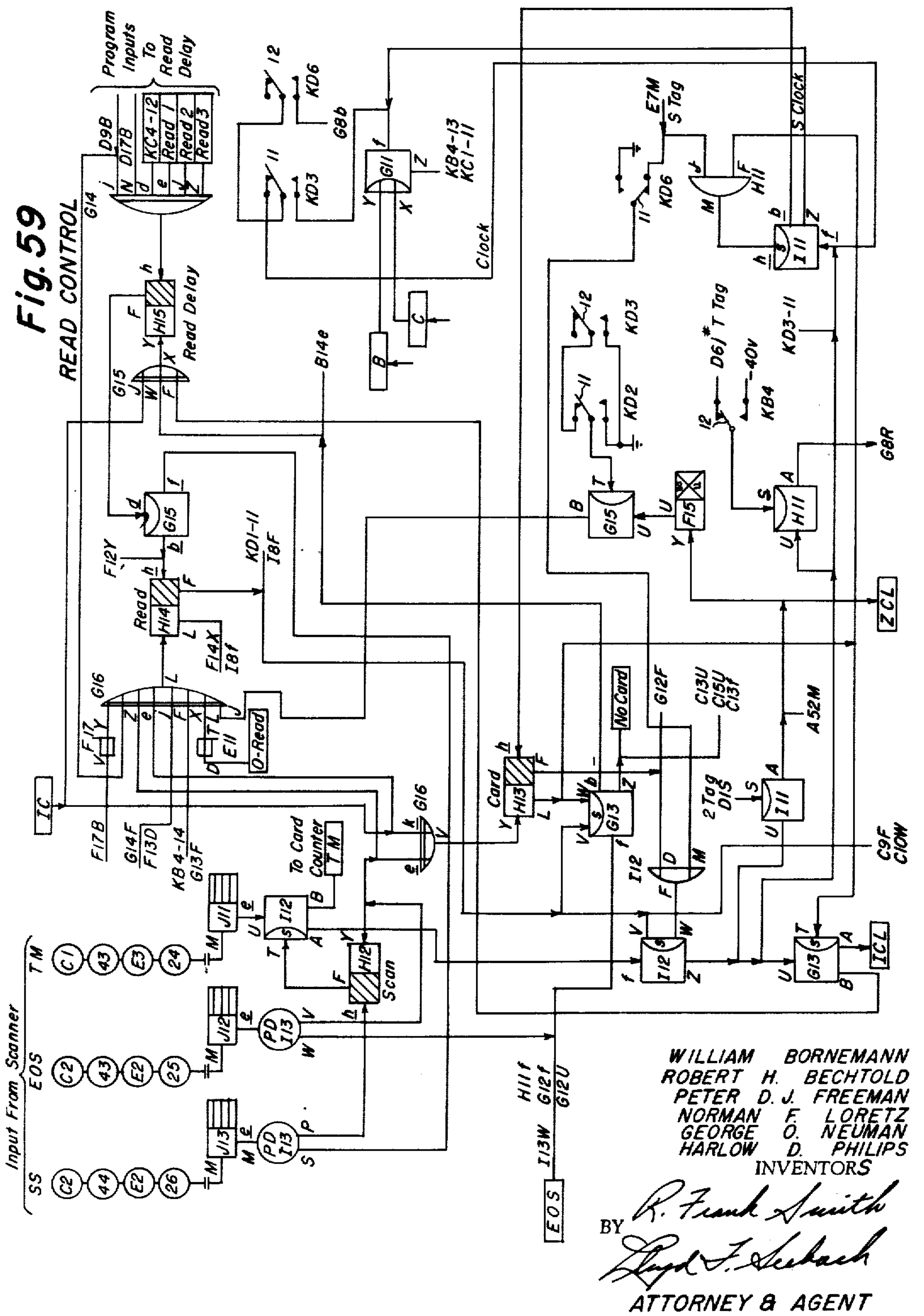
Fig. 59 READ CONTROL
WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT APPARATUS FOR REPRODUCING AND RECORDING INFORMATION
Filed Feb. 9, 1959 55 Sheets-Sheet 45
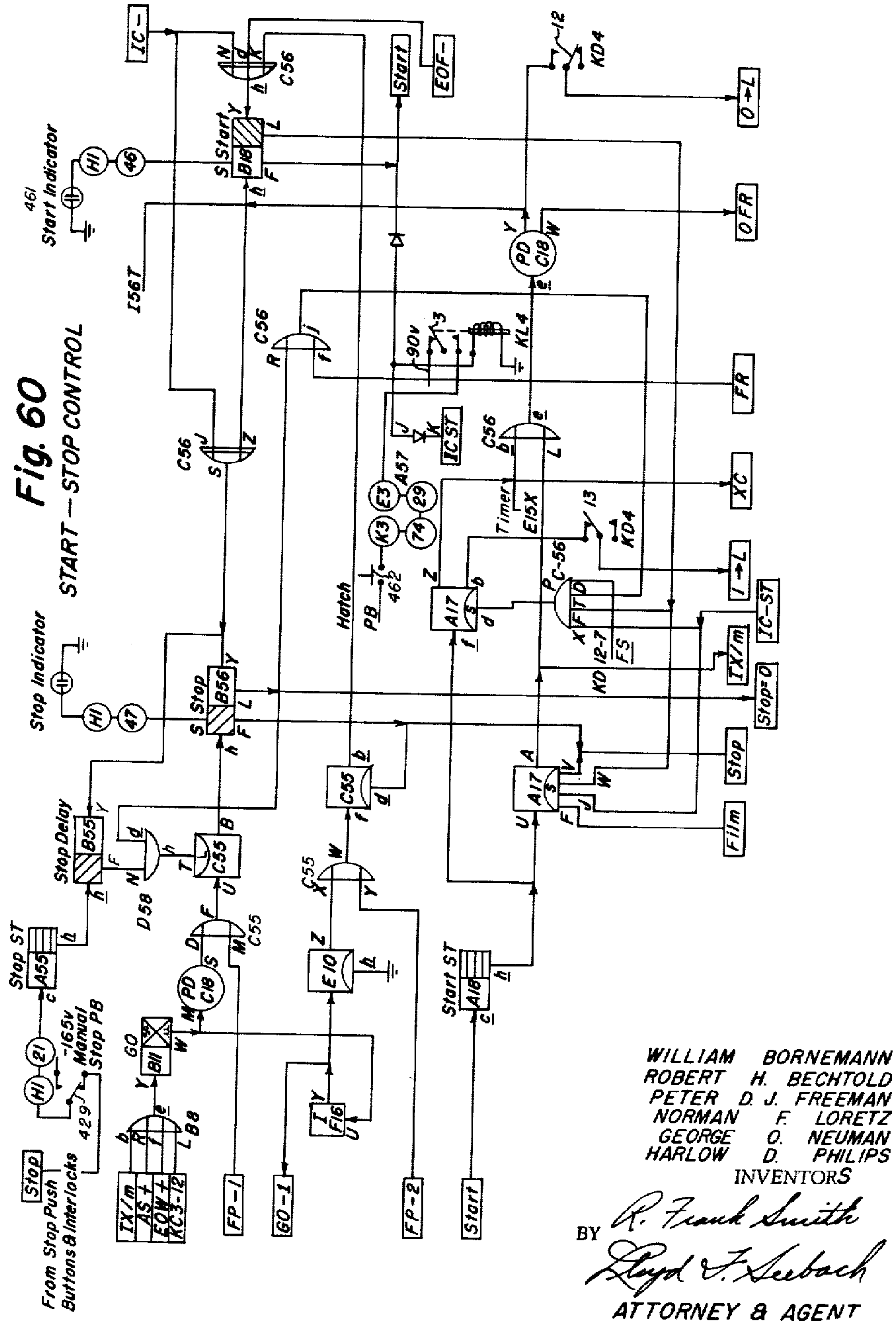
Fig. 60 START—STOP CONTROL
WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT

DN (S) COMPARE

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS
BY R. Frank Smith
Lloyd F. Seebach
ATTORNEY & AGENT

S COMPARE CONTROL

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

MEMORY CONTROL

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 49

N-COUNTER

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd T. Seebach
ATTORNEY & AGENT

APPARATUS FOR REPRODUCING AND RECORDING INFORMATION

Filed Feb. 9, 1959 55 Sheets-Sheet 50

Fig. 65 TAG SELECTOR

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

July 30, 1963 W. BORNEMANN ETAL 3,099,199

APPARATUS FOR REPRODUCING AND RECORDING INFORMATION

Filed Feb. 9, 1959 55 Sheets-Sheet 51

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959 55 Sheets-Sheet 53

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd F. Seebach
ATTORNEY & AGENT

APPARATUS FOR REPRODUCING AND RECORDING INFORMATION

Filed Feb. 9, 1959

WILLIAM BORNEMANN
ROBERT H. BECHTOLD
PETER D. J. FREEMAN
NORMAN F. LORETZ
GEORGE O. NEUMAN
HARLOW D. PHILIPS
INVENTORS

BY R. Frank Smith
Lloyd J. Seebach
ATTORNEY & AGENT

United States Patent Office 3,099,199

Patented July 30, 1963

3,099,199
APPARATUS FOR REPRODUCING AND RECORDING INFORMATION

William Bornemann, Robert H. Bechtold, and Harlow D. Philips, Rochester, N.Y., and Peter D. J. Freeman, Manhattan Beach, Norman F. Loretz, Pacific Palisades, and George O. Neuman, Sherman Oaks, Calif., assignors, by direct and mesne assignments, to Eastman Kodak Company, Rochester, N.Y., a corporation of New Jersey Filed Feb. 9, 1959, Ser. No. 792,177
53 Claims. (Cl. 95—73)

The present invention relates to photographic apparatus for printing or duplicating photographic elements having a code area, and an image area and more particularly to apparatus by which exact duplicates of each element can be made, by which duplicates can be made having the same content as the photographic element with the addition of a file word obtained from the element, by which duplicates can be made having the same content as the photographic element with the addition of a file word obtained from another source and by which reading and printing out of certain coded data from a photographic element can be accomplished.

In photographic apparatus for duplicating or making prints from either a positive or a negative transparency by means of contact printing, the films or film and paper are placed one over the other in intimate contact and in relation with respect to a light source for exposure during a predetermined interval. Usually the film and paper are of such size that they can be readily handled and manipulated during the steps of printing and processing by the operator or individual. In instances where contact prints are made by automatic handling of the negative, paper and exposure, the negatives are fed into position with respect to a continuous roll of paper and exact copies of the negatives are obtained without any alterations or additions whatsoever. The invention, however, is concerned with the making of prints from relatively small pieces of film which are approximately five-eighths of an inch wide and one and one-quarter inches long. In addition, it is necessary to add information to the print or duplicate, which information is obtained either from the photographic element being duplicated or from an external source. Since the elements are of such small size, manual handling of the elements is prohibited and, hence, the operation must be one which is completely automatic.

The present invention utilizes small pieces of film which are loaded into a receiving or supply station and removed therefrom individually and in order and positioned on a carrier for movement into respective stations for reading of the code and printing. In the reading station the code area of each element is scanned and the information to be added to the duplicate is derived therefrom. After being scanned, the element is moved into the printing station where the added information is exposed on the film and a contact print is then made of the photographic element in the printing station. The element is then moved into relation with respect to a receiving station and is removed from the carrier and inserted in the receiving station.

More specifically, the apparatus about to be described is capable of performing ten different modes of operation which can be selected by the operator and which are performed automatically by the apparatus. In Mode A the apparatus makes one duplicate of every card in the supply station and which are fed intermittently and individually to the printing station. In Mode B1 the programmer selects and stores the numeric and alphabetic tag code words appearing on the leading element of a set of elements to be duplicated. The duplicator makes one duplicate of each card of the set for each of the file words associated with that set. Each duplicate also has the appropriate file word added to its file or sort field and the number of numeric tag code words appearing on any one element is limited to thirty. Mode B2 is essentially the same as that of Mode B1 with the additional feature that a Flexowriter types out the document number once, or some other coded file word, for each set of elements as it is being duplicated. Mode B3 is the same as Mode B1 with the additional feature that the Flexowriter types all file words associated with each set of elements once for each set as it is being duplicated. For Mode C1 the programmer stores one group of file words from a prepunched Flexowriter tape and makes one duplicate of each element in the supply magazine for each stored file word, one file word being added to the sort field of each duplicate. In mode C2 the duplicator makes duplicates of each element of a selected set for each of the file words associated with that set. The groups of file words, each preceded by its associated document number (DN), are supplied from a Flexowriter tape. The groups of file words on the tape must be in the same order as the selected sets of elements in the supply magazine. These sets are selected by DN and not all sets of elements in the supply magazine need be selected, the sets that are not selected being by-passed into the receiving magazine. Mode C3 is substantially the same as Mode C2 except that all sets in the supply magazine must be selected and the presence of a non-selected set will cause a DN non-compare (program break). Mode D1 differs from the modes previously described in that no duplicates are made but all code words on every element provide an output whereby the Flexowriter types out the code words. Mode D2 is similar to Mode D1 except that the Flexowriter types out only the code words appearing in the fixed field of each element. Mode D3 is also similar to Mode D1 except that only the DN numbers are typed out by the Flexowriter. For each of the above-mentioned modes of operation it is only necessary for the operator to position the elements in the supply magazine and to select the mode of operation desired. From this point on, the operation of the apparatus is fully automatic and any conditions arising within the apparatus which would tend to cause misoperation, lack of film, improper sets of elements, etc., are automatically detected and immediately initiate a program break to permit the operator to correct the unfavorable condition.

The primary object of the invention, therefore, is to provide a fully automatic duplicating apparatus in which the photographic elements are moved intermittently between a series of stations and have operations performed with respect thereto in each station to provide a duplicate the same as the original element, a duplicate with additional information added thereto or to utilize the information on each element as a source to control operation of a remote device.

Another object of the invention is to provide a fully automatic duplicating apparatus in which information can be added to a sort field of the duplicate, the information being derived from the element from which the duplicate is to be made.

Still another object of the invention is to provide a fully automatic duplicating apparatus in which the duplicate has information added thereto which has been derived from a remote source and which in all other respects corresponds to the content of the original element.

A further object of the invention is to provide a fully automatic duplicating apparatus in which the information contained on each element is read and the signals derived therefrom are utilized as input signals for operating an external device such as a recording medium which can print out the same information.

Yet another object of the invention is to provide a fully automatic duplicating apparatus in which a programmer controls all functions of the apparatus and in which various controls are utilized to provide a program break in the event of the occurrence of certain conditions within the programmer, such as failure of the means for handling and transporting the photographic elements, depletion of the film supply, etc.

These and other objects and advantages will be apparent to those skilled in the art by the detailed description which follows.

Reference is now made to the accompanying drawings in which numerals and letters designate the various parts and elements.

FIGS. 42–69 are schematic circuit diagrams showing the logic to implement the functions of the duplicator as shown in FIG. 41.

PHOTOGRAPHIC ELEMENT

Figure 4:
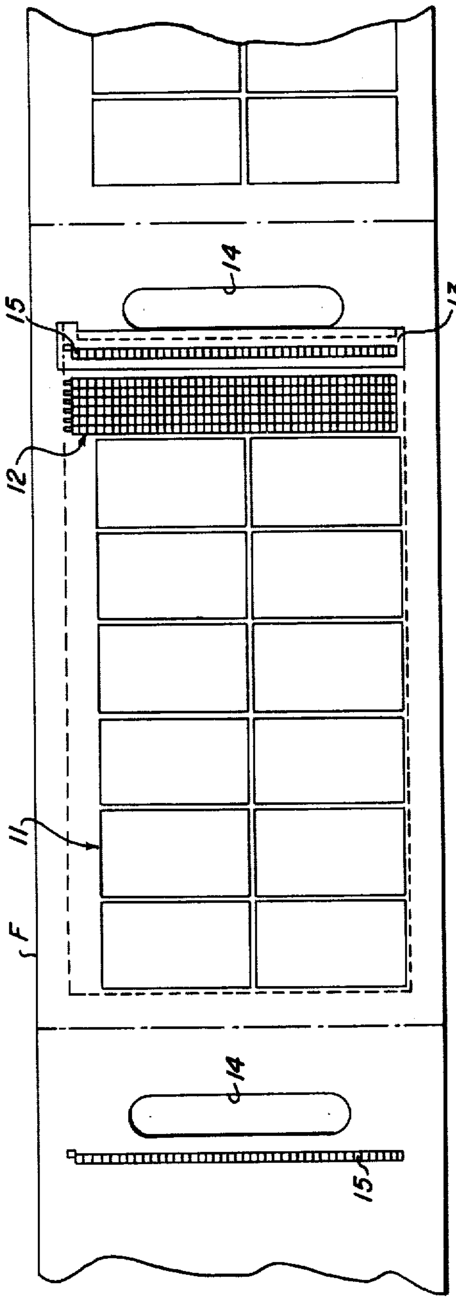
FIG. 4 is an enlarged view of a film strip showing the relation of the sortation columns in the two printing stations and the relation of the previously exposed sortation column to the sort field of the master card.
Figure 3:
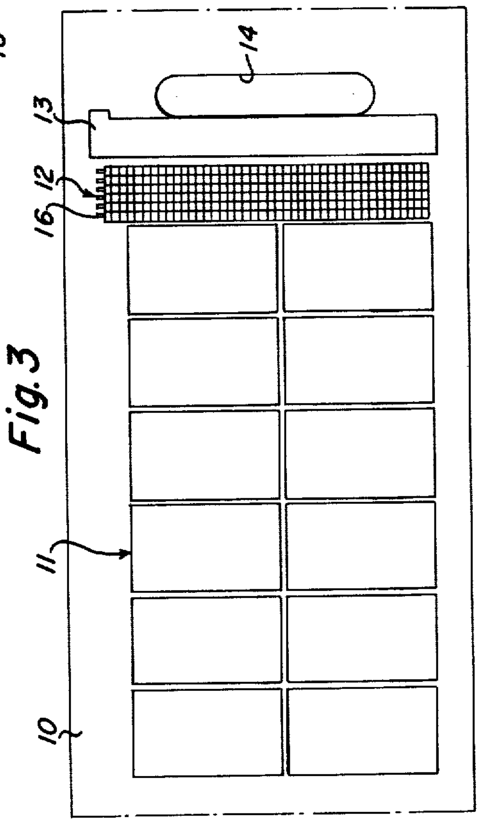
FIG. 3 is an enlarged detail view of a master element or card showing the relation of the image and code areas and the sort field.

Before proceeding with a description of the apparatus, it is believed that a detailed description of the photographic element will provide a better understanding of the operation and function of the duplicator. As shown in FIGS. 3 and 4, the photographic element or card 10 is a small piece of negative or positive film approximately five-eighths inch wide and one and one-quarter inches long. The card comprises an image area 11, a code area 12, which can be referred to as the "fixed" field in that it always contains six columns of code, a sort field 13, and a transverse slot or aperture 14. Each master element comprises at least the equivalent of six columns of code and a maximum of twelve images arranged in pairs longitudinally of the element. The image area 11 can, therefore, contain from zero to twelve images and as the number of images is reduced, the number of code columns can be increased up to sixty-eight columns including the six columns in code area 12. Area 11 is therefore referred to as the "open" field because its format is determined by the document and/or code to be entered therein. A binary-excess-three code is utilized so that six bits will comprise a character which can, at the time the master card is made, be a number, letter or symbol. A track of bits lengthwise of card 10 is referred to as a "row" and a track of bits transversely of the element is termed a "column," each column comprising a coded word. The sort field 13 contains one column of code, as shown in FIG. 4, which is derived from code area 12, or code area 11, or from an external source, and on the master element sort field 13 is void of any code and serves a purpose to be described hereinafter. This void area on the master element permits one column of code (a coded word) to be entered therein when duplicates are made. A row of bits can vary in number depending on the amount of coded information to be placed on the card. A column, however, always contains forty-two bits or the equivalent of seven characters. Adjacent each code column is a timing mark 16 which is utilized, as described hereinafter, to count the code columns, to indicate the presence of code in the column and to derive a timing signal coincident with the signals derived from any column of code for transmission to the porgrammer. In the described embodiment, a tag character is utilized and a column comprises seven characters which constitute a coded word. Also, a coded word can be any combination of letters, numbers and/or symbols depending on the system as originally set up. The six binary bits comprising a character and the same six bits in each row are designated a channel or character row. The tag channel is arranged adjacent timing marks 16 in the described embodiment and the character positions are counted away from the timing marks, the tag character being designated as the "zero character" and the character farthest from the timing mark being designated as the "sixth character." It is to be understood, of course, that the tag character can occupy any character position in the column.

The six bit binary code allows sixty-four code combinations to be used in the system about to be described. The excess three code has been selected to permit easy complementing. The field's four least significant bits are common to the numerical and alphabetical characters. The two zone bits, two most significant bits, are used to distinguish among the different assigned characters, ten for numbers and thirty for the alphabet and other symbols. Characters outside each of the excess three groups are utilized for machine control functions. To select a given character, therefore, the correct field and zone must be combined and an example of such a code structure for only the numerals and alphabet can be set up as follows:

| Zone binary bits, Nos. 1 | | | | Binary bits, Nos. 3-6 | |
|---|---|---|---|---|---|
| 00 | 01 | 10 | 11 | | |
| ϕ | & | / | . | 0011 | |
| 1 | A | J | , | 0100 | |
| 2 | B | K | S | 0101 | |
| 3 | C | L | T | 0110 | |
| 4 | D | M | U | 0111 | Field |
| 5 | E | N | V | 1000 | |
| 6 | F | O | W | 1001 | |
| 7 | G | P | X | 1010 | |
| 8 | H | Q | Y | 1011 | |
| 9 | I | R | Z | 1100 | |

An "S" tag word is called the document number DN and is the data word that is unique for a given document and such documents may consist of several cards. The "S" tag word must appear once and once only in the fixed field 12 and must precede the "Z" tag word on the card. The "S" tag character appears in the tag channel which is the zero tag position and is adjacent the timing mark 16.

The "Z" tag word is called the multiplicity code word and must appear once and only once on every card. The "Z" tag character appears in the tag channel in the zero character position adjacent the timing marks 16. The code appearing in the first tag channel designates whether the card is a single card, the first card of a multiple card group, an intermediate card of a multiple card group or the last card of a multiple card group. The second and third characters in the "Z" tag column designate the number of cards in the multiple card group. In the fifth and sixth character positions of the "Z" tag column, the number of the card within the group appears in code.

The file or sortation column 15 and its respective timing mark are missing on the master card, as shown in FIG. 3, and all subsequent generations of the master card have the full complement of code columns and timing marks. If no code is to be recorded in file column 13, at least a timing mark must be exposed with the blank column. At least six code columns will, therefore, be recorded in the fixed field and will be followed by the maximum number of document images. A maximum of sixty-four columns of code may be recorded on a card, if no images are recorded.

As shown in FIG. 4, the unexpected light-sensitive material or film F is provided with spaced apertures which provide the aperture 14 when the strip is severed into individual elements 10, after processing. FIG. 4 also shows the arrangement of the exposure of the sortation column 15 in relation to the exposed card and the sort field 13 which serves as a mask to prevent double exposure of the sortation column 15 when it is moved into the printing station. More specifically, each sortation column 15 is exposed simultaneously with the card 10 but in a different position and when it is moved into relation with card 10, the previously exposed column is covered by sort field 13. This will be evident from the description which follows.

DUPLICATOR UNIT

Figure 1:
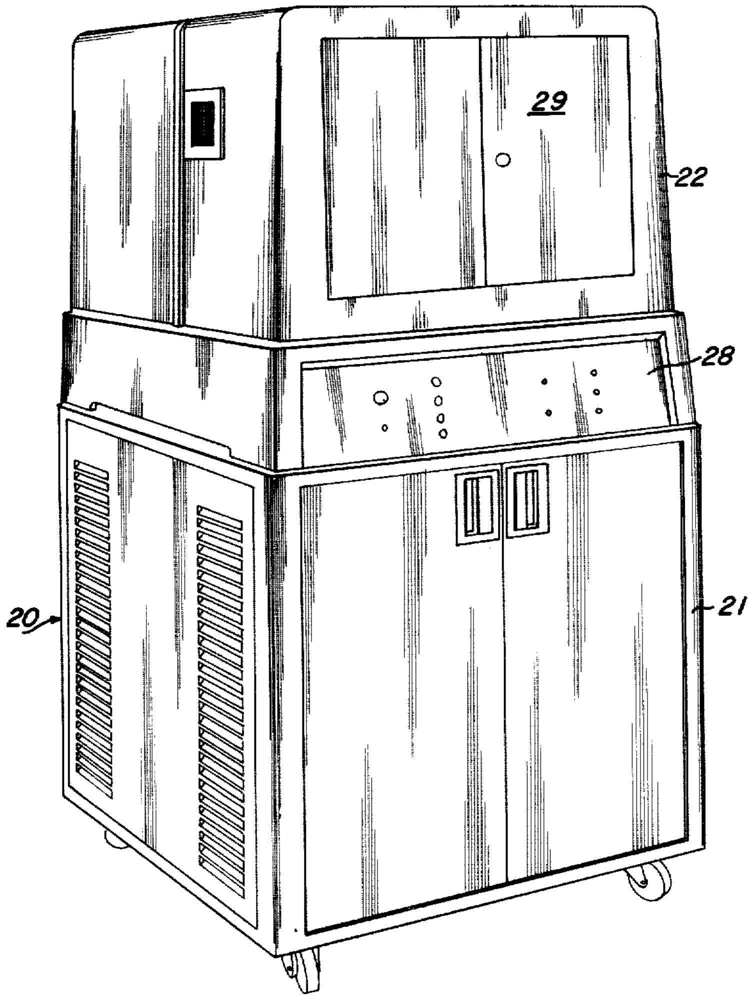
FIG. 1 is a perspective view of the duplicate unit.

The duplicator unit 20 shown in FIG. 1 comprises a base cabinet 21 and an upper cabinet 22. The base cabinet contains various electronic circuits assoicated with the mechanical portion of the duplicator as well as the scanner system and motors for providing a drive to the duplicator unit. In addition, several vacuum pumps are also arranged in the base cabinet.

The upper cabinet contains the card handling, exposing and printing arrangements which are supported on a base 30 having an upright plate 31. The supply magazine 33 is secured to one side of plate 31 and the receiving magazine 34 is secured to the same plate and on the opposite side, both magazines being arranged in relation to the card transport disc 35.

Figure 2:
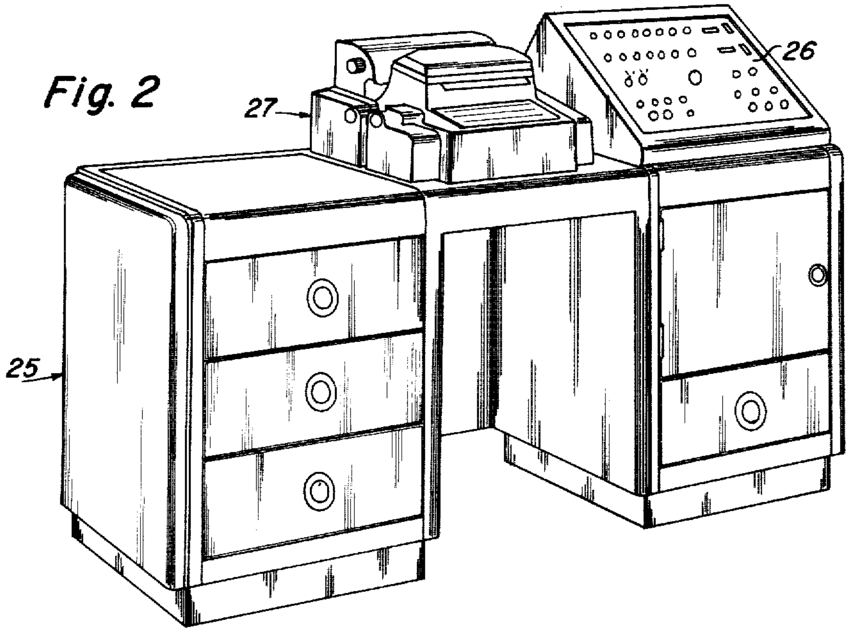
FIG. 2 is a perspective view of the console showing the relation of the control panel and Flexowriter.
Figure 5:
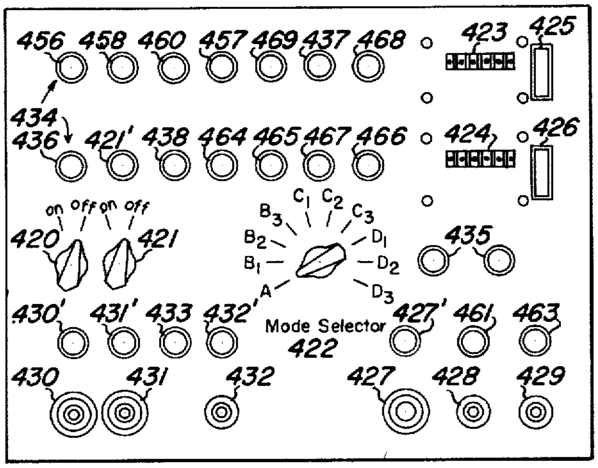
FIG. 5 is a detail view of the console control panel showing the various operating controls and indicators.

The console, 25, as shown in FIG. 2, comprises a desk-like structure on one side of which is mounted the control panel 26 and which is adjacent the Flexowriter 27. The console 25 provides the center of operation for the operator to control and note various conditions of the duplicator 20 and the programmer. The control panel 26, see FIG. 5, comprises a number of indicator lamps which warn the operator that the hatches over the supply and receiving magazines are open, that the lamp housing is not properly positioned, that the duplicator is out of film, that one or more lamps within the duplicator are burnt out, that the card feed does not sense a card after three movements of the carrier disc, that the temperature within the programmer has exceeded a predetermined level, that the input tape associated with the Flexowriter has stopped, that one or more fuses within the duplicator or the programmer have blown, that the "M" check does not agree with the input from the tape, that the set of cards has been completed, that there are too few cards in the set being scanned, that there are too many cards in the set being scanned, that an error has occurred in the memory and that the DN does not compare with the memory and the input from the card or tape. In addition, counters are provided to indicate the card and duplicable counts and can be reset to zero by the operator. The console control panel also provides the means for the operator to select the mode of operation, the type of card to be duplicated, that is, either a positive or a negative, and various machine control operations such as initial clear out, start and stop. The operator is also able to set up the circuitry in the programmer based on the timing marks and also for "M" check. The various power controls for on, off, or stand-by conditions are also arranged on the control panel. While reference is made throughout the specification to the programmer, this unit comprises merely a cabinet in which the various electronic circuits are arranged in package form in a well-known manner, and it is believed that any further disclosure, aside from the circuitry contained therein, is not necessary. Some of these indicators and controls are duplicated on control panel 28 on the front of duplicator unit 20.

Figure 6:
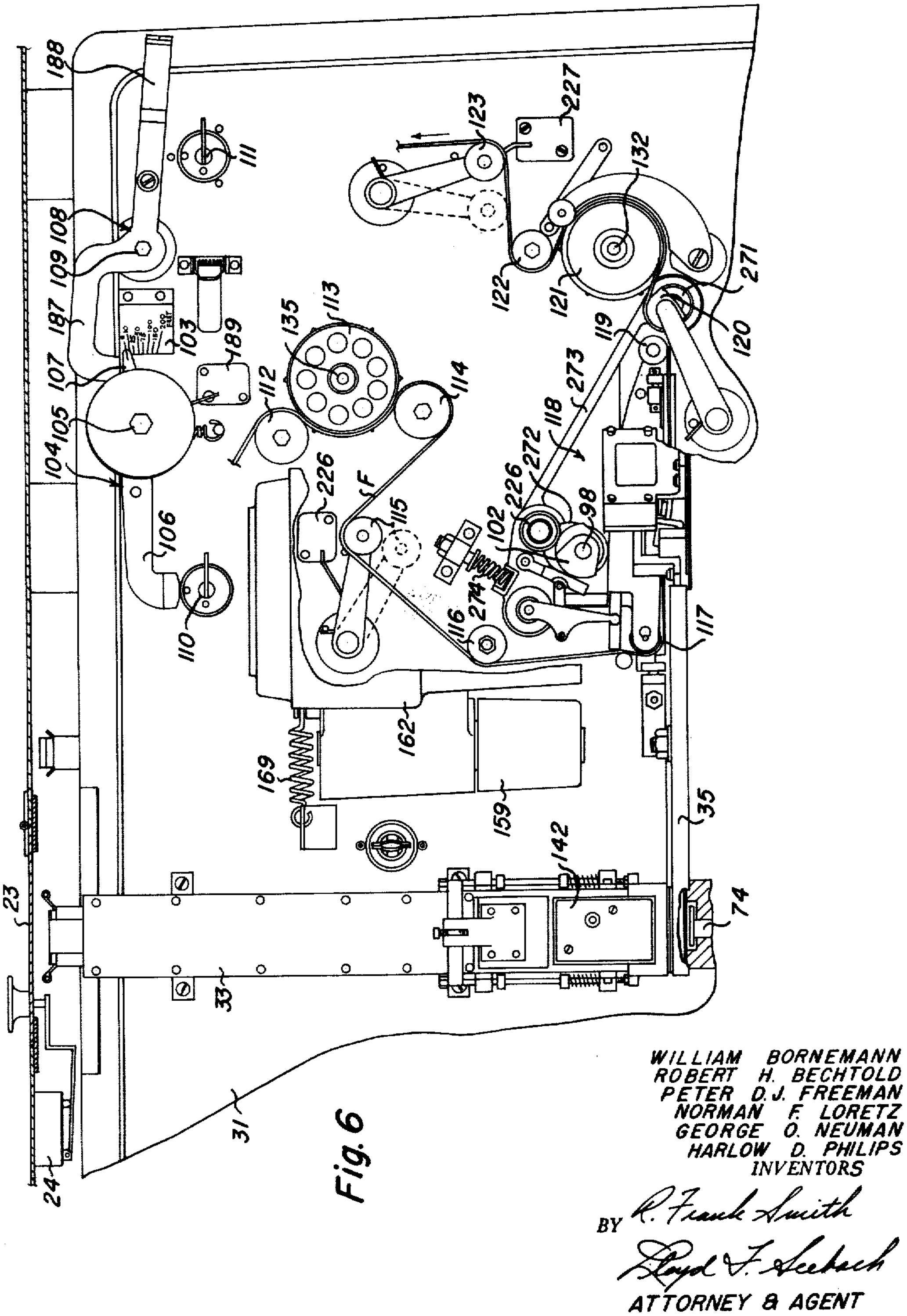
FIG. 6 is a partial front elevation of the upper portion of the duplicator unit showing the film path, the supply magazine, the carrier and the printing station.
Figure 7:
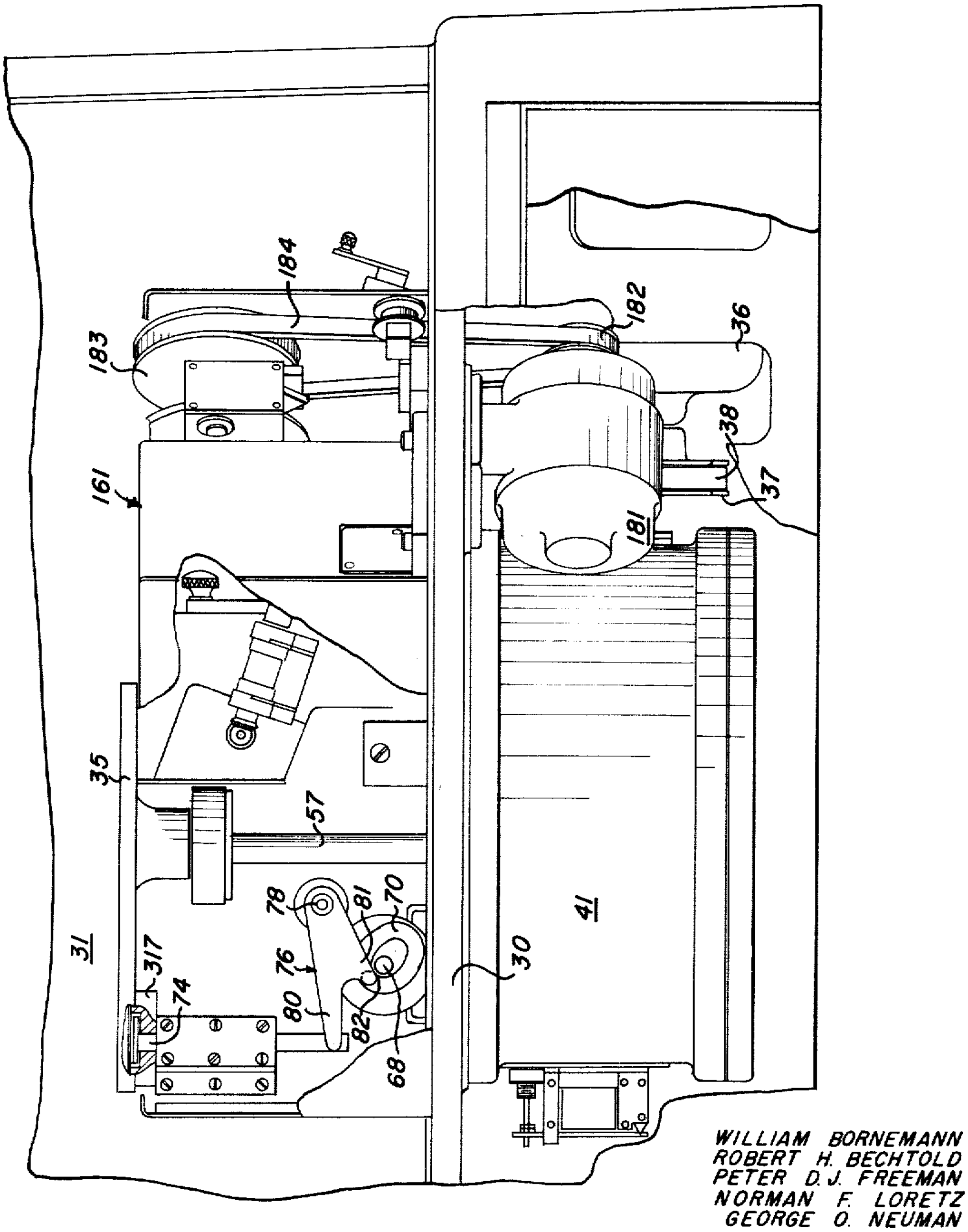
FIG. 7 is a partial front elevation of the lower portion of the duplicator unit.
Figure 8:
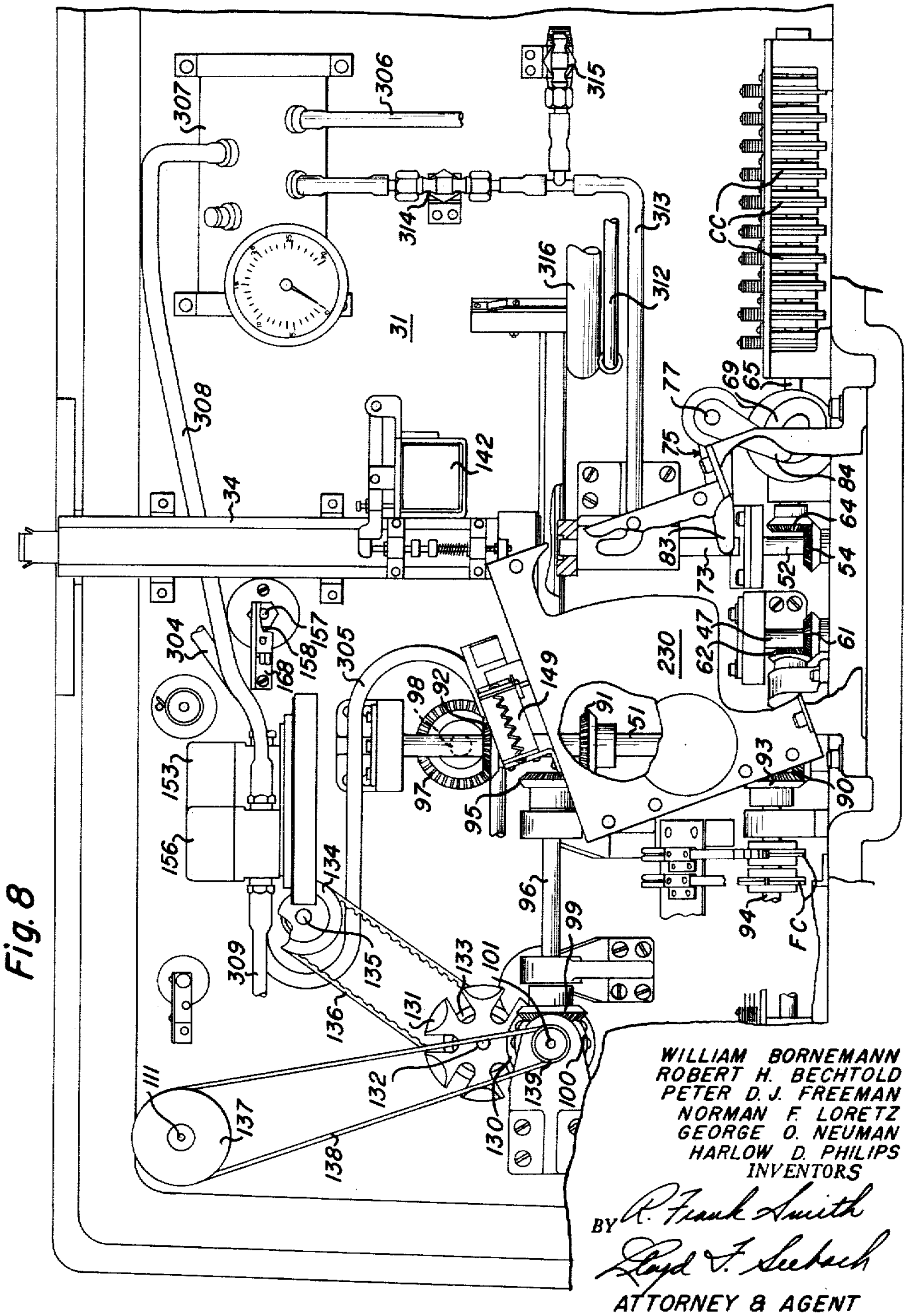
FIG. 8 is a partial rear elevation of the duplicator unit showing the film drive, carrier and cam drives, the receiving magazine, a portion of the vacuum system, and the code target.

Cabinet 22 is provided with two hatches, one of which is shown in FIG. 6, for loading the elements into supply magazine 33 and for removing the elements from receiving magazine 32. Each hatch comprises a hinged door 43 which in the closed position actuates switch 24 to a closed position. As will be described hereinafter, if either or both of doors 23 are left open, the cycle of operation cannot be started and this condition is indicated to the operator on control panel 26.

Beneath base 30 and within base cabinet 21 motor 36 is mounted to provide a drive for the card and film handling mechanisms, see FIGS. 6–11. Motor 36 drives a pulley 37 which is connected by belt 38 to a pulley 39 on shaft 40. The shaft 40 extends into a housing 41 which contains a gear drive having four output shafts. The gear drive comprises a worm 45 which drives worm gear 46 secured to the output drive shaft 47. The shaft 47 is driven continuously by motor 36 through the belt drive and the worm and worm gear drive. Gear 48 is fixed to shaft 47 and drives gears 49 and 50 fixed to output shafts 51 and 52, respectively. Gear 50 is connected to one side of the one revolution clutch 53 and the other side of clutch 53 is connected to gear 54 and the driver 55 for star wheel 56. Driver 55 and star wheel 56 provide a Geneva movement to impart intermittent rotation to shaft 57 to which disc 35 is secured. Gear 49 is connected to one side of single revolution clutch 58 and the other side of the clutch is connected to shaft 51. Clutches 53 and 58 are held against rotation by solenoids 59 and 60 respectively. This portion of the card and film driving mechanisms is contained within the housing 41. Gear 61 is secured to the end of shaft 47 and through gear 62 drives shaft 63 to which a plurality of drive cams designated as DC are fixed. Gear 54 on shaft 52 drives gear 64 which is secured to shaft 65 and rotates the card cams CC which are fixed to the shaft. Intermediate cams CC and gear 64, gear 66 is also secured to shaft 65 and mates with gears 67 and 68 to drive the grooved cams 69 and 70 which are secured to shafts 71 and 72, respectively. The cams 69 and 70 serve to operate the plungers 73 and 74, respectively associated with magazines 34 and 33, through bellcrank levers 75 and 76. The levers 75 and 76 are pivotally mounted at 77 and 78 by means of stud shafts extending from plate 31. Lever 76 has an arm 80 which engages plunger 74 and an arm 81 which carries a roller 82 for engaging the groove in cam 70. Likewise, lever 75 has an arm 83 which engages plunger 73 and an arm 84 which carries a roller 85 for engaging the groove in cam 69. Shaft 51 carries three gears 90, 91 and 92 which mate, respectively, with gear 93 on shaft 94, gear 95 on shaft 96 and gear 97 on shaft 98. Shaft 94 has the film cams FC secured thereto and rotatable therewith. Shaft 96 carries a gear 99 which meshes with a gear 100 on shaft 101. This set of gears provides the drive for the film advancing mechanism. Shaft 98 extends through plate 31 and has a cam 102 secured thereto which is on the farther side of plate 31. Gears 92 and 97 provide the drive for raising and lowering the print gate with respect to disc 35.

On the farther side of plate 31 and at the upper edge thereof, see FIG. 6, a spindle 110 is rotatably mounted for receiving the film supply reel. The take-up spindle 111 is also rotatably mounted on plate 31. The film path extends from the film supply reel on spindle 110 over an idler roll 112, around the sprocket 113, around a second idler roll 114, around a spring biased tension roll 115, over an idler roll 116, around the idler roll 117 rotatably mounted on the pressure pad assembly 118, beneath the pressure pad and under idler roll 119, over a spring biased tension roll 120, around the driven sprocket 121, around an idler roll 122, around a spring biased tension roll 123, and then to the take-up reel on the take-up spindle 111. The sprockets 113 and 121 are driven intermittently by the Geneva device mounted on the rear side of plate 31. The Geneva driver 130 is secured to shaft 101 and engages the notched disc 131 to drive sprocket 121 directly. Shaft 132 on which disc 131 and sprocket 121 are mounted carries a pulley 133 which is connected by a belt 136 to a pulley 134 on shaft 135 to which sprocket 113 is secured on the front side of plate 131. Take-up spindle 111 extends through plate 31 and has a pulley 137 secured thereto on the rear side of plate 31. This pulley is connected by belt 138 to pulley 139 which is secured to an extension of shaft 101. With this drive arrangement, sprockets 113 and 121 are driven intermittently and the take-up spindle is driven continuously during any one film cycle.

To provide a visual guide for the operator as to the amount of film remaining on the supply reel which is carried by spindle 110, see FIG. 6, a scale 103 is located on plate 31 within cabinet 22 as well as an external scale, not shown, which is located on the side of the cabinet. In a manner well known in the art, a lever 104 is pivotally mounted at 105 on plate 31 and is spring biased in a clockwise direction so that arm 106 follows the decreasing diameter of the film convolutions and arm 107 with an index thereon moves with respect to scale 103 to indicate the amount of film remaining on the supply reel. Lever 108 is pivotally mounted at 109 to plate 31 and has one arm 187 pivotally connected to arm 107 and the other arm 188, which carries an index not shown, extends through the wall of cabinet 22 for movement with respect to the external scale. Since lever 104 is coupled to lever 108, movement of lever 104 in a counterclockwise direction results in clockwise movement of lever 108. With lever 104 in the position shown in FIG. 6, that is, the position in which the film supply has been depleted, a pin not shown actuates switch 189 to a closed position. In this same FIG. 6, tension rolls 115, 120 and 123 are shown in their relaxed positions in full lines and normally assume the dotted line positions when film is being moved through the described path from spindle 110 to spindle 111. Tension rolls 115 and 123 are biased into the relaxed position and normally assume this position when no film is in the duplicator, or if film has been threaded through the described path and should break on either side of printing station 265, or there should be loss of tension on either side, then rolls 115 and/or 123 will assume their relaxed position and actuate switches 226 and/or 227 to a closed position to initiate an alarm sequence as described hereinafter.

Figure 21:
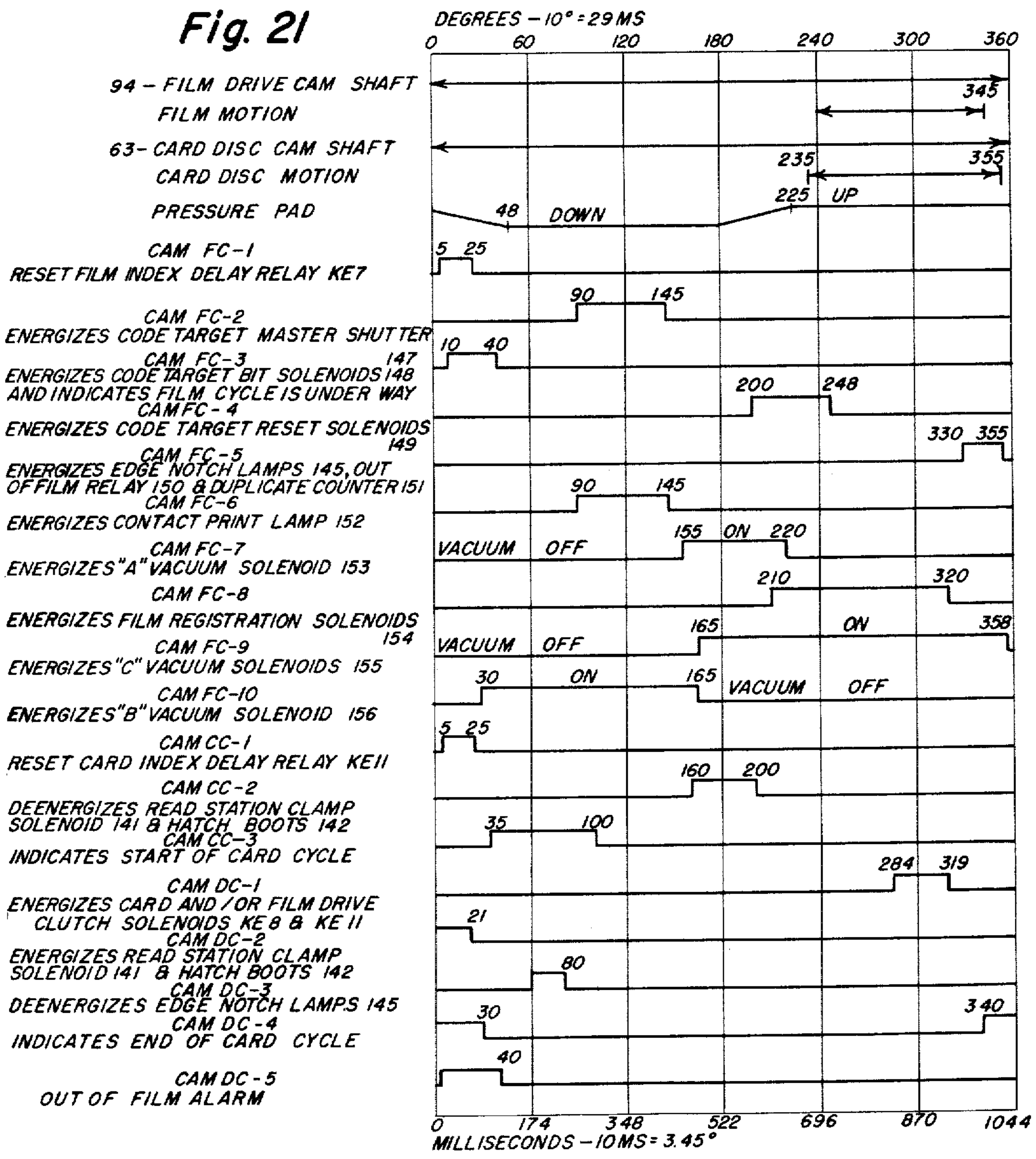
FIG. 21 is a chart showing the operating relationship of various elements for each cycle of operation of the duplicator.

The card cams CC which are secured to shaft 65 comprise three separate cams which actuate respective switch contacts in a predetermined sequence of operation. Card cam CC–1 resets card index delay relay KE–11, cam CC–2 deenergizes read station clamp solenoid 141 and hatch boot solenoid 142, and cam CC–3 indicates the start of a card cycle. Drive cams DC which are secured to and rotatable with shaft 63 comprise five cams associated with the card and film drive mechanism. Cam DC–1 energizes card and/or film drive clutch solenoids 53 and 58, cam DC–2 energizes read station clamp solenoid 141 and hatch boot solenoid 142, cam DC–3 deenergizes edge-notch lamps 145 through relays N1 and N2, cam DC–4 indicates the end of a card cycle, and cam DC–5 initiates the out-of-film alarm. The film cams FC which are secured to and rotatable with shaft 94 comprise ten cams associated with the movement of the film. Cam FC–1 resets film index delay relay KE–7, cam FC–2 energizes code target master shutter solenoid 147, cam FC–3 energizes code target bit solenoids 148 and indicates that the film cycle is under way, cam FC–4 energizes code target reset solenoids 149, cam FC–5 energizes edge-notch lamps 145, out-of-film relay KD–8 and duplicate counter 151, cam FC–6 energizes contact print lamp 152 by means of solenoid 150, cam FC–7 energizes the "A" vacuum solenoid 153 for the film lift, cam FC–8 energizes film registration solenoids 154, cam FC–9 energizes "C" vacuum solenoid 155 for card hold down and cam FC–10 energizes "B" vacuum solenoid 156. The sequence of operation and the direction of contact closure for the above cams is shown in FIG. 21.

Figure 9:
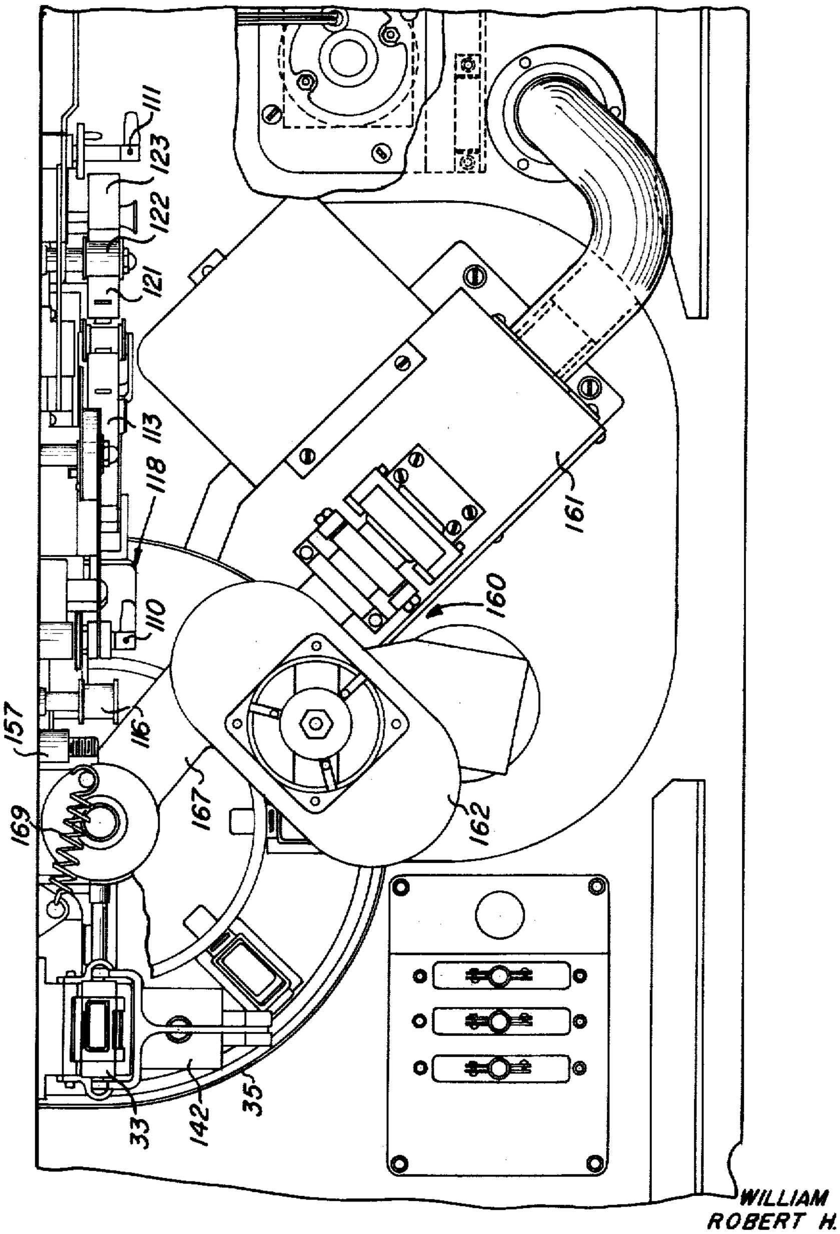
FIGS. 9 and 10 are plan views of the duplicator unit showing the relation of the various mechanisms with respect to a vertical dividing plate.
Figure 12:
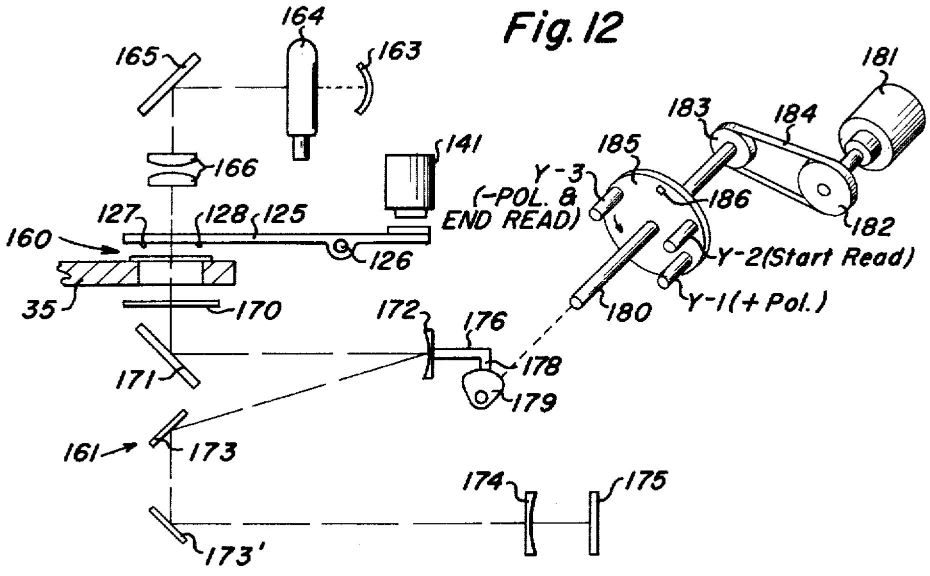
FIG. 12 is a schematic representation of the code reader or scanning means.
Figure 15:
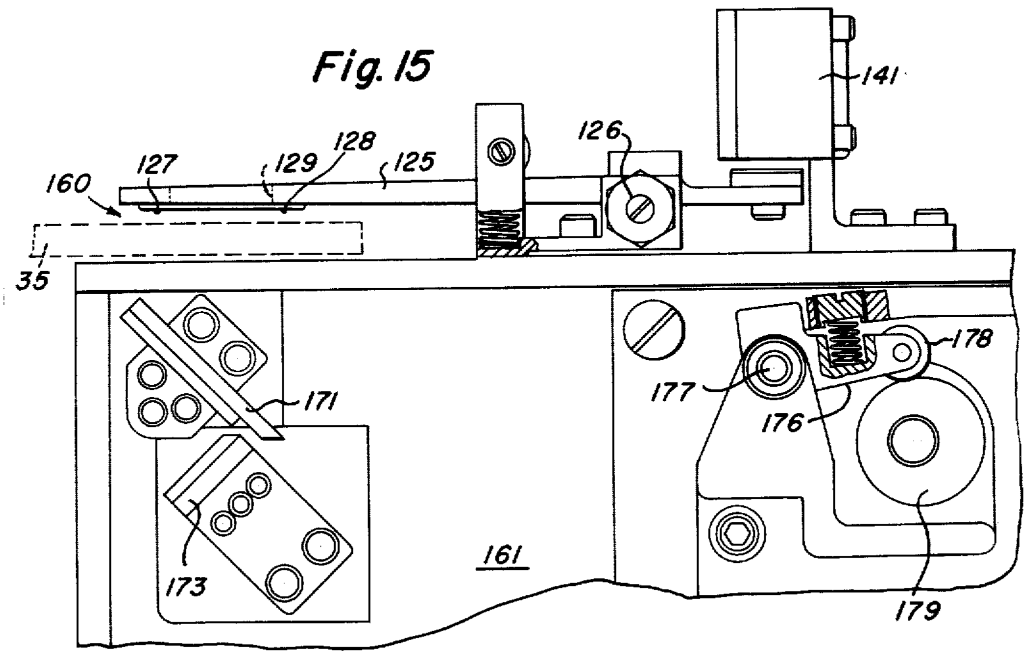
FIG. 15 is an enlarged front elevation of the code reader showing its relation to the carrier and the means for clamping the element when it is positioned in the reading station.

When a card 10 is positioned by disc 35 in the reading station 160, it is then aligned with the optical system of the scanner unit 161. Scanner or code reader unit 161 is a mechanical-optical-electronic device which translates the code image on each element into electrical pulses. The scanner is arranged partially above and partially below disc 35 and in front of plate 31 as shown in FIG. 9. The lamphouse 162 which is arranged above disc 35 and pivotally mounted on plate 31 at 159, see FIGS. 6 and 9, has a reflector 163, a lamp 164, a mirror 165 and a condenser lens system 166 arranged therein substantially in the manner shown in FIG. 12. When lamphousing 162 is properly positioned with respect to the reading station 160, then arm 167 by means of plunger 157 and lever 158 maintains switch 168 in a closed position, the spring 169 serving to hold the lamphousing in this position. Arranged immediately below disc 35 and in close proximity thereto is a window 170 and a mirror 171 which reflects the code image to the oscillating mirror 172. The image reflected by mirror 172 is directed by mirrors 173 and 173′ through lens 174 onto cell array 175. Mirror 172 is mounted on an arm 176 which is pivotally mounted at 177 and has a follower 178 which engages cam 179. Cam 179 is mounted on shaft 180 which is rotated continuously by motor 181 which is connected to shaft 180 by means of pulleys 182 and 183 and belt 184. As shown in more detail in FIG. 15, when an element 10 is positioned in reading station 160 by disc 35, solenoid 141 is energized and lever 125 is then rotated in a counterclockwise direction about its pivot 126 to move end 127 toward disc 35. In its lowered position, tapered pins 128 straddle the element on disc 35 and properly position it with respect to the aperture 129 in the end of said lever. Solenoid 141 remains energized during the interval of reading of the code on the element or so long as element 10 remains in the reading station, solenoid 141 being deenergized before disc 35 is moved in order to release the element for movement with said disc. The element 10 is positioned in reading station 160 in a manner such that the detector scans the element in the long dimension, that is, the direction of scan is at right angles to the coded columns.

Shaft 180 also carries an aluminum disc 185 in which is imbedded a small piece of iron 186 at a radius coincident with the location of three magnetic pickups Y–1, Y–2 and Y–3. The disc 185 and the magnetic pickups provide a pulse generator for generating timing signals to indicate the start and end of a scan motion. As will be described more fully hereinafter, the signals resulting from the reading of a card are presented to the programmer in a parallel register of forty-two bits at a time. As will be noted in FIG. 12, magnetic pickups Y–1 and Y–3 are positioned 180° apart, Y–2 being adjustable with respect to Y–1 and normally lagging Y–1 by approximately 70°. The time sequence is, therefore, a pulse from Y–1 which provides positive polarization, a pulse from Y–2 to indicate start of read and a pulse from Y–3 to provide negative polarization and to indicate end of read.

The cell array 175 is made up of forty-four individual plumbide detectors. Each cell produces a maximum resistance when dark and a decreased resistance when illuminated. By the use of a divider network utilizing a ballast resistor, a voltage signal can be obtained from the cell and shunt resistors can be placed across the cells to load them in order to obtain uniform sensitivity from the cell array. As described above, forty-two cells are utilized for a column of code, one cell is used to obtain the timing mark 16 and the other cell is utilized to obtain an off-center timing mark when exposing the sortation field in the printing station.

Figure 22:
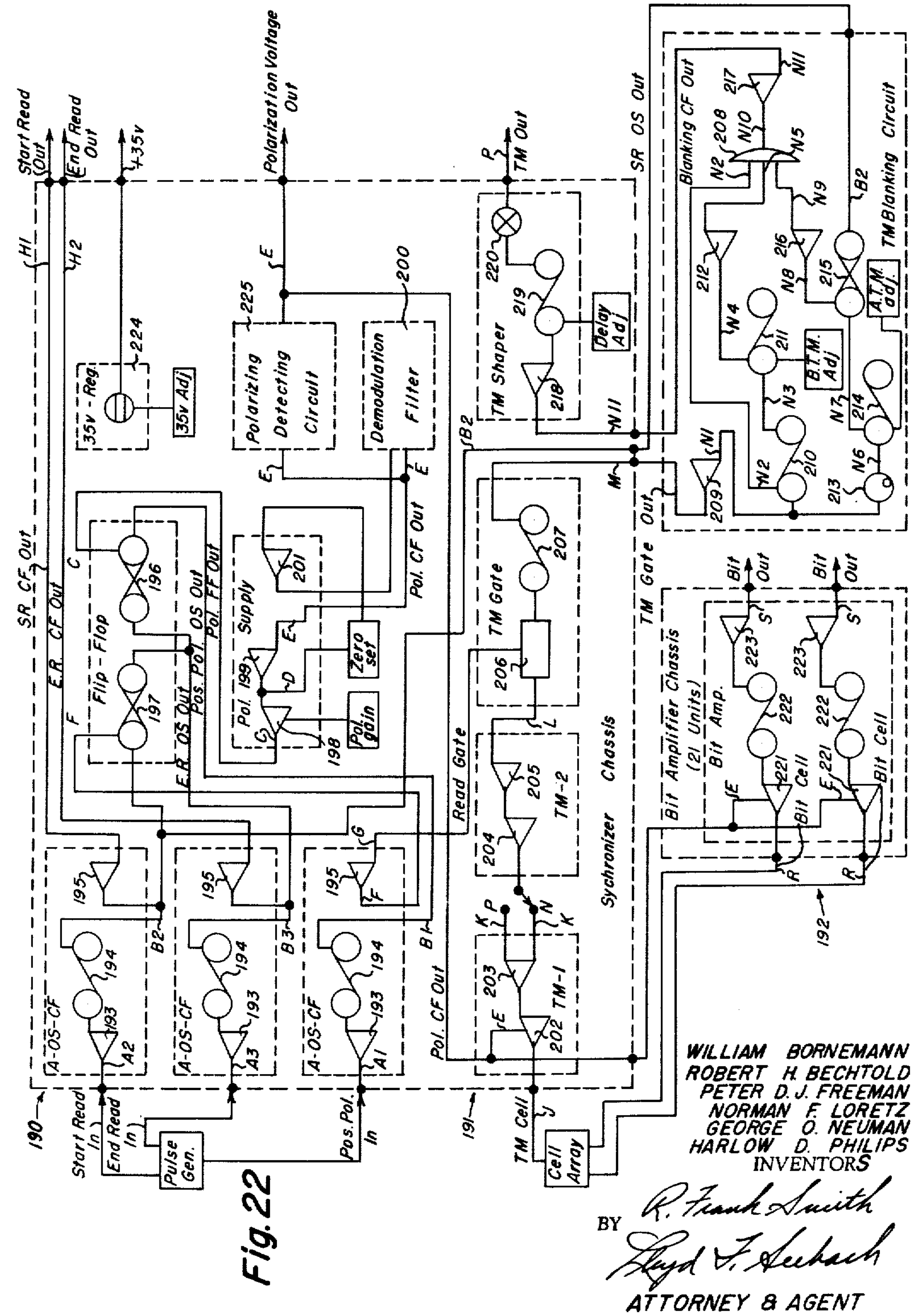
FIG. 22 is a schematic circuit diagram for the code reader.

The code reader portion of the scanner unit 161 comprises a plurality of electronic units which are shown schematically in FIG. 22. The primary purpose of the code reader is to convert the signals received from the scanner into usable signals for the programmer logic. In addition, the code reader provides synchronized timing pulses and a polarizing voltage for cell array 175. In order to read the information from a card, it is necessary to provide the programmer with the following signals for the associated logic. A start read pulse is first required to indicate the start of the reading period as well as an end read pulse to terminate the reading cycle. Timing mark signals are essential to read out the bit information and the bit signals are required to provide the programmer with the digital information on the card. In order to perform these functions, the code reader comprises three major parts, that is, the synchronizer section 190, the timing mark channel 191 and the bit amplifier section 192. The synchronizer section 190 receives the three pulses from the pulse generator and shapes these into a polarizing wave and a read gate. The polarizing wave signals are derived from the positive and end read pulses, whereas the read gate signal is derived from the start read and end read pulses. The polarizing wave signals are applied to the cell array 175 while the read gate signals are utilized in the timing mark channel. The timing mark channel receives its signal from the timing mark cell and this signal is amplified, shaped, gated and can be delayed in order to position it in proper coincidence with the bit signals. The bit amplifiers shape the signals derived from the bit cells to provide signals of uniform amplitude to the programmer.

Figure 23:
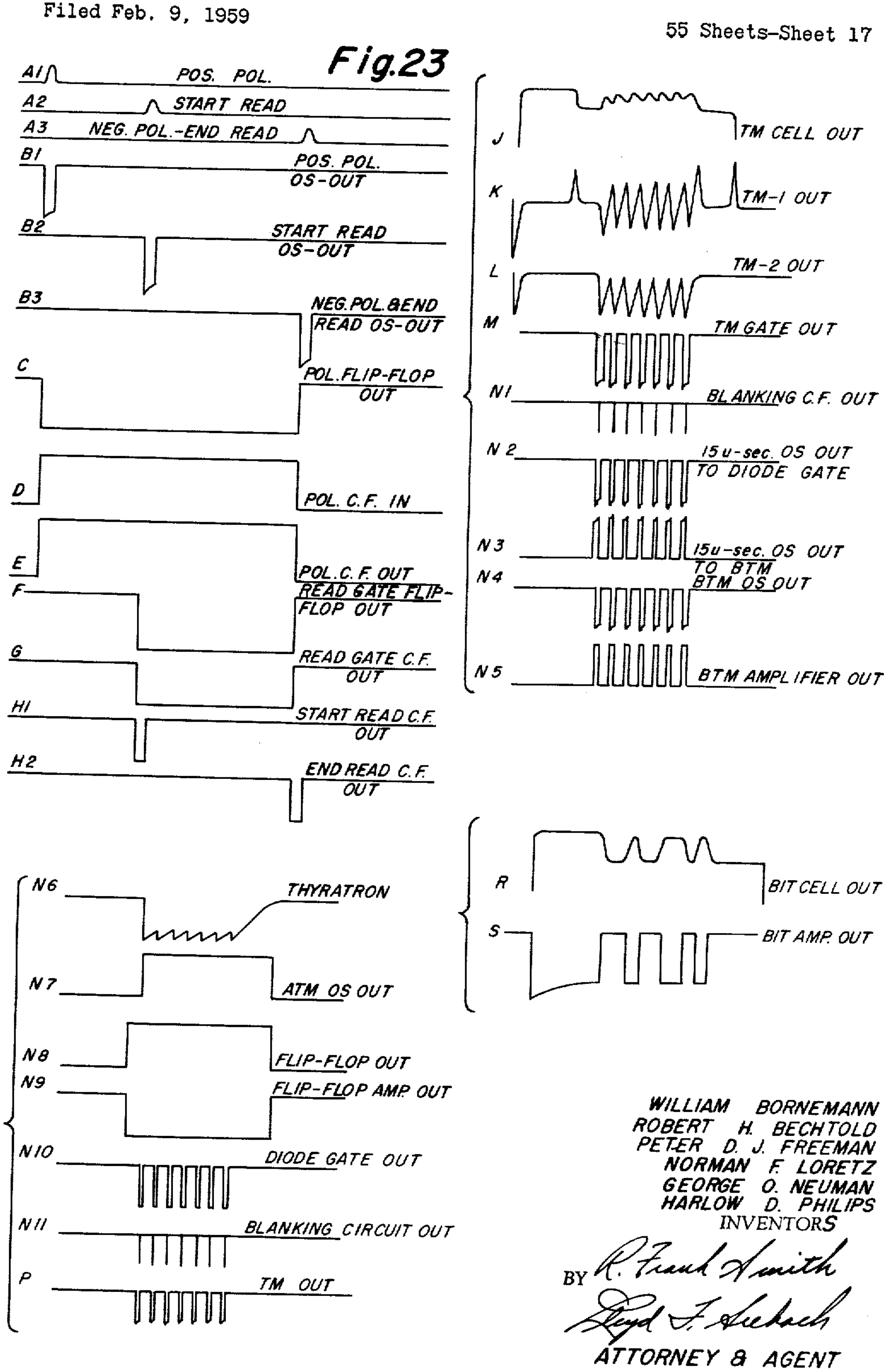
FIG. 23 is a presentation of the various wave forms at designated points in the circuits of FIG. 22.

With respect to synchronizer section 190 three pulses are required to place this section into operation. These pulses are derived from the pulse generator in the scanner and are the positive polarization pulse A1, start read pulse A2, and negative polarization and end read pulse A3 which are shown in their phase relation in FIG. 23. Each of these pulses are fed into an amplifier-one shot-cathode follower package A-OS-CF comprising amplifier 193, Schmitt trigger circuit 194 and cathode follower 195. In each of these packages the amplified pulse is fed into Schmitt trigger circuit 194 which yields a sharp output pulse B of a fixed amplitude. In the circuits for the start and end read pulses, the trigger outputs are fed through cathode follower circuits 195 to provide low impedance signals H1 and H2 for the logic circuits of the programmer. The three trigger pulses B1, B2 and B3 are then fed to two separate flip-flops 196 and 197. The polarizing flip-flop 196 receives positive polarization pulse B1 and negative polarization and end read pulse B3 to provide a square wave output C which is used to shape the polarizing wave form. The read gate flip-flop 197 receives start read pulse B2 and negative polarization and end read pulse B3 to provide a rectangular wave output F which is used as the read gate signal. This read gate flip-flop output is then sent on to the positive polarization A-OS-CF package where it goes through the cathode follower 195 to attain a low impedance read gate output G.

The polarizing voltage signal will now be followed through with particular reference to FIG. 22. The polarizing flip-flop 196 sends its wave form C to the polarizing supply where the signal goes through a cathode bias direct coupled amplifier 198. By adjusting the cathode bias the gain is controlled and thus the amplitude of the polarizing voltage. The amplifier 198 sends the signal D to a cathode follower 199 and a feed back circuit is utilized for the purpose of maintaining electronically a net zero average polarizing voltage. To perform this operation, the polarizing voltage E from the polarizing cathode follower 199 goes to a demodulation filter 200 in which the positive and negative excursions are rectified independently, filtered and then mixed together again. If the signal were balanced originally, no net output from the filter will result and any unbalance will show up as a D.C. level from the filter directly proportional to any unbalance. This level is fed into an amplifier 201 to attain some gain and an inversal. The plate signal of the amplifier is then compared with a negative voltage through the zero feed control potentiometer. From this control a bias voltage is tapped and fed to the polarization cathode follower grid return to establish the cathode follower output level.

The timing mark channel converts the cell signals J received from the timing mark cell and provides a shaped timing mark pulse P which can be properly positioned in relation to the bit signals S to allow the reading out of the bit information. The timing mark signal has a wave form J which is a series of sinusoidal type signals superimposed on a square wave. Since the timing mark is clear for a positive card, the negative edge is of interest and for a negative card the timing mark is black and the leading or positive edge is of interest, the signals can vary for a negative and a positive card. This effect is compensated for in the TM–1 circuit in which the positive excursion of the square wave is clamped to ground and the signals within the step range of 1.5 volts are presented to a remote cut-off amplifier 202. The signals are amplified less as the grid becomes more positive and this serves two purposes; namely, the signals from a positive card are amplified more than those from a negative card and spurious signals due to dirt in the optics which appear along the clear excursion will be suppressed. The output from the first amplifier is then differentiated to remove the square wave portion and this signal is fed into phase inverter 203. The purpose of the phase inverter is to allow the selection of the desired polarity for positive or negative cards, and this is acomplished by means of the positive-negative relay. For a negative card the positive cell signal J is desired and since there is an inversion through the amplifier, the negative edge is desired at this point. As the following TM–2 circuit operates on negative pulses, the cathode output of the phase inverter will be selected, and there is an additional relay on the cell input in order to extract the timing mark signal from two cells. For this reason, cell 0 is used on negative cards while cell 43 is used on positive cards, and the reason for this is that the duplicator must operate with the emulsion side of the card up at all times while other equipment utilizing the same cards orients the card so that the timing marks fall on cell 0 at all times.

In the TM–2 circuit the signal is first passed through a positive diode clipper 204 which clips off all of the positive input signals K and about half a volt of the negative signal. The signal is then amplified by circuit 205 and again differentiated at a level below cut off of the next stage. The positive spikes will be passed by the last stage resulting in negative pulses L out of TM–2.

These pulses are then fed to the TM-gate circuit in which the signals L are mixed with the read gate signals G in a twin cathode follower 206 (AND gate). This yields an output which occurs only during the reading cycle of the card. The pulses are then fed to a Schmitt trigger 207 to enhance the rise time to produce a series of pulses as shown at M in FIG. 23. At this point, the signals go to the TM blanking circuit the purpose of which is to permit a timing mark signal output only it if occurs at the proper interval and only during the timing mark signal duration. This is to assure proper coincidence with the bit signals S and prevent spurious pulse outputs which could result in erroneous digital reading due to document images which could result after the digital data is scanned. To perform this function a three-legged diode "AND" gate 208 is used, one input being the timing mark signals from the TM-gate, the second input being a blanking gate created by the timing mark signals which opens up only when a timing mark should occur, and the third leg being a variable read gate which opens up only during the duration of the timing mark signals.

The signals from the TM-gate are differentiated, clipped and passed through a cathode follower 209, to provide a wave pattern N1. These signals feed the Between Timing Mark (BTM) and After Timing Mark (ATM) circuits. The BTM circuit receives the negative spikes N1 corresponding to the leading edge of the timing mark signal and are fed to a 15 μsec. one shot circuit 210. This signal N2 now represents the timing mark signal and is one input to the diode "AND" gate. The trailing edge of the 15 μsec. one shot is fed to the BTM one shot 211, and the time delay is adjustable. This creates the blanking pulse between timing marks. The BTM one shot signal N4 is then fed to a buffer amplifier 212, and this output N5 represents the second leg of the diode "AND" gate. In the ATM circuit the cathode follower signals N1 are fed to a normally conducting thyratron 213 and cut this tube off. The plate of the thyratron is directly coupled to the grid of the ATM Schmitt trigger 214 with a variable RC circuit and the thyratron acts like a relaxation oscillator. Thus, the thyratron will remain cut off until the last timing mark signal goes through and for four additional timing marks. The plate signal is shown as N6 in FIG. 23 and since the thyratron plate is also the ATM Schmitt trigger grid, the trigger will square this signal as shown in N7. This signal is then delivered to a flip-flop circuit 215 whose output signal N8 is then fed through a buffer amplifier 216 and its output N9 is the third leg of the diode "AND" gate. When pulses N8, N5 and N9 are in coincidence then an output N10 will be derived from the "AND" gate and this signal is then fed to a cathode follower 217 to attain a low impedance output which is differentiated and clipped. The output N11 is a series of negative spikes coincident with the leading edges of the timing mark signal J. The TM blanking circuit output pulses N11 are passed on to the TM shaper circuit in which the pulses are first passed through cathode follower 218 and injected onto a variable time delay one-shot trigger 219. The time delay is adjustable to permit positioning of the timing mark signal with respect to the bit signals. The delay one-shot output is then fed to pulse generator 220 which is a single-shot blocking oscillator. The final output P is coupled out from a transformer and represents the timing mark output signal.

Figure 24:
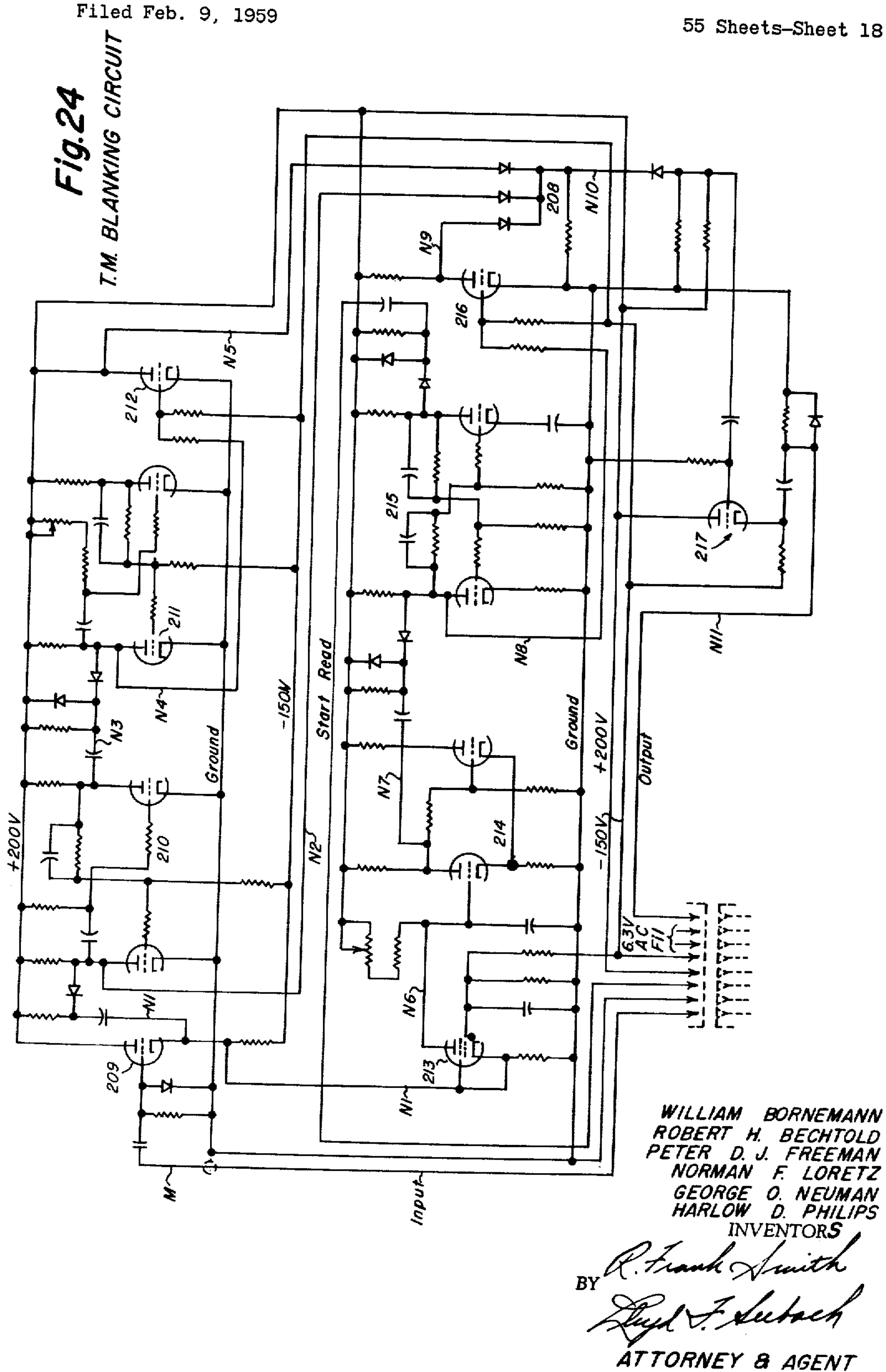
FIG. 24 is a detail schematic circuit of the TM blanking circuit shown in FIG. 22.

The bit amplifiers are packaged as two amplifiers per plug-in unit. Each is interchangeable and identical. The purpose of the bit amplifier is to translate the bit cell signals into usable output signals. The forty-two cells in array 175 provide a wave form of the type shown at R in FIG. 23. The cell signal R is coupled into the bit amplifier, the positive wave being clamped to ground and the negative going signals being presented to the input amplifier 221. This amplifier is essentially the same as the TM–1 input amplifier. The amplified plate signal is differentiated and fed into a trigger circuit 222 which is essentially a long time constant one-shot which accepts positive and negative going spikes to flip it into the alternate states. The trigger also uses a negative power supply to attain a ground reference output signal. This signal is directly coupled into a cathode follower 223 yielding a low impedance output S which is a squared result of the input signal, this signal being shown at S in FIG. 23. Details of the circuits shown in FIG. 22 can be found in U.S. application Serial No. 722,342, filed March 18, 1958, now Patent No. 2,888,527, and which has a common assignee with the present application. With respect to details of the circuits in the TM blanking circuit reference may be had to FIG. 24.

The 35 volt regulator 224 is a small electronically regulated supply which furnishes the screen voltage for the pentode tubes of the bit amplifiers and TM–1 circuits. There is a potentiometer control to adjust the voltage level. The polarizing signal E formed in the polarizing supply circuit is A.-C. coupled into the detector circuit 225. The negative excursion is then clamped to a fixed potential. The signal then passes through an integrator circuit and is then applied to a normally cut-off tube. When the integrated level reaches sufficient amplitude to bring the tube out of cut-off, it will start to conduct until full conduction is attained. The polarizing voltage relay is in the plate circuit of the tube and is actuated when the tube is fully conducting, the relay permitting the polarizing voltage E to be applied to the cell array 175.

Figure 10:
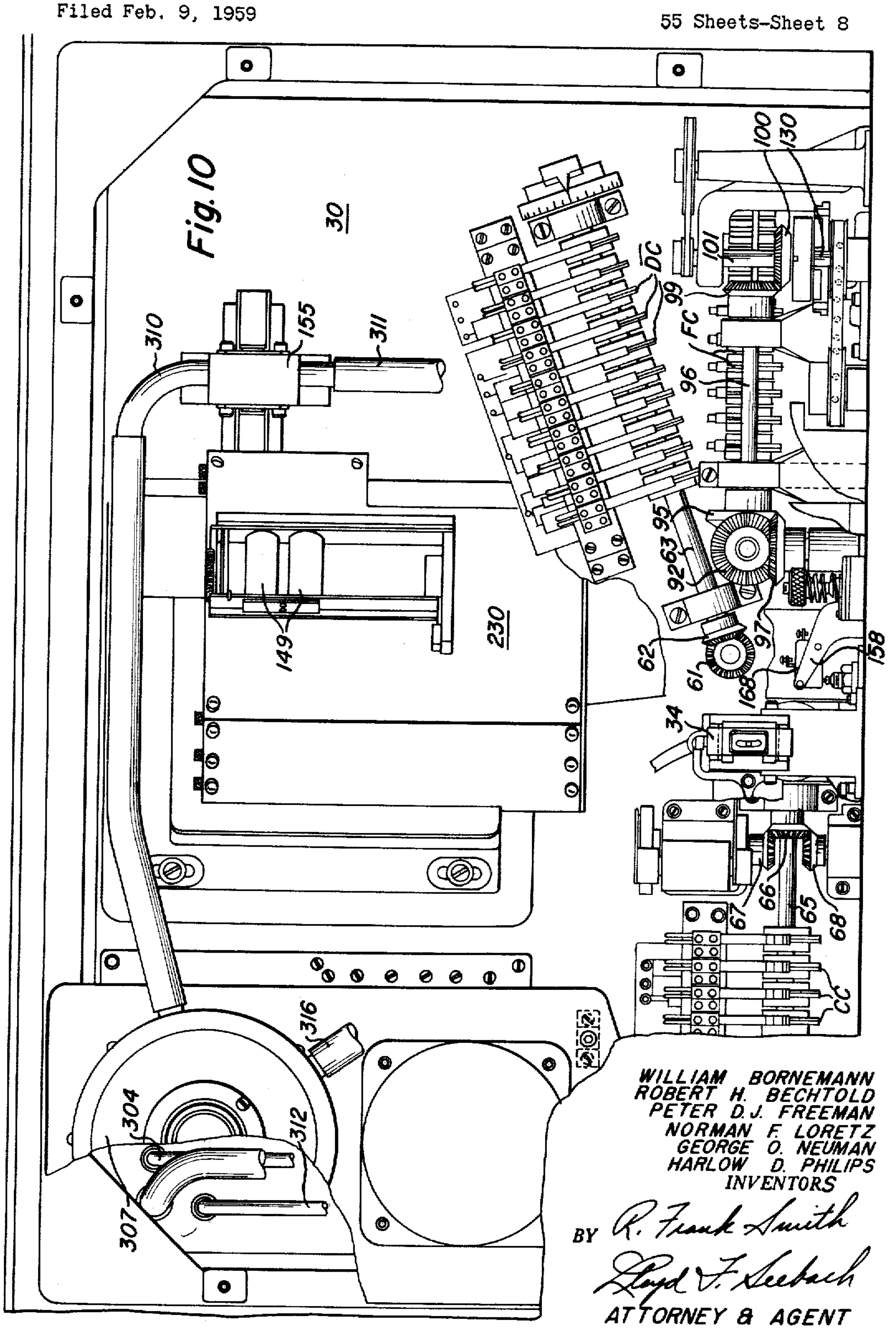
Figure 11:
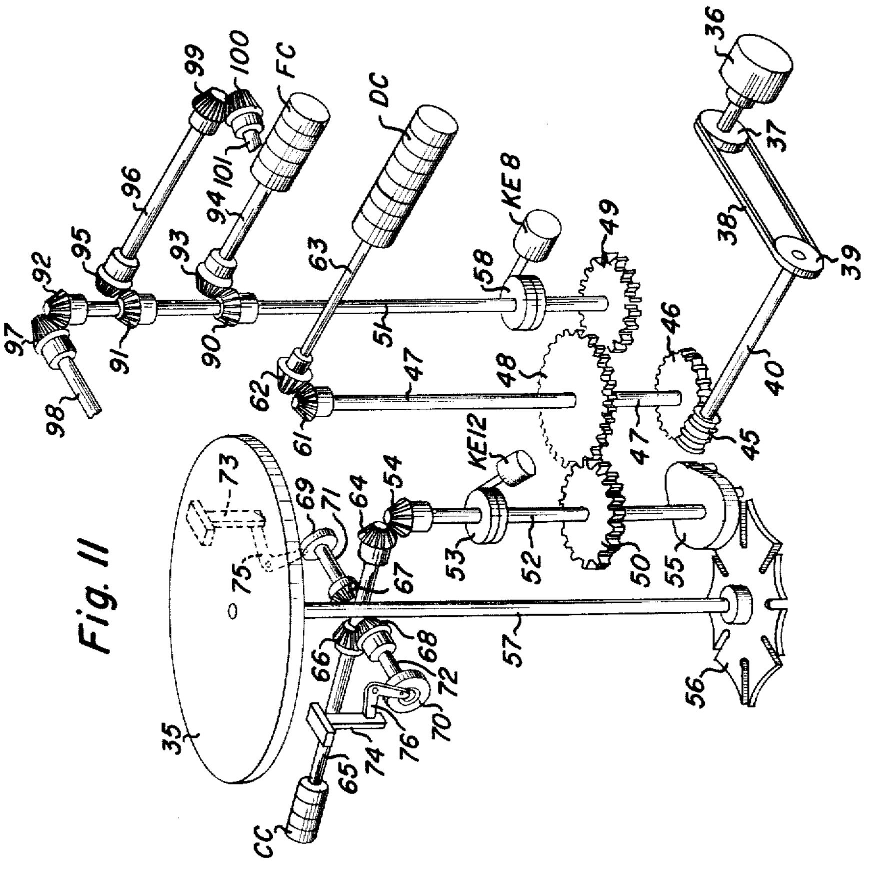
FIG. 11 is a schematic perspective view of the duplicator unit drive means for the carrier, film, transfer means, printing station and the various control cams.
Figure 14:
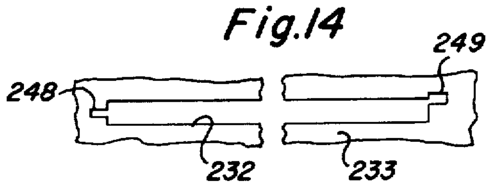
FIG. 14 is a detail elevation view of the code target aperture showing the relation thereto of the timing mark apertures.
Figure 13:
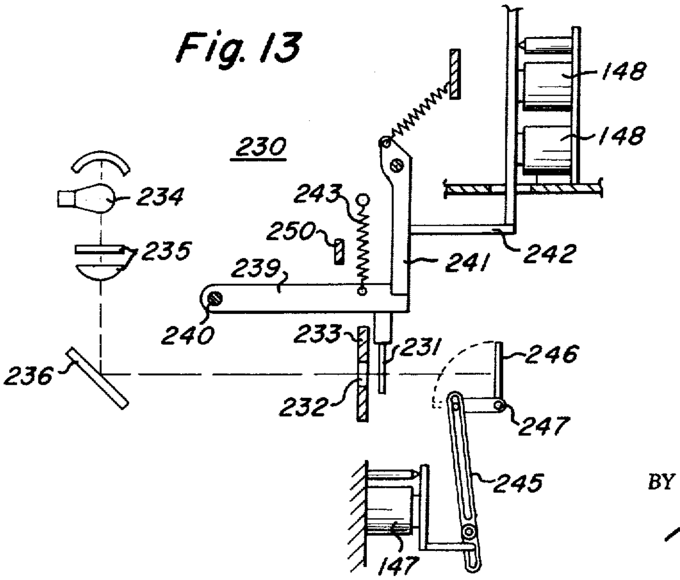
FIG. 13 is a schematic representation of the code target.
Figures 16, 18:
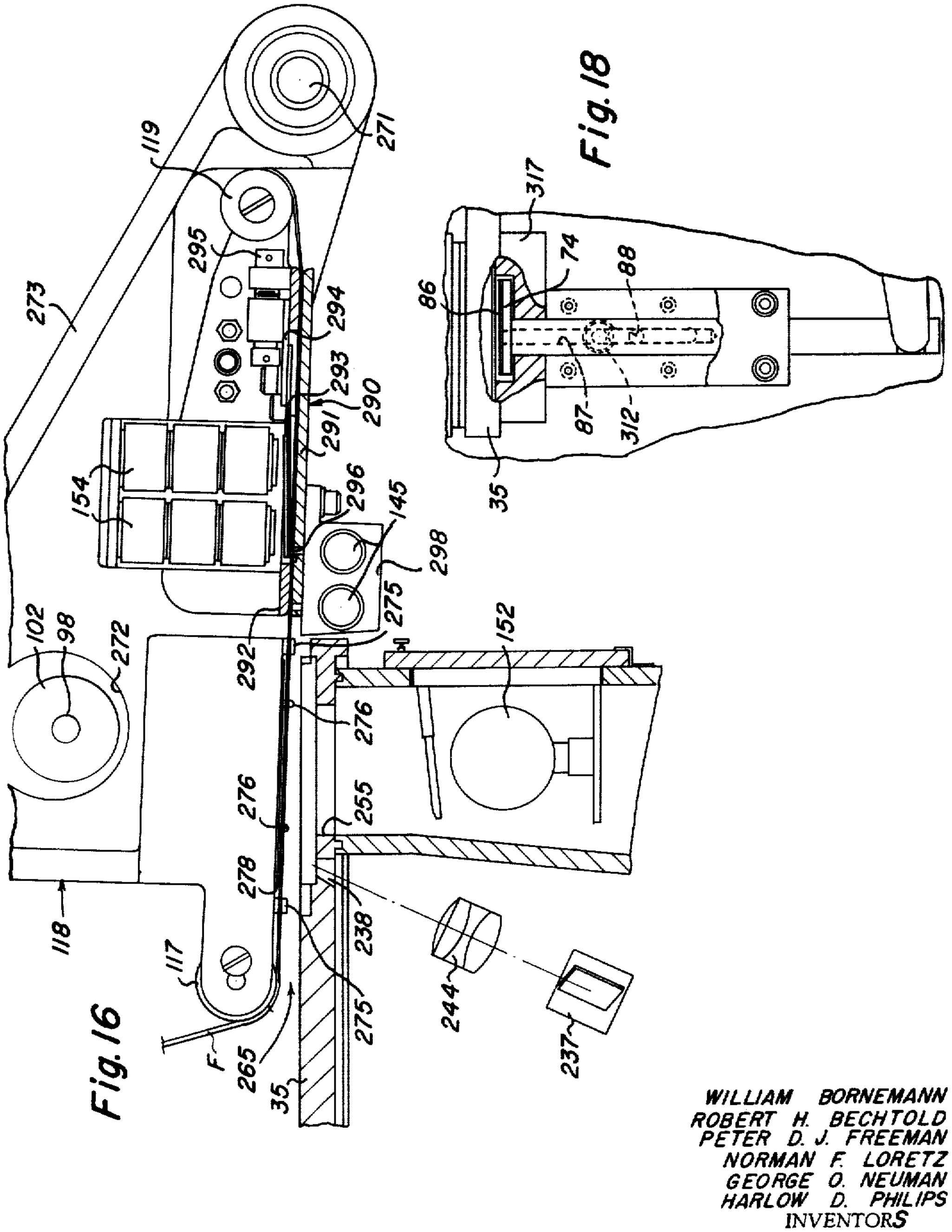
FIG. 16 is a front elevation and partial section through the printing station showing apertures through which the sortation column and the element are exposed simultaneously.
FIG. 18 is detail view of one of the transfer means showing its relation to the charrier and the vacuum parts.
Figure 19:
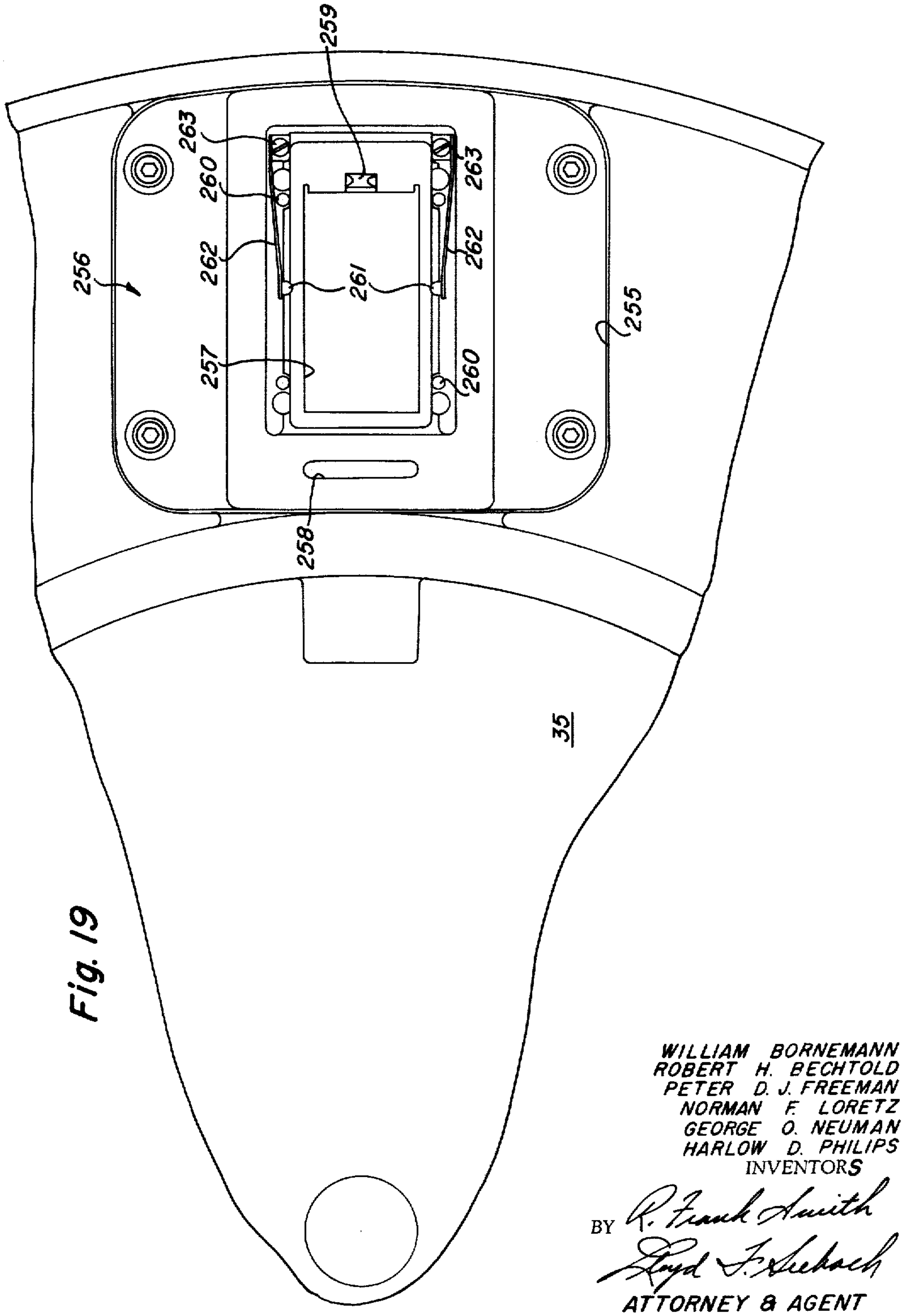
FIG. 19 is an enlarged view of one of the nests on the carrier in which the element is positioned for movement from the supply station to the receiving station.

The code target 230 is mounted on base 30, as shown in FIG. 10, and comprises a plurality of pins 231 which are arranged in front of an aperture 232 in a plate 233 to completely block any illumination through said aperture. A schematic representation of the code target 230 is shown in FIG. 13 and a fragmentary view of the aperture 232 is shown in FIG. 14. The code target shown here schematically is the same as that disclosed in U.S. application Serial No. 508,138, filed May 13, 1955, now Patent No. 2,903,941, and which has an assignee common to that of the present application. Briefly, the code target comprises a light source 234, a condenser system 235, a mirror 236 for reflecting the illumination onto aperture 232 and toward the mirror 237. Mirror 237 and projection lens 244, see FIG. 16, are located beneath disc 35 for directing and projecting the pattern of light defined by aperture 232 into an aperture 238 in disc 35, as shown in FIGS. 16 and 19, when said aperture is positioned in the printing station. To briefly describe the code target 230, each of pins 231 is carried by a lever 239, said levers being pivotally mounted on a common axis 240. The levers 239 can be alternately mounted on opposite sides of the pins to provide space for solenoids 148. Arms 239 are retained in a position for holding pins 231 in front of apertures 232 by a group of levers 241 which are connected by means of link 242 to solenoids 148. When one of solenoids 148 is energized, its respective arm 241 is removed from arm 239 and spring 243 then raises arm 239 to remove its respective pin 231 from the aperture 232. As a result, light is transmitted through aperture 232 to the extent of the diameter of pin 231. This area of light is then directed by mirror 237 through a projection lens 244 and into aperture 238 in disc 35. As a result an exposure of one is made on the film strip. At the same time that lever 239 is released, solenoid 147 is energized and by means of link 245 pivots shutter 246 about its axis 247 to permit the illuminated portion of aperture 232 to fall on mirror 237. As shown in FIG. 14, aperture 232 is provided at each end with a relatively small aperture, one aperture 248 being located centrally of aperture 232 and the other aperture 249 being located at one end of the edge of aperture 232. Aperture 248 is utilized to expose a timing mark as normally found adjacent each column of code whereas aperture 249 is utilized to expose a particular timing mark with respect to the column of code in the file field. Pins 231 are reset to their normal blocking position after an exposure by bar 250 which is moved against arms 239 by a linkage actuated by solenoids 149 mounted on top of code target 230, as shown in FIG. 10. Solenoids 148 are energized in relation to solenoids 147, as will be described more fully hereinafter with respect to a complete sequence of operation for the duplicator unit.

Disc 35, as shown in FIGS. 9, 16, and 19, is provided with eight equally spaced, recessed apertures 255 in each of which a nest assembly 256 is mounted. Each of nest assemblies 256 is provided with an aperture 257 over which the card 10 is arranged and an aperture 258 which is aligned with aperture 238 in disc 35 and through which the code for the file column 13 is exposed. Within each nest 256 a pin 259 is arranged for engaging the aperture 14 in card 10. The card overlies aperture 257 and is retained in position by guide pins 260 and pins 261 which are mounted on the ends of the resilient arms 262 secured to the nest assembly at 263. Pins 261 overlie the edge of card 10 to prevent any vertical movement of the card as disc 35 is rotated intermittently. As shown in FIG. 9, disc 35 is provided with eight of such assemblies and starting with supply magazine 33, the reading station 160 is arranged with respect to the fourth aperture, the printing station 265 is arranged with respect to the fifth aperture and the receiving magazine 34 is arranged with respect to the seventh aperture. Since the reading station 160 is arranged ahead of printing station 265, the code is exposed on the film area preceding the film area to be exposed with respect to the card 10 then in the printing station 265. As shown in FIG. 4, the area 13 of the master card 10 serves as a mask to cover the code column which had been previously exposed. With this arrangement, two exposures actually take place simultaneously; one with respect to sortation column 15 at apertures 238 and 258 and the other with respect to the fixed field 12 of card 10 and the document images thereon at apertures 255 and 257.

Figure 17:
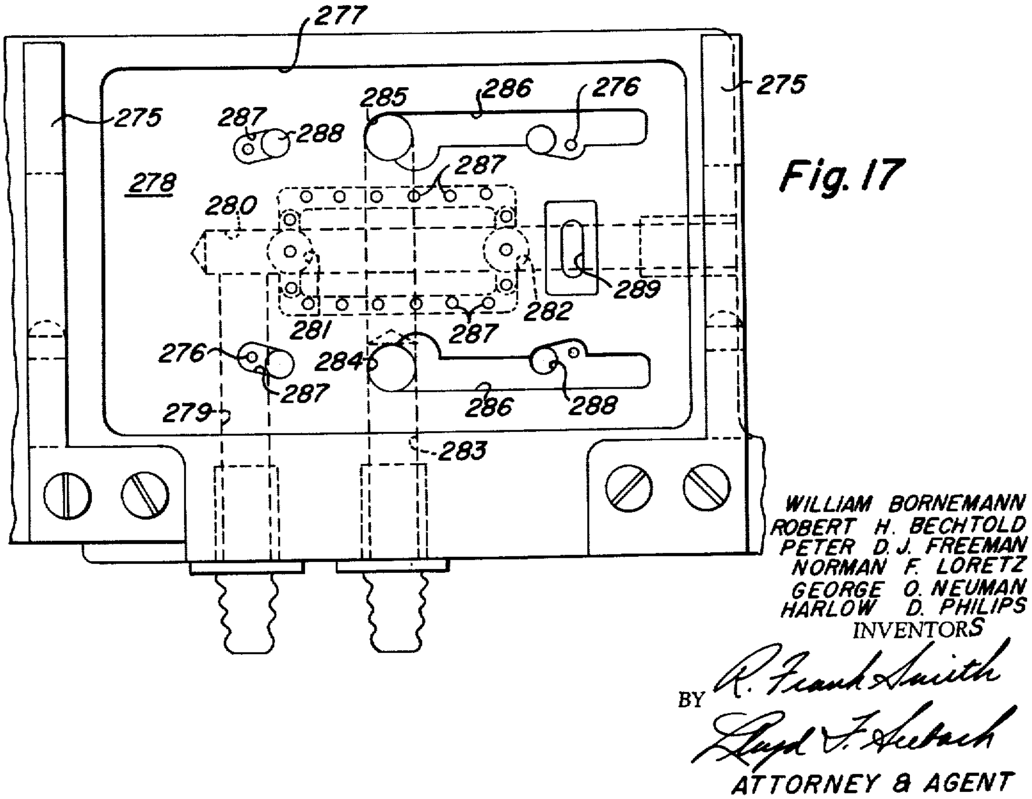
FIG. 17 is a detail bottom view of the means for clamping the film and element together during exposure and the arrangement by which the vacuum is connected thereto.

Directly over disc 35 at printing station 265, the pressure pad arm assembly 118 is pivotally mounted at 271 to plate 31. This assembly comprises a pressure pad for the film and a film gate and film locating means which are actuated in timed relation to the movement of the film into position with respect to the printing station 265. As shown in FIG. 16, assembly 118 is oscillated about its pivot 271 by cam 102 which is mounted on the end of shaft 98 and which extends through an opening 272 in the arm 273. The assembly 118 is biased by spring 274 into a position for engaging the card 10 in the printing station 265 and retains follower 266 against cam 102. Arm 273 is provided with two guide members 275 which extend across the film and with four guide pins 276 which serve to edge guide the film for movement with respect to the printing station 265 after exposure. Arm 273 is also provided with a recess 277 in which a pliable pad 278 is cemented or otherwise secured and which engages the element 10 as assembly 118 is moved toward and into engagement with the card. Arm 273 is also provided with a group of holes which are connected to permit a vacuum to be applied to the pad for retaining the film thereagainst as the arm 273 is moved away from card 10 after exposure. With reference to FIG. 17, a vacuum is applied via holes 279, 280, 281 and 282 to a plurality of holes 287 in the pad 278. Also by means of holes 283, 294 and 285, a vacuum is applied at the edge of the film strip to exhaust any air which might be trapped between the film strip and the card 10 just prior to engagement of the film and card before exposure. Pad 278 is provided with apertures 286 which are aligned with corresponding recesses in arm 273 to provide clearance for the resilient arms 262 and pin 261 on nest assembly 256. Also apertures 287 in pad 278 permit the guide pins on arm 273 to extend therethrough and the guide pins 260 on the nest assembly to enter the clearance holes 288 provided in the arm 273. A recess 289 in arm 273 and an aperture in pad 278 is also provided for pin 259. Just beyond the pressure pad, a film gate 290 is secured to arm 273. The film gate comprises two undercut members 291 and 292 and a resilient arm 293 which is secured to plate 294 and adjustable by means of screw 295. Immediately above arm 293 solenoids 154 are mounted and serve to withdraw the locating pin 296 on arm 293 from the aperture 14 in the film just prior to film movement. As assembly 273 is moved toward printing station 265, pin 296 serves to locate and register the film strip by engaging the aperture 14. However, as the arm 273 is moved away from the printing station 265, it is necessary to insure that pin 296 is completely removed from aperture 14 and for this purpose solenoids 154 are energized before film movement to completely withdraw pin 296 from the aperture. For threading the film strip through the printing station 265 it is, therefore, necessary to place the film on the guide members 275 and between the guide pins 276. Also the film must be threaded between the film gate members 291 and 292. As shown in FIG. 16, the film gate 290 also carries the edge notch lamps 145 which are mounted in a bracket 298 which is secured to the underside of member 291. Either or both of these lamps are energized to provide an exposed mark along the edge of the film to indicate the start of the reader strip, the end of exposed cards on the strip or that a particular card along the exposed strip is to be rejected.

Figure 20:
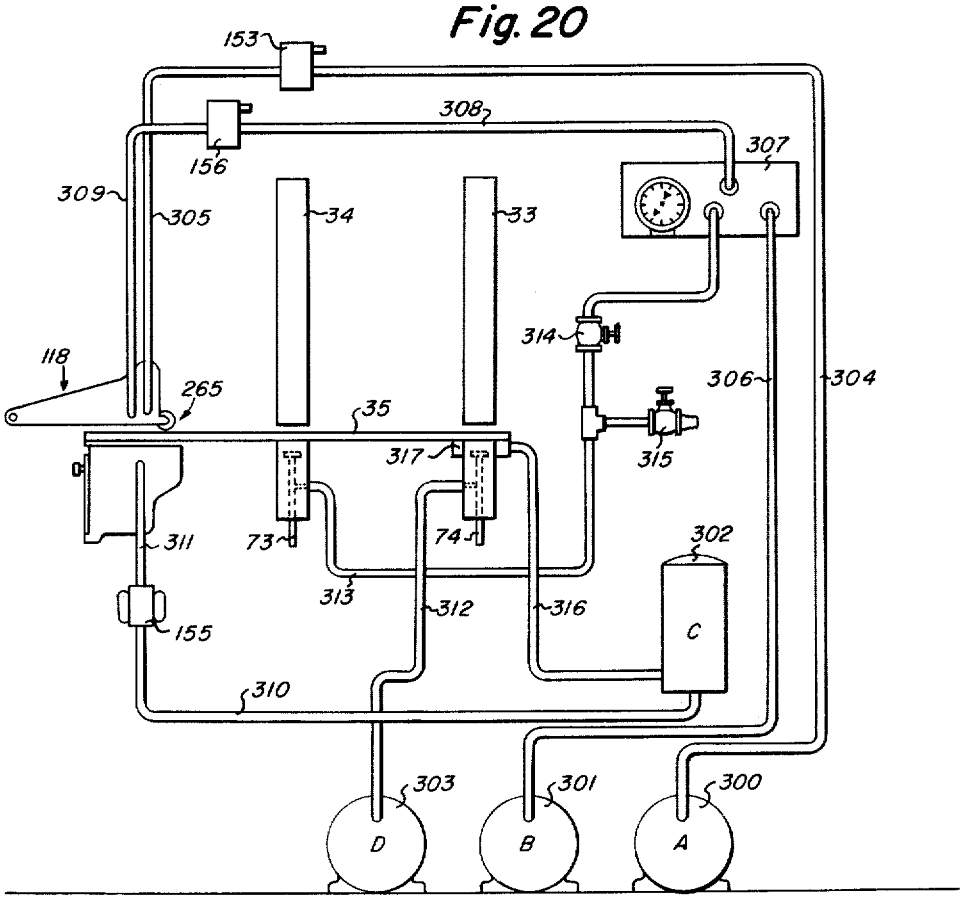
FIG. 20 is a schematic view of the vaccum system as applied to various elements of the duplicator unit.

As described hereinabove, reference has been made to vacuum systems for withdrawing and inserting cards 10 from and into magazines 33 and 34 and also for insuring separation of the card and the film strip in the printing station 265. This vacuum system is shown diagrammatically in FIG. 20 and comprises vacuum pumps 300, 301, 302, and 303. Pump 300 is connected by line 304 to solenoid valve 153 and by line 305 to assembly 118 in the printing station 265. Pump 301 is connected by line 306 to a reservoir tank 307 and by means of line 308 to solenoid valve 156 which, in turn, is connected by line 309 to assembly 118. Solenoid valve 153 is energized just before the film and card 10 are brought into contact to evacuate any air therebetween to insure intimate contact during the printing or exposure step. Pump 302 is connected by line 310 to solenoid valve 155 and by line 311 to the housing immediately below disc 35 and which contains the print lamp 152. Solenoid valves 156 and 155 are energized at substantially the same time to hold the card 10 in its nest assembly 256 and to hold the film strip against pad 278 after exposure and during the time that assembly 118 is moved away from disc 35. Pump 303 is connected by line 312 to plunger 74, the application of the vacuum to plunger 74 being controlled by a mechanical valve which is a part of plunger 74. By a similar mechanical valve, the vacuum from pump 301 via tank 307 is also connected to plunger 73 by line 313. A manual control valve 314 is arranged in line 313 which is also provided with a bleeder valve 315. Pump 302 is connected by line 316 to a block 317 which is arranged beneath disc 35 and adjacent plunger 74. The purpose of this vacuum is to insure retention of the card, which has been withdrawn from supply magazine 33, on disc 35 as it is moved through the first portion of its movement away from the supply magazine.

Plungers 73 and 74, one of which is shown in detail in FIG. 18, are identical in structure with the exception of the valve arrangement for controlling the time of application of the vacuum. Although plunger 74 is used only for withdrawing cards from the open-end receptacle 33 and plunger 73 is used only for inserting cards into open-end receptacle 34, they are similar to the plunger disclosed in U.S. Patent No. 2,811,352 which also contains a detailed description of a receptacle such as supply magazine 33 and receiving magazine 34 and the manner in which the cards are retained in, withdrawn from and inserted into such receptacle. Plunger 74 is provided with a resilient pad 86 having a concave surface and a central blind hold 87 which is connected by an elongated aperture 88 to vacuum line 312. The relationship of aperture 88 to line 312 is such that the vacuum is applied to plunger 74 just as it engages the lowermost element in magazine 33 and is maintained during the downward movement thereof until the card being withdrawn is positioned on disc 35 with respect to nest assembly 256 aligned with magazine 33. On the other hand, the relationship of aperture 88 in plunger 73 to line 313 is such that the vacuum is applied thereto as soon as plunger 73 starts its upward movement to engage the card on disc 35 and is maintained only during such upward movement and until the card is inserted in receptacle 34.

DUPLICATOR—CYCLE OF OPERATION

With reference to FIGS. 6–11, 20 and 21, a cycle of operation will be described without any reference to the various modes of operation of which the duplicator is capable. It will be understood from the description of the modes of operation that in some instances a card will remain in the printing station 265 for a number of cycles in accordance with the number of file words to be exposed in column 13. Accordingly, the cycle of operation about to be described will not take into account the various controls over the duplicator which are exercised and actuated by the programmer.

When the operator has actuated the start button, motor 36 is energized and through worm gear 45 and worm wheel 46 continuously rotates gears 48, 49 and 50. However, shaft 47 is the only shaft which is driven continuously and drive cams DC are also driven continuously through gears 61 and 62. With reference to FIG. 21, it will be noted that a cycle of operation comprises one revolution of shaft 63, and at the very start of each revolution, that is, at 0°, cam DC–1 energizes the card and/or film drive clutch solenoids KE–12 and KE–8 whereby shafts 52 and 51 are rotated through clutches 53 and 58 by gears 50 and 49. With the rotation of shaft 52, card cams CC are rotated as well as cams 69 and 70 which actuate plungers 74 and 73 for withdrawing a card from supply magazine 33 and inserting a card in receiving magazine 34, respectively. Likewise, shaft 51 rotates shaft 94 through gears 90 and 93 and thereby imparts rotation to film cams FC. Film motion occurs between 240° and 345° of the cycle with the card disc 35 being moved during this same period but overlapping slightly to lead and follow film movement. Pressure pad assembly 118 is in a raised position at the start of the cycle and moves downwardly toward disc 35 during the first 48° of the cycle. It remains in contact with disc 35 to retain the film strip and card 10 in intimate contact between 48° and 180°, again rising to its elevated position between 180° and 225°, and remaining in the elevated position for the remainder of the cycle during which time the film is advanced and disc 35 is rotated. During the period that the pressure pad assembly 118 is in its lowered position, exposure of the code in column 13 and contact printing of the card in printing station 265 takes place. The code to be exposed in column 13 can be derived from the card when positioned in reading station 160 or from the Flexowriter card tape. Cam FC–2 controls energization of the code target shutter 246 and exposure takes place between 90° and 145° of the cycle. Print lamp 152 is also energized during this same period by cam FC–6. Previous to this, that is between 10° and 40°, cam FC–3 energizes the code target bit solenoids 148 from either of the sources mentioned above. After exposure, cam FC–4 energizes the code target reset solenoids 149 during 200°–248° of the cycle. Cams FC–7, FC–9 and FC–10 control actuation of the vacuum solenoids 153, 155 and 156 to apply the vacuum to the printing station 265 and pressure pad assembly 118. From FIG. 21 it is evident that the vacuum applied for holding the film against pad 278 and the card on disc 35 is applied just before the assembly 118 starts to rise to insure separation of the film and card. Also the vacuum applied between the card and film is maintained from 30°–165° which is just previous to contact of the card and the film.

When duplicates are to be made of a group of cards, each card of the group must remain in printing station 265 until the required number of duplicates have been made in accordance with the number of different file words. As a result, there is no movement of disc 35 as the duplicates are made of each card, and in this particular case shaft 52 is held against rotation as well as card cams CC until the required number of duplicates has been made. However, film cams FC must complete a cycle or a single revolution in order that successive frames of unexposed film are moved into position with respect to the card in the printing station. The function of the various CC and DC cams with respect to the FC cams will become apparent from the description which will follow relating to the programmer and the control circuits associated therewith.

PROGRAMMER CIRCUITS

Before proceeding with a description of the programmer logic and the various controls exercised by the programmer, it is believed that a brief description of the various circuits utilized in the logic of the programmer should be described. In each instance the circuits are of the package type and are of the unit modular size with the exception of the core package. The same type of pin connector accommodates all of the packages and a connector key and package board slot combination prevents the insertion of the wrong package into a connector. With respect to FIGS. 25–40 in which the circuits are shown in detail, the connector points are designated by letters of the alphabet and the signal test points are designated by numbers. Also, in each of the drawings, the schematic designation for the circuit is shown alongside the circuit and this designation is used throughout FIGS. 42–68 for the programmer logic.

Figure 25:
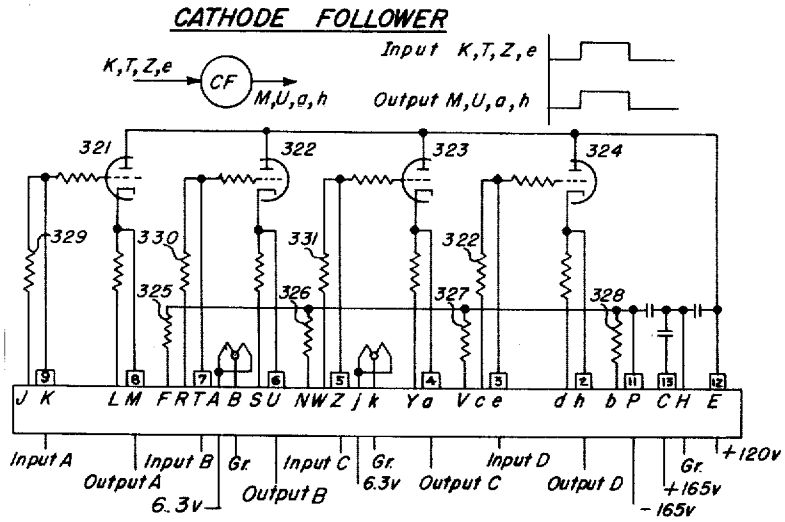
FIGS. 25–40 are schematic circuit diagrams of electronic packages used in the programmer.

The cathode follower package CF, see FIG. 25, comprises four cathode followers 321–324, four load matching resistors 325–328 and four input terminating resistors 329–332. The cathode follower is used for impedance transformation, isolation and for driver applications. The input resistor serves to terminate diode gates in coax cables. Each cathode follower output has two cathode resistors which are used in combinations for matching varoius load impedances. There is one input and one output signal for each of the four independent circuits.

Figure 26:
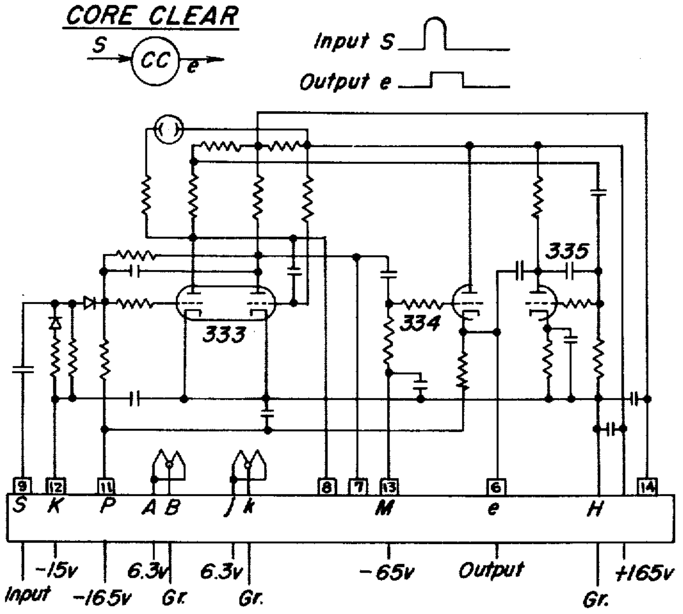

The core clear package CC, see FIG. 26, includes one 8 microsecond univibrator 333, one cathode follower 334 and one low impedance clamping circuit 335. The core clear circuit accepts a trigger signal and generates a possible pulse of eight microseconds duration which produces the long shift necessary for clearing the magnetic core units of the memory. In addition, this pulse supplies bias for the shift pulse driver tube 348 on the core package CS and is supplied through the output winding of the shift pulse former package PF. The normal load on this circuit is twenty-four core shift drivers. There is one input signal at pin S and one output signal which is brought out at pin *e*.

Figure 27:
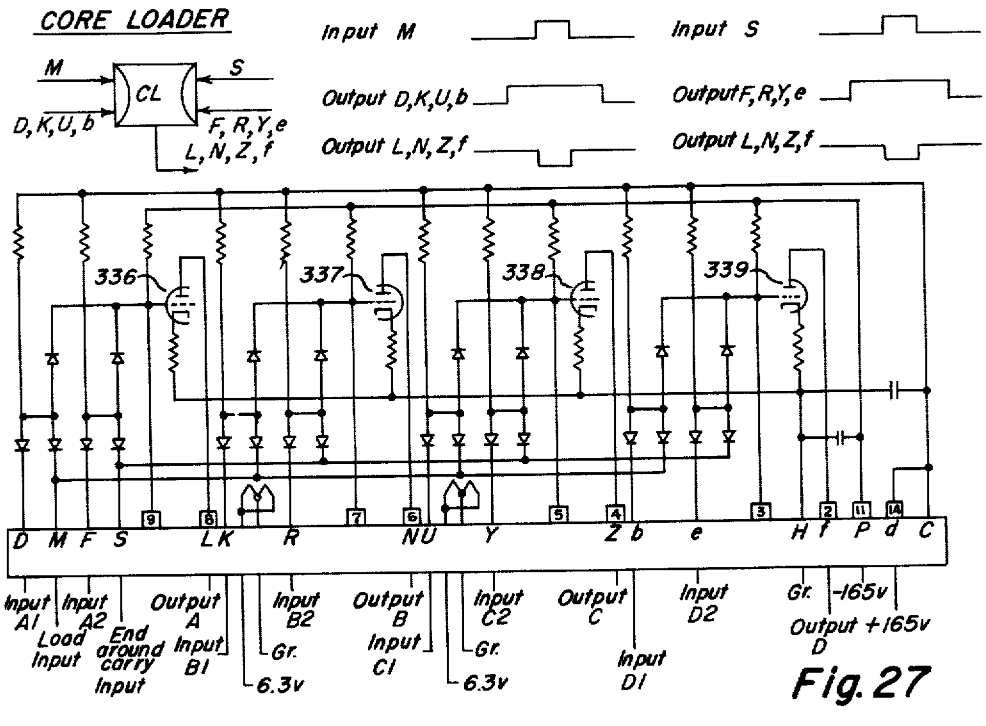

Four core load drivers 336–339, see FIG. 27, are included in the core loader package CL. These circuits provide the current required to load the core and this is accomplished by connecting the core input winding in series with the plate of the core loader tube. The cores are set to "one" by turning a tube on for a 10 microsecond period. Input gating is included on the package for selecting between two load inputs, one of the inputs being for recirculation of the memory and the other being for new load information. There are two input AND gates per loader circuit. One of the AND gates accepts the circulate load command and circulate bits, and the other AND gate accepts the command to load new information and the new bits. There is one output signal for each of the four independent circuits.

Figure 28:
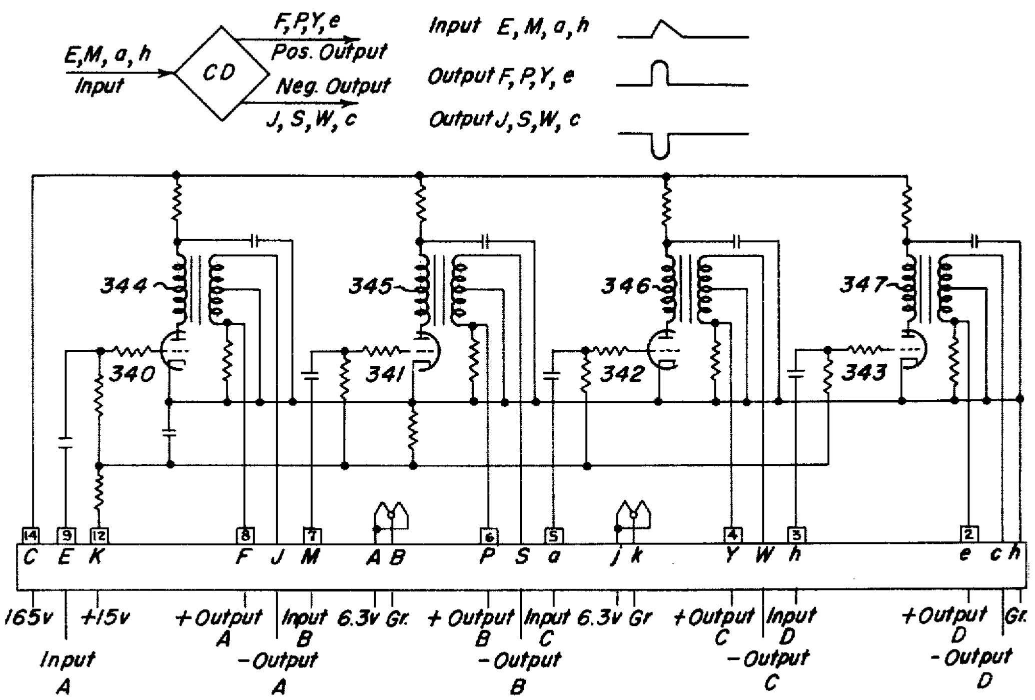

The core output driver package CD, see FIG. 28, includes four pulse amplifiers 340–343 and four output transformers 344–347. Each of the four core output drivers on the package consist of a special pulse amplifier designed specifically to accept pulses from the magnetic core output. These pulses are passed and amplified to provide a suitable transformer coupled output pulse for setting each stage of the forty-two bit flip-flop buffer register. There is one input signal for each circuit and there are two output signals for each of the four independent circuits.

Figure 29:
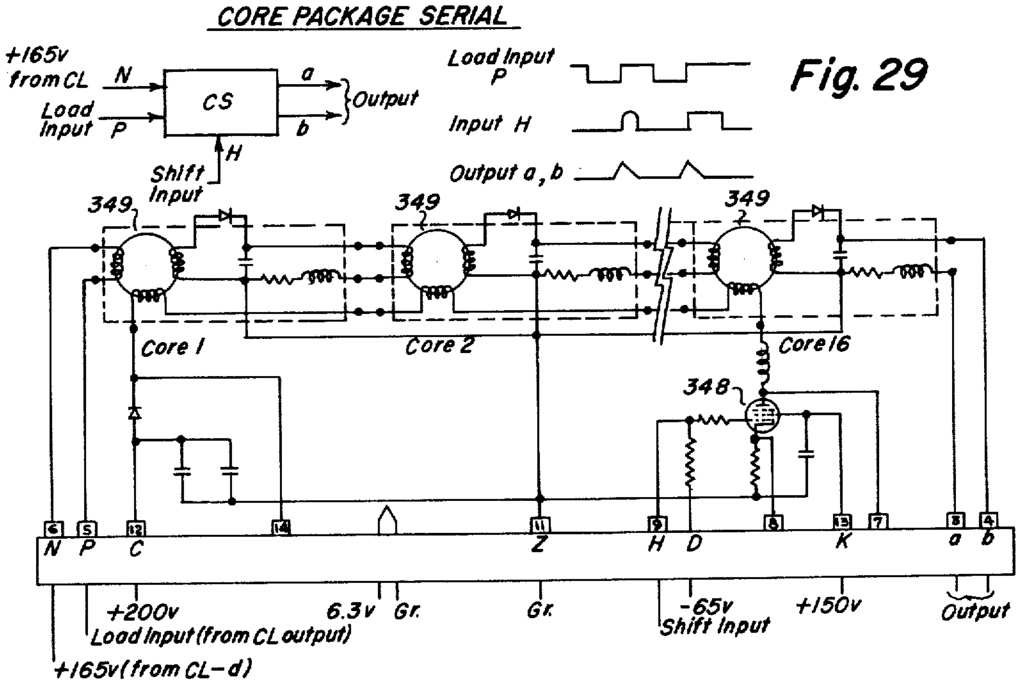

The core package CS, see FIG. 29, includes one shift driver 348 and sixteen magnetic core units designated by the numeral 349. The core package contains a magnetic core shifting register of sixteen bits' storage capacity. The input and output windings are brought out to the package connector to enable extending the bit storage capacity by sixteen bits for each package that is connected in series. Each memory register in the programmer is thirty-two bits in length and is shifted and cleared by the shift driver 348 which accepts shift signals from the pulse former PF and clear signals generated by the core clear package CC. A clear signal is a long shift pulse and bit information is loaded into the register by the core loader package CL. Output information from the register is shaped and generated at a low impedance level by the core output driver CD. There are three input signals applied to this circuit, the shift pulse being applied at pin H, the clear pulse at pin H and the load pulse at pin P. There is one output signal brought out at pins *b* and *a* and in order to obtain an output from the last package of the register it is necessary to connect pins *b* and *a* together at the package connector. When connecting packages in series, it is necessary to connect pin *b* of the first package to pin N of the second package and pin *a* of the first package to pin P of the second package.

Figure 30:
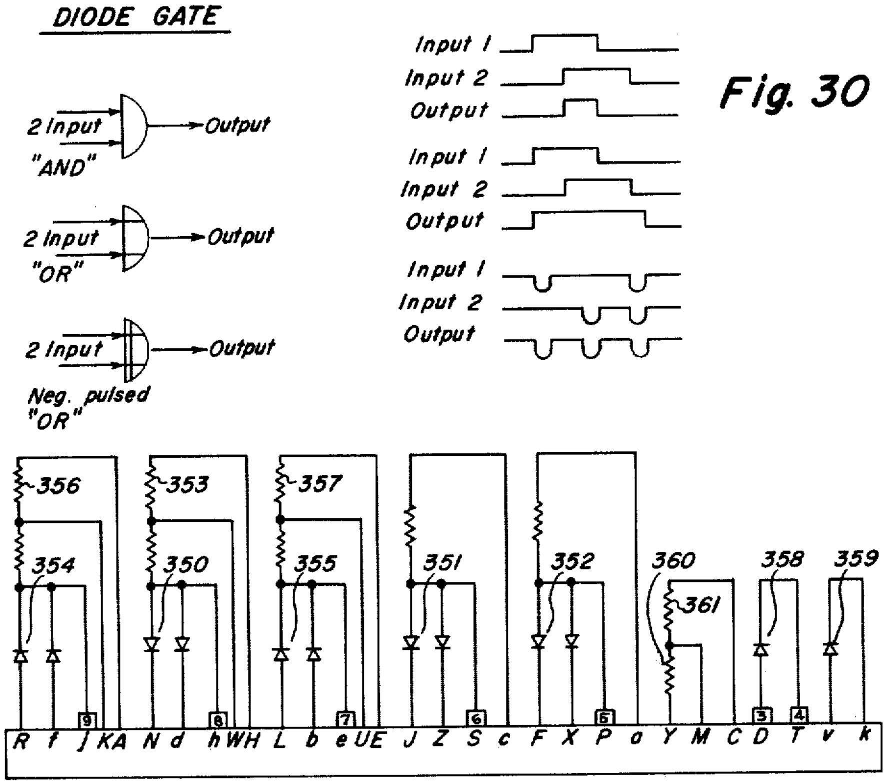

The diode gate package DG, see FIG. 30, comprises three 2 input diode AND gates 350, 351 and 352 (one with impedance matching resistor 353), two diode OR gates 354 and 355 (both having impedance matching resistors 356 and 357), two diodes 358 and 359 and two impedance matching resistors 360 and 361. This package contains an assortment of diode gates and resistors which can be connected in combinations to perform logical gating functions. The components are connected as required by jumpering leads on the connector, and impedance matching resistors are provided for matching over a wide range of loads. On this and the pulse gate package PG are located all the diodes used for logical gating in the programmer.

Figure 31:
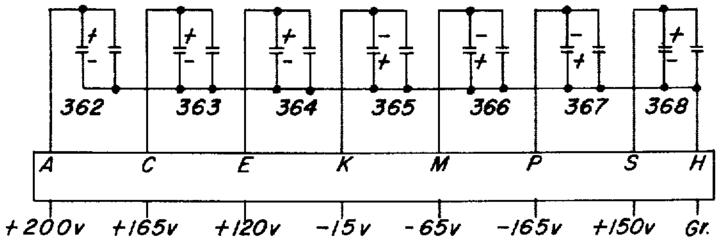

The filter package FC, see FIG. 31, comprises seven capacitor circuits 362–368 which are used to provide additional voltage filtering at points that are located too far from the power supply source to benefit from its low impedance. One such filter package is used in the programmer for filtering the voltages designated in FIG. 31.

Figure 32:
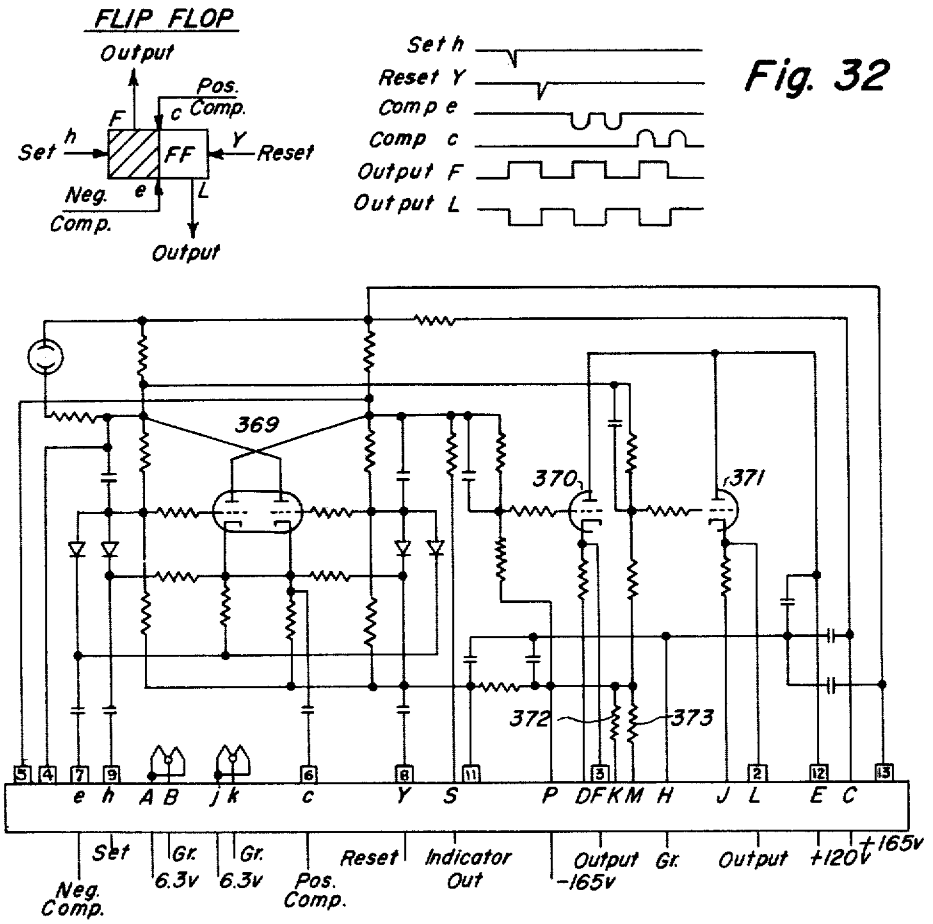

Flip-flop package FF, see FIG. 32, includes one flip-flop 369, two cathode followers 370 and 371 and two load matching resistors 372 and 373. The flip-flop has two states, the set or "one" state and the reset or "zero" state. Triggering the set input sets the flip-flop to the "one" state while a trigger on the reset input resets the flip-flop to the "zero" state. The flip-flop can be complemented by either a positive or negative trigger pulse. In the programmer, negative triggering is used for complementing flip-flops in every case except for the first flip-flop stage of the N counter. Both outputs of the flip-flop are coupled out by cathode followers 370 and 371, and two additional cathode resistors are provided on the package which can be combined or separately wired for matching load impedances. The flip-flop is used in the binary registers, the gated pulse counters and for controlling logical gates. There are four input signals, the set signal being applied to pin *h*, the reset signal being applied to pin Y, the positive complement being applied to pin *c*, and the negative complement being applied to pin *e*. There are two output signals, the "one" being at pin F and the "zero" being at pin L.

Figure 33:
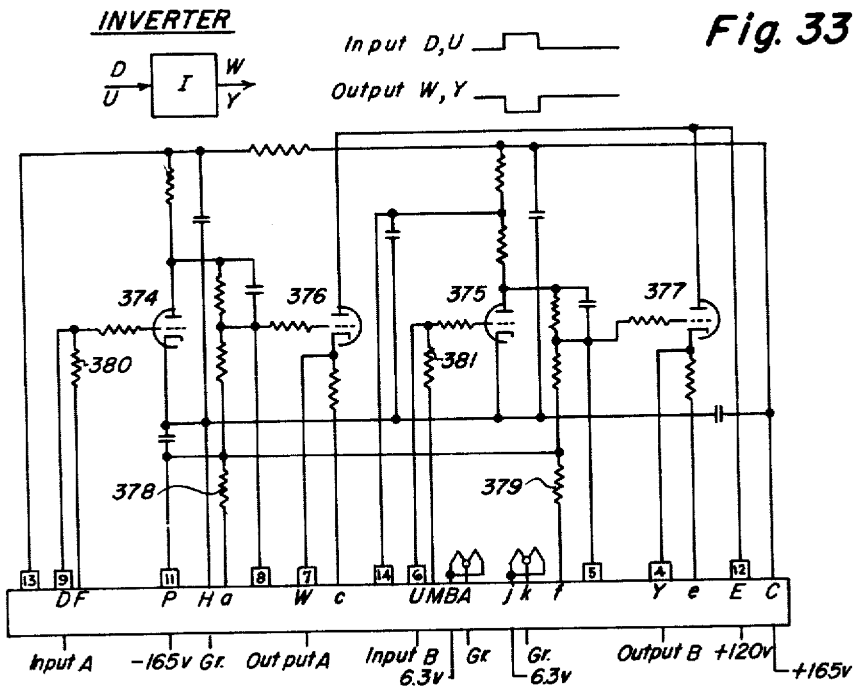

The inverter package I, see FIG. 33, comprises two inverters 374 and 375, two cathode followers 376 and 377 and two load matching resistors 378 and 379. Each inverter circuit accepts nominal inputs and produces the complement at nominal voltage levels. The output is brought out through a cathode follower and each follower has two cathode resistors which are used in combinations for matching various load impedances. Each inverter has an input resistor 380 and 381 which permits it to be used as a termination impedance for diode gate inputs. There is one input signal and one output signal for each of the two independent circuits.

Figure 34:
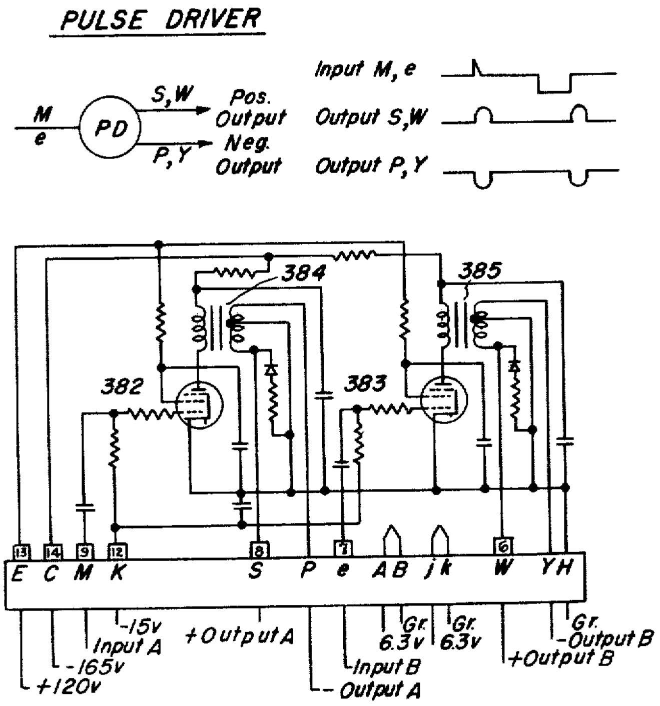

Two power amplifiers 382 and 383 and two output transformers 384 and 385 comprise the pulse driver packing PD shown in FIG. 34. This circuit accepts pulses from high impedance sources, amplifies the pulses and shapes them to pulses of two microseconds' width which is the standard triggering signal in the programmer. Output pulses of both polarities are transformer coupled out at a low impedance level and this output is suitable for driving loads through coax cables. There is one input signal and two output signals for each of the two independent circuits.

Figure 35:
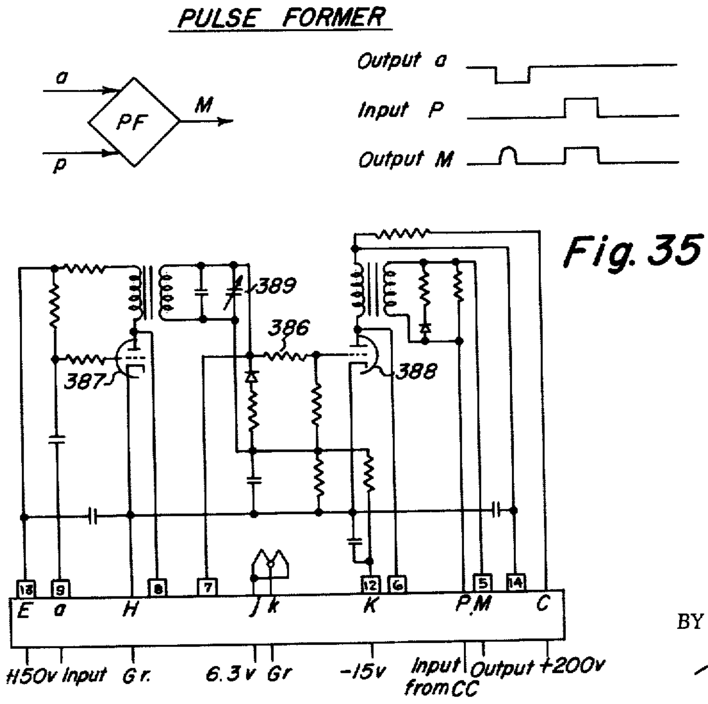

The pulse former package PF, see FIG. 35, comprises one pulse shaper 386 and two pulse amplifiers 387 and 388. This circuit provides a pulse with the necessary amplitude and shape to operate the shift driver tube 348 located on core package CS. The pulse width is critical for operation of the shift driver tube and is, therefore, adjustable by means of tuning capacitor 389. Each pulse former furnishes fixed pulses for four core packages. There are two input signals, one of which is applied at pin *a* for shifting the cores and the other which is applied at pin P for clearing the cores. There is one transformer coupled output signal which is brought out at pin M. The other end of the transformer winding is brought out at pin P and accepts the core clear package CC output which provides bias and "clear" pulses to the core shift drivers 348.

Figure 36:
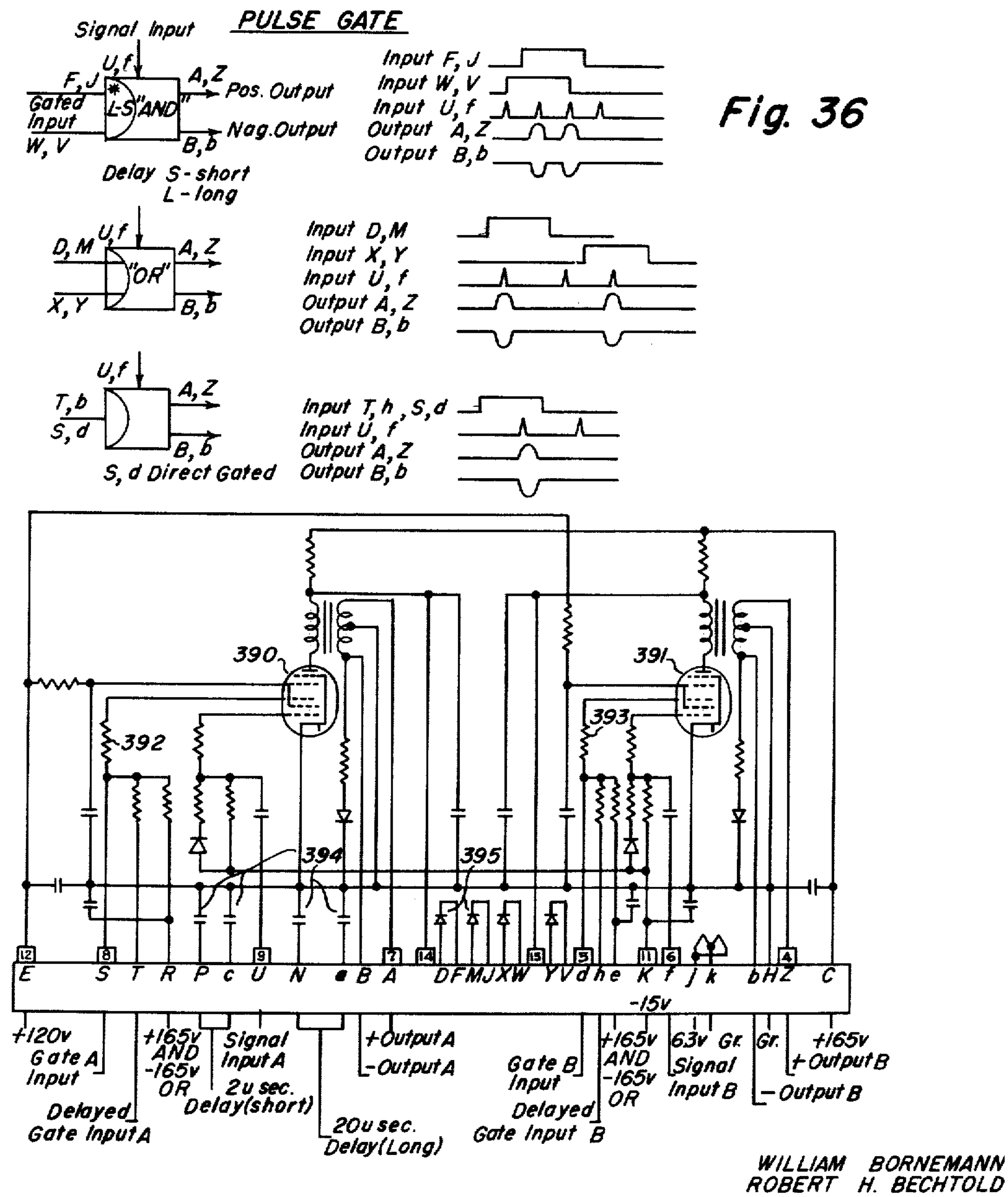

The pulse gate package PG, see FIG. 36, includes two pulse gates 390 and 391 and two delay networks including the combination of resistors 392 and 393, capacitors 394 and diodes 395. The pulse gate is a pentagrid tube used for coincident gating and the voltage state of the second control grid determines whether a positive signal on the control grid will generate an output pulse. A high voltage state on the second control grid allows an output pulse to be generated while a low voltage state inhibits the output pulse. Means for delaying the input voltage to the second control grid is accomplished by connecting a capacitor and resistor together as an integrator and placing them in series with the grid input. A choice of capacitors permits a two or twenty microsecond delay to be obtained, and either delay is used to prevent pulse slicing while the longer delay is used primarily for the gating in the flip-flop shifting register application. With the second control grid connected to ground, the pulse gate serves as a pulse amplifier or driver. There is one input signal and two output signals for each of the two independent circuits.

Figure 37:
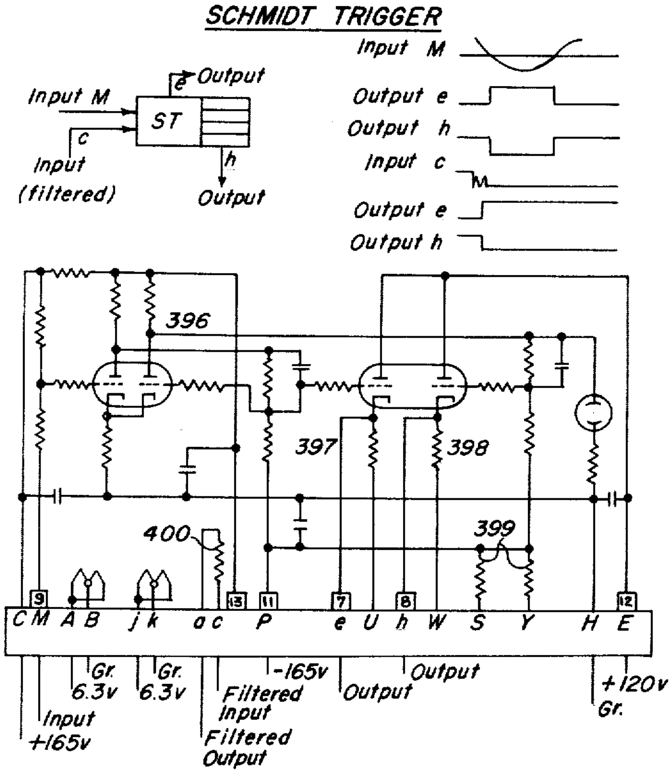

The Schmitt trigger package ST, see FIG. 37, includes one Schmitt trigger 396, two cathode followers 397 and 398 and two load matching resistors 399. This circuit accepts signals generated by switches, relay contacts and external input equipment. It converts these signals into pulses of standard amplitude and improved rise and fall times. An input filter network comprising resistor 400 and an externally located capacitor is provided for eliminating relax contact bounce. This circuit triggers on rising input levels and on falling input levels. The output signal that is inverted with respect to the input signal appears on pin *e* while an output with the same state as the input appears on pin *h*.

Figure 38:
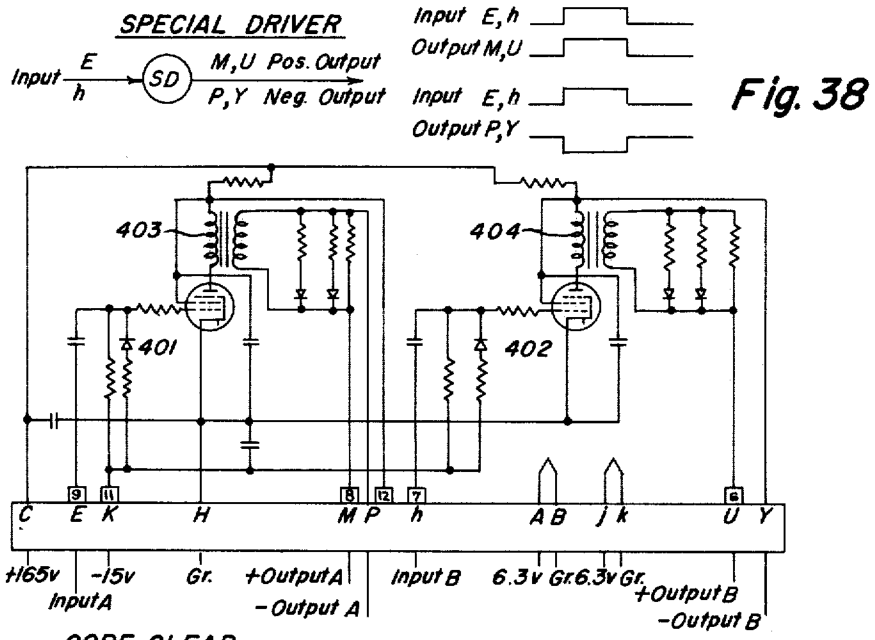

Two power amplifiers 401 and 402 and two output transformers 403 and 404 comprise the special driver package SD shown in FIG. 38. Ten microsecond pulses are accepted by this circuit from the univibrator circuit UV and generates pulses at a low impedance level which are suitable for driving core loader CL and pulse former PF. Both ends of the output transformer winding are brought out to the package connector to permit a choice of polarity and voltage reference for the output pulse. There is one input and one output signal for each of the two independent circuits.

Figure 39:
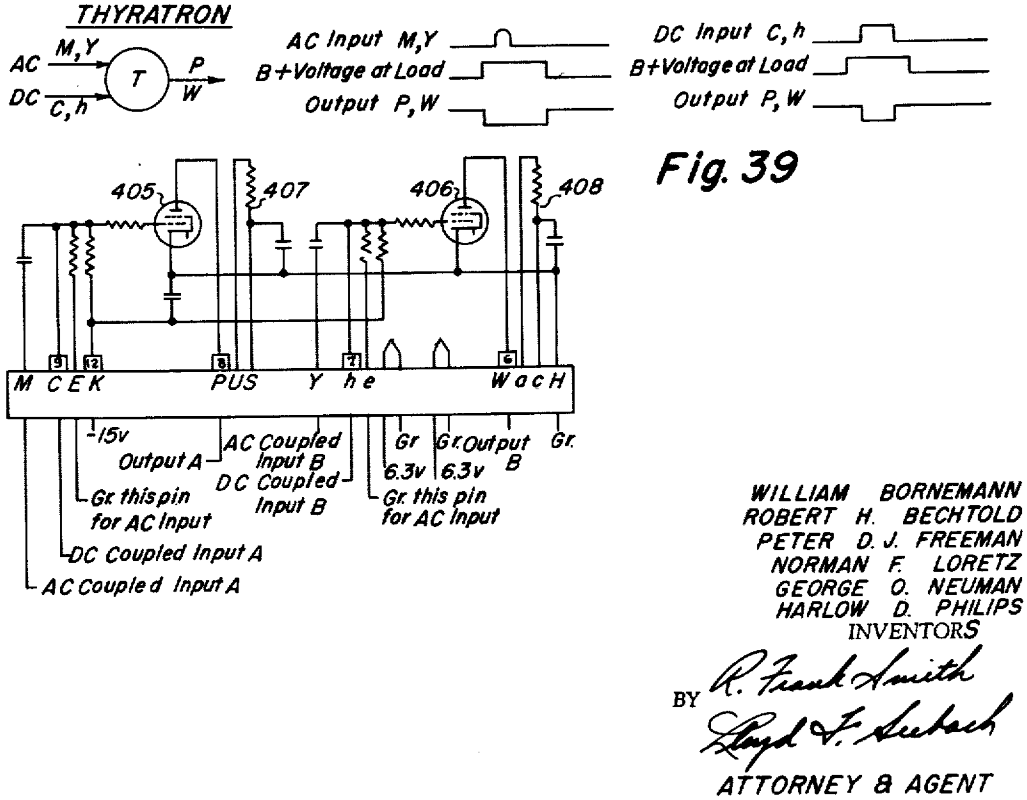

The thyratron package T, see FIG. 39, includes two thyratrons 405 and 406 and two plate decoupling networks 407 and 408. The thyratron circuit is used for driving relay coils and code target bit solenoids. Provisions are made for accepting pulsed or D.C. voltage changes as input firing signals. All the D.C. signals are supplied by either the flip-flop packages FF or relay contacts. The pulsed signals are supplied by either a pulse gate or a pulse driver circuit which is A.C. coupled to the thyratron circuit. The narrow pulsed signals are stretched to make them suitable for firing the thyratron by means of a network consisting of diode 395 and capacitor 394, both of these components being utilized from the pulse gate package PG. By utilizing plate decoupling networks, thyratron plasma oscillations are eliminated. There is one input signal for each of the two independent circuits and there is a choice of direct or A.C. coupling the input to the thyratron. There is one output signal for each of the two independent circuits.

Figure 40:
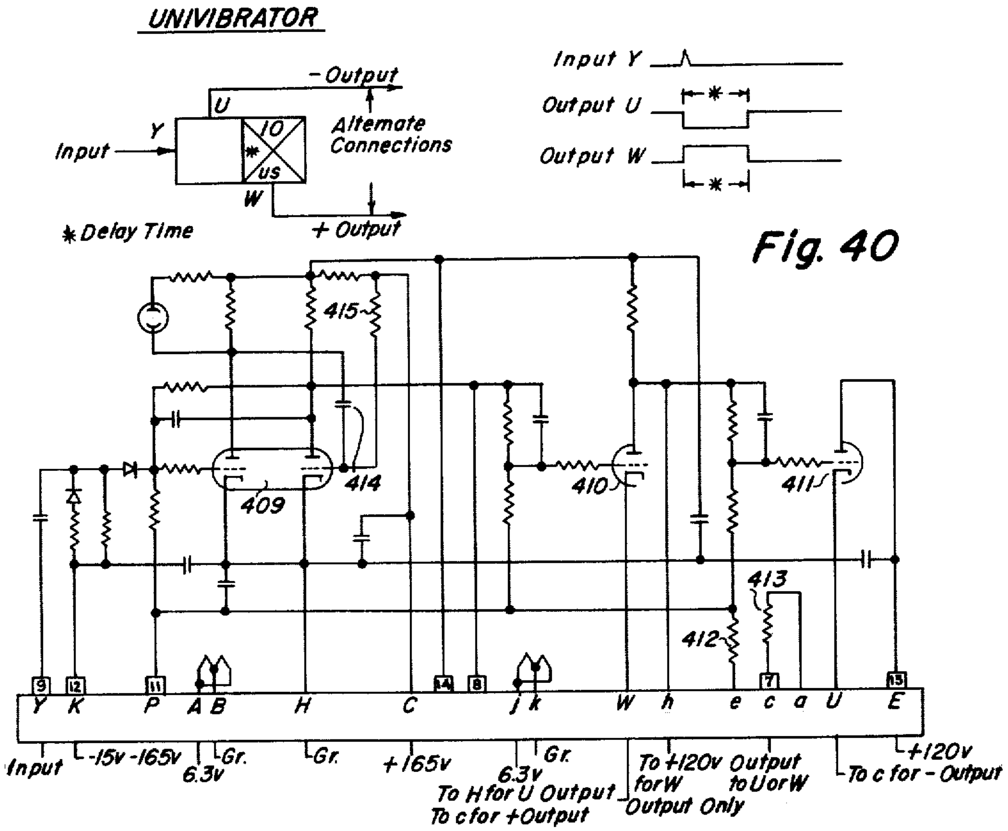

The univibrator package UV, see FIG. 40, includes one univibrator 409, one cathode follower 410, one inverter or cathode follower 411 and two load matching resistors 412 and 413. The univibrator serves as a delay generator, pulse shaper and driver for energizing relays. It triggers on positive going wave fronts and five such univibrator periods are used in the programmer. The values of capacitor 414 and resistor 415 can be varied to obtain the necessary microsecond period of delay for each package. Choice of output is provided by means of an inverter cathode follower combination connected to give either a positive or negative output. The output cathode follower has two resistors which are used in combination for matching various load impedances. Relays are energized by the negative output from a 200 millisecond univibrator. A diode is connected in series with the relay to prevent any positive output level from energizing the relay. There is one input signal and there is one output signal with a choice of pulse polarity. A positive output is obtained at pin W when pin *h* is connected to +120 volts and pin *c* is connected to pin W. A negative output is available at pin U when pin E is connected to +120 volts, pin *c* is connected to pin U and pin W is connected to ground.

CONSOLE

The duplicator console 25 shown in FIG. 2 provides the machine's main controls to be actuated by the operator and in addition to various circuits contained in the console, the control panel 26 is located on the top and at the right hand side thereof. The various switches on this panel allow the operator to control the functions of the duplicator programmer and some of these controls are duplicated on the control panel 28 of the duplicator unit. The console control panel 26 also contains an array of indicator lights 434 which indicate to the operator which of the non-start interlocks to check in case the machine will not start, or if the machine has been running, will indicate to the operator the reason for its stopping, see FIG. 5.

The timing mark on-off switch 420 controls the machine in mode A operations only and controls the generation of timing marks in the sort columns of the duplicates. The "M" check on-off switch 421 overrides the multiplicity feature and in the "off" position, which is shown by indicator 421', the machine will not detect a discrepancy between multiplicity number and the number of cards in a set. Each of the positions of the mode selector switch 422 modifies the machine's internal programmer and changing this switch from one mode to another automatically resets the initial clear circuits. Each of the two counters 423 and 424 on the control panel can be reset to zero by the reset knobs 425 and 426. All of the circuits are cleared or set to the state necessary to start operation by the initial clear out switch 427 and the machine will not start if this switch has not been actuated, as shown by indicator 427'. The start switch 428 is used to start initial operation and to restart the machine after an operational stop and can be overridden by the matching non-start interlocks and actuation of this switch is shown by indicator 461. The stop switch 429 allows the operator to stop the machine during operation and constitutes an operational stop from which the machine can be restarted without missing any portion of the normal program, actuation of this switch being shown by indicator 463. The off switch 430 returns the machine to an off condition in a predetermined sequence of the power inputs, and this condition is shown by indicator 430'. The standby switch 431 has an indicator lamp 431' and sequences the machine power to a point where D.C. voltage can be applied and will also return the machine to standby from the D.C.-on condition. The D.C. switch 432 also has an indicator lamp 432' and applies D.C. power to the machine in proper sequence and is effective only if the ready indicator 433 is lit.

In the event one or both of the magazine hatches in the indicator unit are not closed, this condition will be indicated by the open hatch lamp 456. If the lamp house 162 is not in its proper position, this condition will be shown by indicator 458. If the scanner lamp 164, code target lamp, 254 or contact print lamp 154, burn out, this condition will be shown by indicator 457, and the machine will stop if this occurs during operation. Other indicators are the indicator for blowing of any alarmed fuses 436, an excessively high temperature within the programmer 437, failure of the duplicator unit to index a card into the reading station 469 and a film supply below a minimum preset level 460. In addition to these indicators, if all information on the input tape has been processed 468, information is accidentally lost from the memory 467, or if there is a disagreement between the DN on a card and the corresponding group of tab input data 466, these will also be indicated to the operator on the control panel. When the "M" check is in the "on" position, the operator can determine when the set of cards has been completed 438, when there are more cards with the same DN in succession than the "M" number on the leading card indicates 465, or there are fewer cards with the same DN in succession than the "M" number on the leading card 464. The N and P indicators 435 designate the type of card from which the sets are being generated. Also, when the initial clear out has been actuated, this is indicated to the operator and indicates that all circuits have been cleared or set preparatory to starting. As soon as the machine is started in operation, the start indicator 461 goes on and goes out when the machine has come to a stop. Likewise, the stop indicator 463 is energized when the machine is stopped and de-energized when the machine is cleared or started. Counters 423 and 424 in the upper righthand corner of the control panel indicate the number of cards passed through the reading station and the number of duplicates made, respectively. As described above indicators 430′, 431′, 432′ and 433 indicate the power conditions within the machine as well as the standby and ready condition of the machine.

FLEXOWRITER

The Flexowriter 27 is a commercially available unit and is of the type disclosed in U.S. Patents 2,700,445, 2,700,446 and 2,700,447. The Flexowriter 27 is located on the operator's console 25 and derives its power from the duplicator unit. As a result, the D.C. supplies of the duplicator unit must be on and the machine initially cleared before the Flexowriter will function. In Modes B2 and B3 the Fexowriter is used for file word type-out. In the C modes the Flexowriter reproduces in typewritten form the information read into the programmer from punched paper tape. In the D modes the Fexowriter is used for type-out of card code words. In the event of an alarm type-out, the Fexowriter will carriage return and type the DN stored in the memory at that time and this will occur due to a multiplicity error (too many cards or too few cards) and in the event of a DN non-compare (Mode C3 only).

Figure 67A:
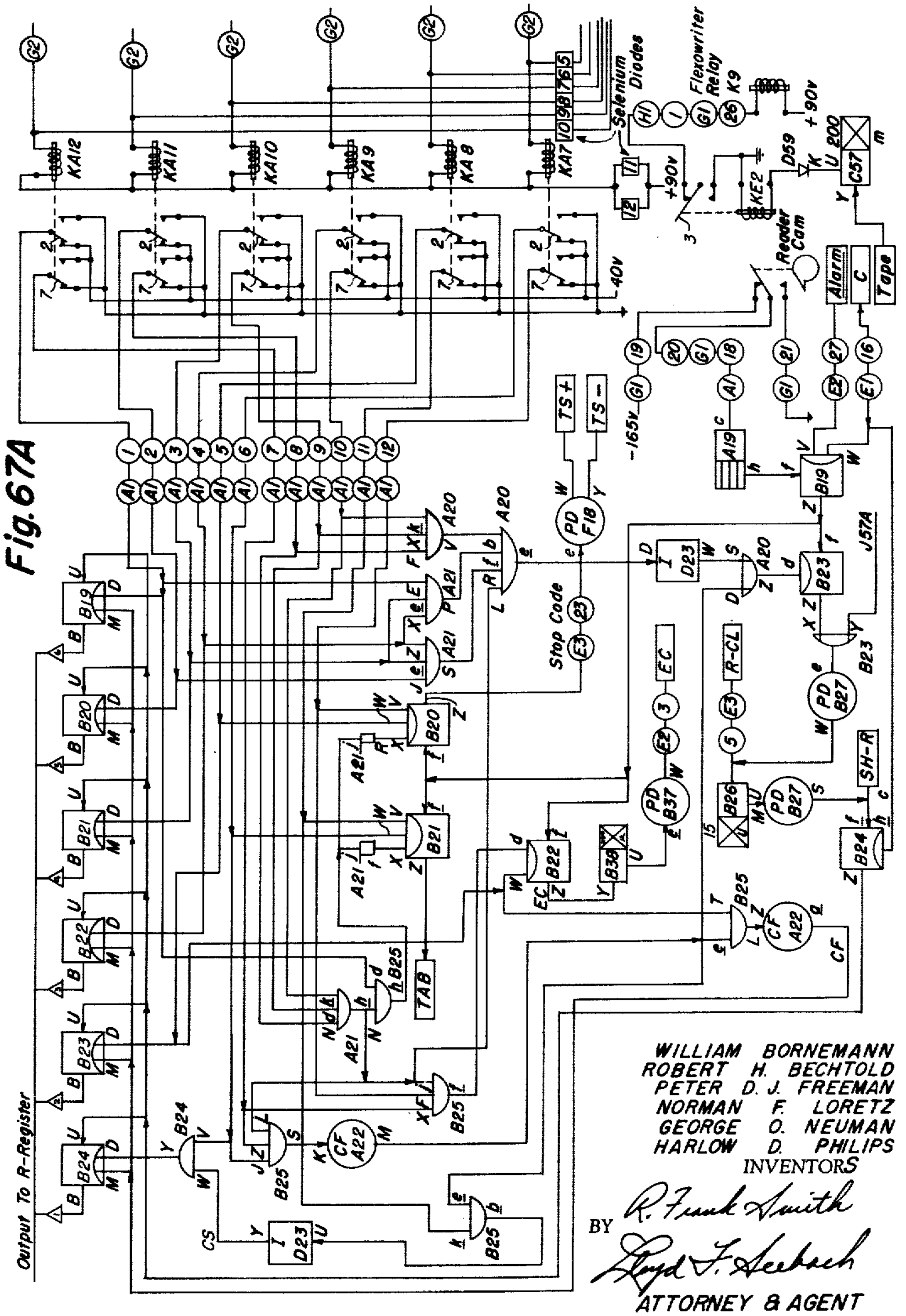
Figure 67B:
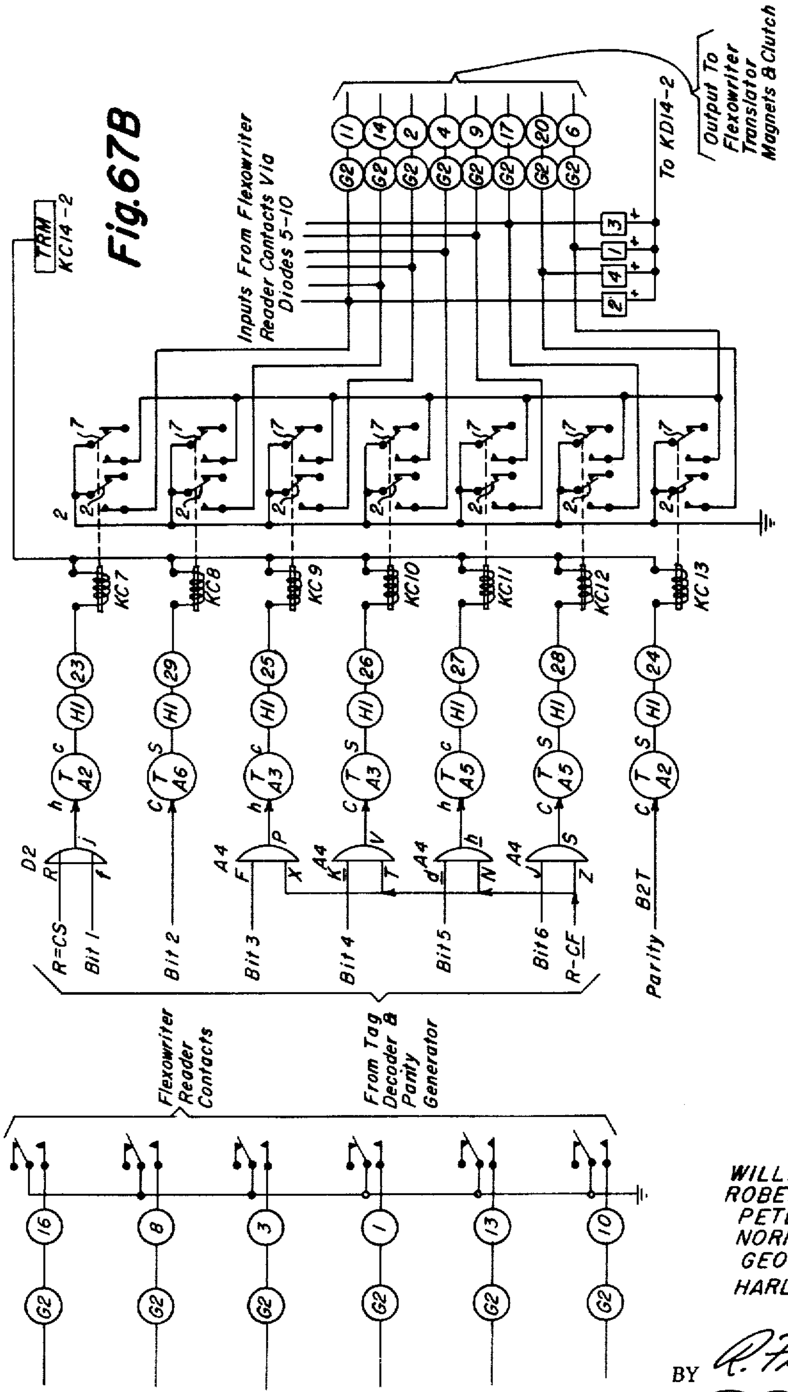
Figure 67C:
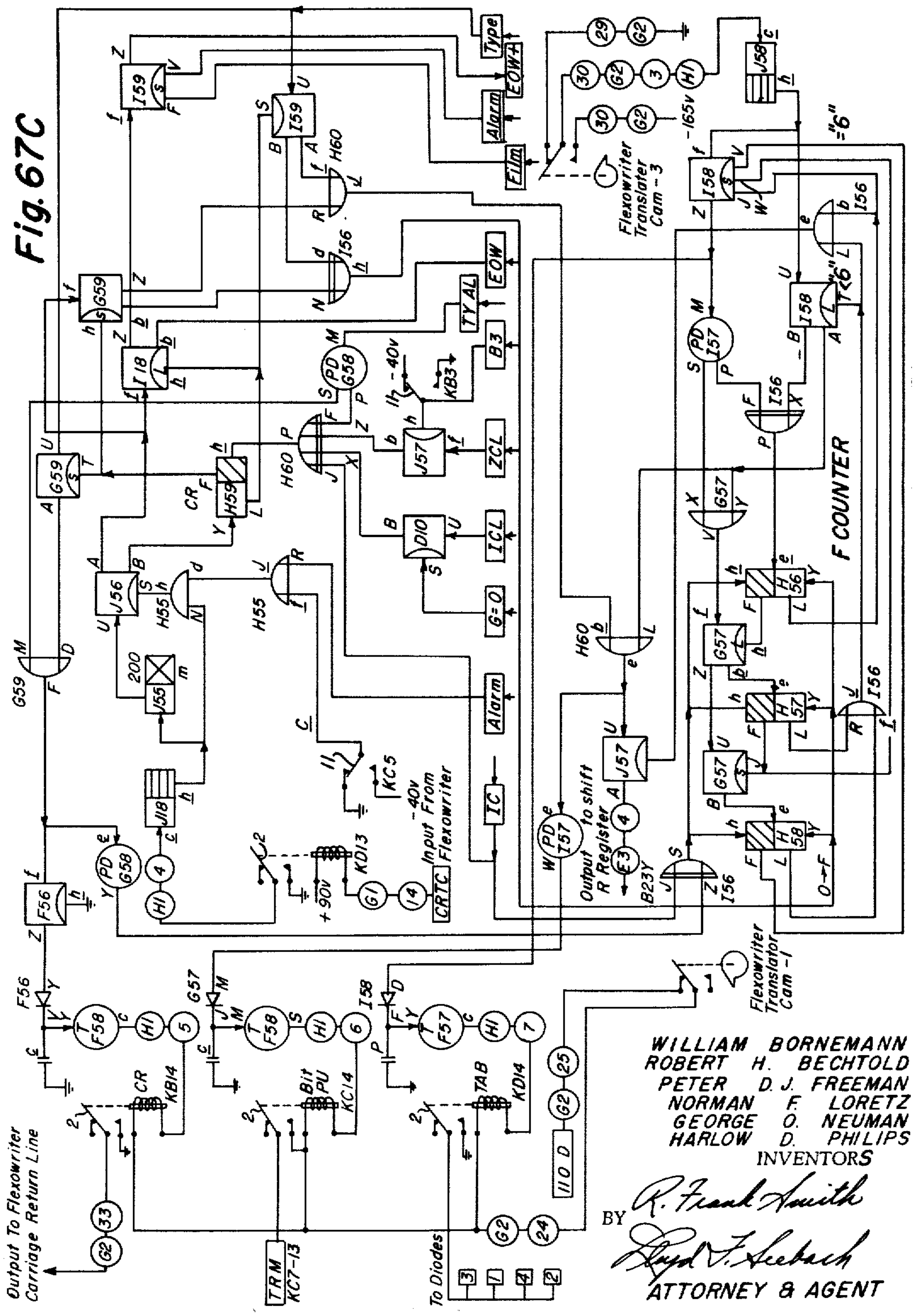
Figure 69:
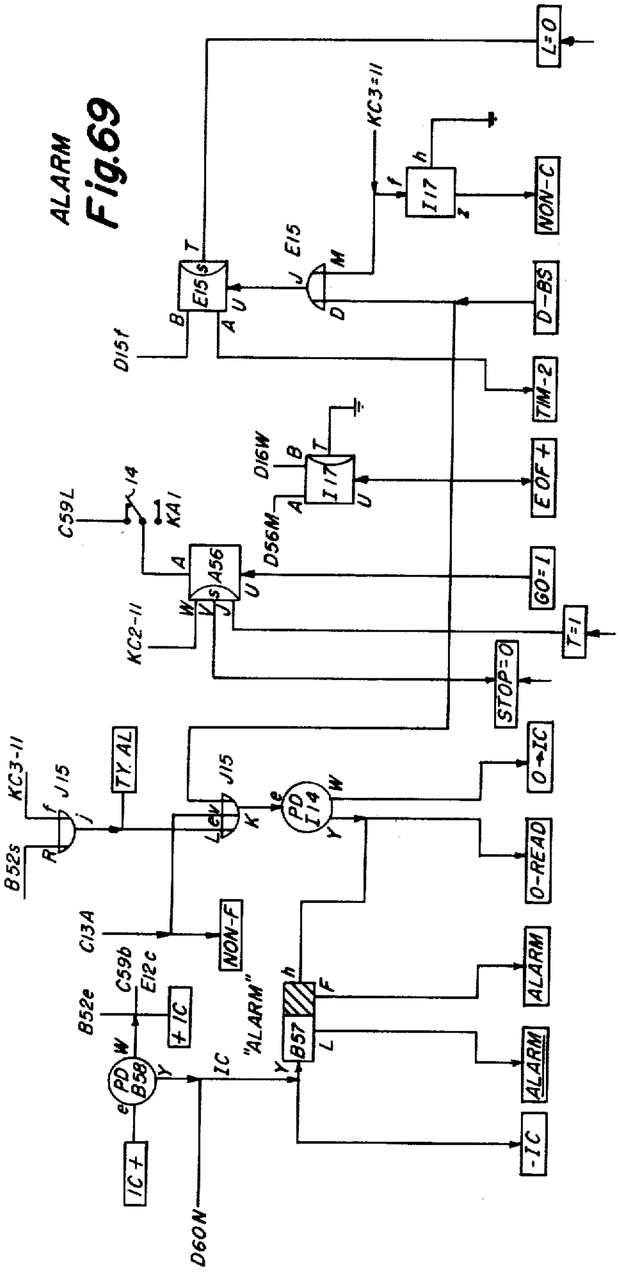
Figures 67D, 67E:
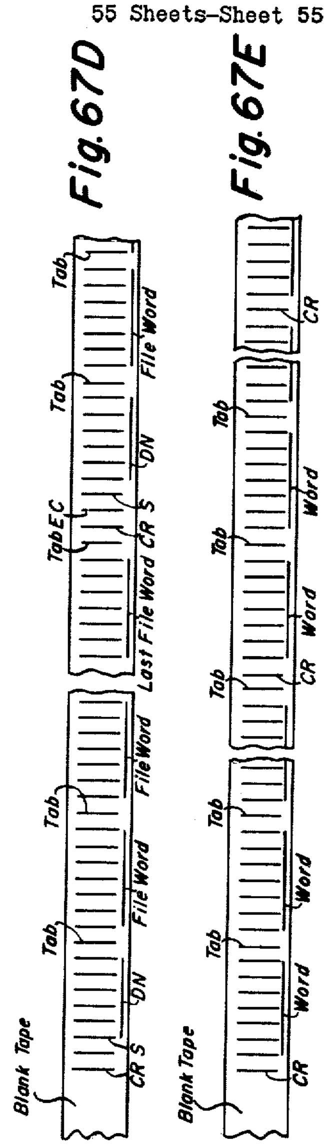

The Flexowriter tape format for the input, as used only in the C modes comprises a CR (carriage return) code which is followed by the S tag and the DN, each of the following file words being preceded by a tab code Tab with an end of code EC following the last file word, see FIG. 67D. For the Mode C1 only one group of file words is necessary and the DN must be designated by ØØØØØØ. For the Modes C2 and C3 the first word of each group of words must be the DN of the set to be selected. The maximum number of file words in each of the C modes cannot exceed thirty-one.

When the Flexowriter is used as an output device to type out code words and to provide a tape format for vertification of the file words typed out, its format is somewhat altered and consists of changes in the format of the relative positioning of the Tab stops and the position of the automatic Carriage Return stop. This permits control over the number of words to the line on type out and the position of the words on the line. Generally, every word is followed by Tab and every word group is preceded by CR, see FIG. 67E, the significance of a word group depending on the particular mode of operation involved. In Mode C1 the document number tag must be S but the remaining characters may be any six alphanumeric (or CF or CS) characters. In Modes C2 and C3 the document numbers must be in the same order as the corresponding cards in the input magazine. An extra CR may appear after any Tab or EC due to the automatic Fexowriter carriage return and will be dependent on the Flexowriter tab settings and the amount of data typed out. The format of the tape for Mode B, C, and D is shown in FIGS. 67D and 67E.

As shown in FIG. 67D, the first word contains the S tag and the DN. Each word thereafter is preceded by a Tab and the last word of the group for the first document is followed by a Tab and an EC to designate the end of the set. In the Modes C, therefore, the first word of each group of words must always be the S tag and DN. In Modes B2, B3 and all of the Modes D, the carriage return CR will be located in accordance with the number of file words to be typed out on a line which can vary depending on the number of file words for a card and the desired number of file words to be typed out on each line. In Mode B3, for example, the minimum number of file words can be two and the maximum thirty-two, and in Mode D1 the maximum number of words can be ninety-eight.

PROGRAMMER—MODE DESCRIPTION

As described briefly above, the duplicator is capable of operating in ten different modes and the programs for these operations are permanently wired into the programmer. Assuming that the operator has positioned the proper cards in the supply magazine, the following description relates to the function, operator's steps and machine action for each of the modes of operation.

In Mode A the duplicator makes one duplicate of every card in the supply magazine 33. The operator sets the mode selector 422 to Mode A, turns the power on, sets the initial clear out 427 and actuates the start button 428. The machine makes the leader, edge marks film (leader code) at the end of the leader, indexes the card disc 35, makes one duplicate of every card detected at the reading station 160, counts the cards handled and the duplicates made, and program breaks leading to stopping of machine operation can be due to out-of-film, stop button actuated, or card non-feed.

For Mode B1 the programmer selects and stores the S, T and all numeric code words appearing on the leading card of the set to be duplicated. The duplicator unit makes one duplicate of each card of the set for each of the file words associated with that set. Each duplicate has the appropriate file word added to its sort field 13 and the number of numeric tag code words appearing on a card is limited to thirty. The operator's steps are the same as those in Mode A with the exception that the mode selector 422 is set to Mode B1. The machine makes the leader, edge marks the film (leader code) at the end of the leader, indexes the card disc 35, scans the reading station 160 for presence of a card, reads the card storing the S tag code word, the T tag code word and any numeric tag code word, indexes the card from reading station 160 to printing station 265 and makes duplicates adding the stored code words into the sort field 13 with one duplicate per code word, counts the cards handled and the duplicates made, resets the storage for first cards of a new set (different DN) and resets indexing for all cards of the same set (same DN) and initiates program breaks which lead to stopping of machine operation due to out-of-film, actuation of the stop button, card non-feed (set completed), memory error, and too many or too few cards in the set (multiplicity error).

Mode B2 is substantially the same as Mode B1 with the additional feature that the Flexowriter 27 types the DN once for each set as it is being duplicated. Mode B3 is also substantially the same as Mode B1 with the additional feature that the Flexowriter types all words associated with each set of cards once for each set that is being duplicated.

In Mode C1 the programmer stores one group of file words from a prepunched Flexowriter tape and then makes one duplicate of each card in the supply magazine for each stored file word. One file word is added to the sort field 13 of each duplicate. The operator sets the mode selector 422 to Mode C1, feeds tape into the Flexowriter 27, turns the power on, sets the initial clear out 427 and actuates the start button 428. The machine makes the leader, edge marks film (leader code) at end of leader, starts the Flexowriter tape reader, reads the tape, stops at EC (end of code), indexes the card disc, scans the reading station for the presence of a card, finds the card, indexes the card to the printing station and makes duplicates adding the stored code words into the sort field 13 with one duplicate for each code word of every card in the supply magazine 33 and program breaks due to out-of-film, stop button pushed, card non-feed or memory error.

For Mode C2 the duplicator unit makes a duplicate of each card of a selected set for each of the file words associated with that set. The groups of file words each preceded by its associated DN are supplied from the Flexowriter tape. The groups of file words on the tape must be in the same order as the selected sets of cards in the supply magazine. The sets are selected by DN and not all sets of cards in the supply magazine need be selected, the sets that are not selected being bypassed into the receiving magazine 34. The operator's steps are the same as those with respect to Mode C1 with the exception that the mode selector 422 is set to C2. The machine action comprises making the leader, edge marking the film (leader code) at end of leader, starting the Flexowriter reader to read the tape and to load the first group of file words into the memory and stopping at EC, indexing the card disc, scanning the reading station 160 to find the card, searching for the set with the DN which is the same as the group in the memory by indexing the card disc until the DN compare is equal, finding the selected set and indexing the card to the printing station to make duplicates and adding stored code words into the sort field 13 with one duplicate per file word. Repeating the step of searching for the first card of a set with a different DN, reading the next group of file words from the tape into the memory, repeating the indexing and initiating program breaks due to out of film, stop button actuated, card non-feed (set completed), tab stop, memory error and too many or too few cards in a set (multiplicity error). Mode C3 is substantially the same as Mode C2 with the exception that all sets in the supply magazine must be selected and presence of a nonselected set will cause a DN non-compare which results in a program break.

The Flexowriter 27 types out all code words on every card in the supply magazine for the Mode D1, and no duplicates are made. The operator's steps are to set the mode selector 422 to D1, turn the power on, set the initial clear out 427 and actuate the start button 428. The machine indexes the card disc 35, scans the reading station 160 for the presence of a card, reads the card, stores the code words, types out the entire content of the card and repeats this action for each card. The program breaks are initiated by the stop button 429 being actuated and card non-feed.

Mode D2 is similar to Mode D1 except that the Flexowriter types out the code words in the fixed field only. Mode D3 is also similar to Mode D1 with the exception that the Flexowriter types out only the document numbers (DN).

PROGRAMMER—SYSTEMS CONTROL

Figure 41:
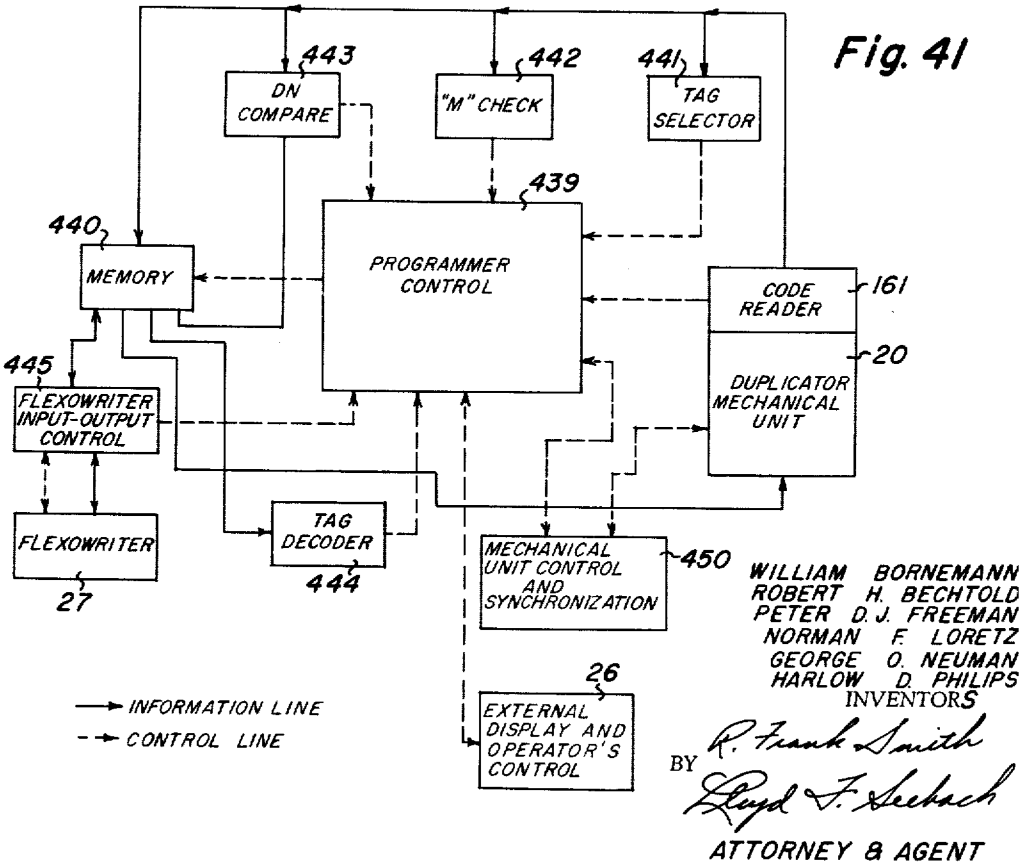
FIG. 41 is a block diagram showing the flow of information and controls for the various elements of the duplicator.

The machine may be best described in terms of the block diagram shown in FIG. 41 in which the information sensing blocks, control blocks and functional blocks are shown. Solid lines between the different blocks indicate the flow of information and the dash lines indicate the flow of control signals. The information sensing blocks give the control blocks information on which to base its commands, the control blocks being more complex. The control blocks must inspect all the information available to them including timing and synchronization information from the functional blocks and must make decisions affecting the control of the functioning blocks.

The most clearly defined blocks are the functional blocks consisting of the memory 440, Flexowriter 27, duplicator unit 20 and code reader 161. These are the blocks that accomplish the obviously necessary functions of the machine and each of these units has its own rate of operation and runs asynchronously with respect to the other. However, they provide timing signals to their respective control blocks and in the duplicator unit 20 and the Flexowriter 27 these signals are generated by cam driven switches. In the code reader the timing signals are derived from photoelectric circuits and the method of synchronization of the memory is integrated with its logical mechanization.

The information sensing blocks are the tag selector 441, "M" check 442, DN compare 443, tag decoder 444 and the Flexowriter input-output control 445. The tag selector 41 inspects the tag bits 1–6 of the information from the code reader to detect the presence of S, Z and numeric tags. It informs the program control when an S tag word appears, and since the S tag appears with the DN, the presence of this tag is one of the required conditions for a DN compare. The Z tagged word is used in performing the multiplicity check, and the S and any numeric tags are also recognized as being required for file words in certain modes of operation. The information presented by the tag selector is modified by the information presented by other blocks in order to cause the programmer control 439 to generate the proper commands for the particular mode of operation.

The "M" check block 442 can check the document multiplicity in Modes B1, B2, B3, C2 and C3. In the Z tagged code word, the characters in positions three and four indicate how many cards there are in the set representing that document. The programmer control 439 inserts this number into a two decimal digit (eight bit) counter in the "M" check block and this counter is an electronic flip-flop type. Each time a card of the same set (same DN) is presented, the counter counts one and for the "M" check to be correct the counter must have counted down to zero when the first card of the next set is recognized. If this is not the case, the control indicates the error and initiates a program break, as described above with respect to the modes of operation. The "M" check may be bypassed by turning the "M" check on-off switch 421 on the console to the "off" position. When this is done the programmer does not recognize any discrepancy in the number of cards in a set.

The DN compare 443 compares the document number on the card in the reading station against the number in the memory output-buffer register. The comparison is made by checking on thirty-six bits (the word less the tag) one by one for equality. If required, the control will inspect this block when the tag decoder 444 informs it that the word in the memory output register 446 is tagged S and the tag selector 441 indicates that the code reader 161 is scanning the S tagged word on the card. A signal generated by the timing mark coincident with the S tagged word determines the equality or inequality of the two words. On the basis of this comparison and the information from the "M" check counter, the programmer control can decide whether or not a discrepancy exists in the number of cards in the set and what action to take.

The tag decoder 444 performs a job similar to the tag selector 441 and inspects the tag bits from the memory output buffer register instead of from the code reader as in the case of the tag selector. It informs the programmer control 439 when the S tag word appears in the memory output register and also indicates the presence of tags other than S as well as the absence of tags. This information is used by the programmer control to control the memory 440 and to carry out the program.

The Flexowriter input-output control 445 serves the dual function of control and information sensing. It performs the function of an information sensing block in the C modes in which the Flexowriter 27 is used as an input device and decodes the Flexowriter tape information in order to distinguish between coded information data and Flexowriter machine commands. Character space CS and character fill CF are further translated into the card format, that is CS becomes all zeros and CF becomes all ones. End of code EC, Tab, and stop code SC must each be decoded and presented to the program control when they occur. The special characters back space BS, carriage return CR, code delete CD and type space TS must be ignored. The coded information characters are fed serially (six bits in a parallel) into the memory output buffer register and when a complete word has been fed into the register the Tab command which follows the word on the tape causes the program control 439 to load the word from the register into the core memory. When the Flexowriter 27 is used as an output device, the input-output control 445 performs another information sensing task, that is, the generation of the parity bit required by the Flexowriter translator. The parity bit is generated as each character is inspected as it presents itself for typing. If the character has an even number of ones in its code form, a one parity bit is generated. On the other hand, if the character has an odd number of ones in its coded form, a zero parity bit is generated.

The control blocks as previously mentioned contain the decision making elements which include the Flexowriter input-output control 445, the mechanical unit control 450, the operator's control 26 and the program control 439. These controls assume the information available from the blocks to which they are connected and then initiate the correct signals to carry out the program. The machine's internal program consists of a chain of events which are synchronous and coincident. For example, if the programmer control 439 calls for a block of information from a Flexowriter tape input in a C mode, the Flexowriter reader will be started by the Flexowriter input-output control 445. The last character on the tape (within the block) will be an end of code signal and this signal starts the next cycle of events which will depend on the information sensing blocks.

The Flexowriter input-output control 445 has been described previously in its role as an information sensing block and as a control block, it provides the facilities for obtaining synchronism with the Flexowriter 27 which operates at its own particular rate. When the Flexowriter performs as an output device, this block performs several functions. One of these functions is to maintain the required type out format. There may be a carriage return, seven characters typed, followed by a Tab command as described above. To accomplish this format, the control block contains an electronic flip-flop type counter which is capable of counting to eight, keeps track of the number of characters typed out, and supplies information to control the shifting of the memory 440 and the memory output register. The Flexowriter input-output control also provides buffer storage (thyratron control relays) for the output characters and the Flexowriter machine commands. It stores this information until the Flexowriter timing signals indicate it is no longer required and at that time these circuits are cleared for the next character.

The mechanical unit 450 contains the circuits which drive the duplicator unit 20 actuating circuits and is performed by electronic and relay circuitry. This block facilitates many of the duplicator unit functions using the information received from cam-driven switches in the unit. Among these are functions such as setting up the code target bit shutters and master shutter, the code target reset solenoid, turning on the contact print lamp, controlling the reading station clamp, and initiating card and film cycles. Card and film cycle commands from the programmer control 439 are stored temporarily in thyratron buffers and when the unit's internal drive cycle reaches a point where it can carry out these commands, its cams generate signals to reset the buffers. Also included in this block are the circuits to generate the edge marks which are exposed areas in particular frames to indicate the end of the film leader, start of the film trailer and the frames that must be rejected. The edge marking feature is complicated by the fact that file words are added to the unexposed film at a printing station removed from the contact print station. In order to take care of this situation, the edge mark circuits contain a two flip-flop storage register and a two flip-flop electronic counter. The mechanical unit control also comprises circuits that provide certain interlock features. These interlocks prevent the machine from being started under any of the following conditions: if the card magazine hatches are open; if the scanner lamp housing is not in its proper scanning position; if any one of the lamps in the unit is burned out; if the card generation controls are not consistent (that is, the programmer plugboard is set up for N and the duplication control switch is set in the P position, or the reverse); if the film supply is too low or depleted; if the machine was not initially cleared; and if the exhaust air temperature is above the maximum operating level. The operation of the interlocks depends on signals from sensing switches or relays which inform the control block as to the state of the unit. Any one of the above mentioned conditions causes the control to ignore actuation of the start switch.

The external display and operator's control consists primarily of the control panel 26 located on the console 25 whose operation, function and indication has been described above with respect to the console.

The programmer control block 439 is essentially the center of the control system. Although each of the blocks operate independently once an operation has been initiated, the programmer control supplies these initiating signals. The generation of the sequence of operation (called a program) constitutes a particular mode of operation and the program of each mode is fixed as described above. The change from one mode of operation to any other mode is accomplished by the mode switching circuits and several functions and routines are common to several of the modes.

The memory block 440 comprises magnetic cores and associated circuitry, the cores being arranged as forty-two shifting registers each of which is thirty-two bits long. The first line of cores corresponding to one word on a card is set by a core loader buffer and the input to this buffer can be taken either from the card code reader 161 or from the memory output-buffer register. The programmer control 439 selects the input to be used and the output buffer register is used as an input to the memory under two conditions. One of these conditions occurs when information already in the memory is to be recirculated and which is required when handling multiple card sets. The other condition occurs in Mode C when the Flexowriter 27 is used as a code input device. In this instance, the Flexowriter input-output control 445 shifts the data into the register and from there it is loaded into the cores. The memory output register is a forty-two bit flip-flop shifting register which acts as a buffer for the code-target thyratron buffer and as a shifting register for the Flexowriter input-output. The shifting characteristic is such that it always shifts a complete character at a time, that is, six bits in parallel. The direction of the shift is always from the least significant character towards the most significant which is the tag character. The Flexowriter input control loads the register from the least significant bit end and the output control takes the information out at the tag (most significant) end. The tag bits also go to the tag decoder, six bits in parallel, and this supplies information to the programmer control needed to manipulate the memory.

The entire word in the register is available forty-two bits in parallel to the thyratron buffer that sets up the code target bit shutters.

The A.C. and D.C. voltages utilized by the various units of the system are regulated by commercially available units, and it is believed that a more complete description of the power source and supplies is not necessary for a complete understanding of the system. For reasons understood by those skilled in the art, the various voltages are turned on and off in a predetermined sequence in order to prevent damage to the various tubes and electronic elements in the circuits.

SYSTEMS AND OPERATION

The description which follows relates to the block diagram shown in FIG. 41 and is a more detailed breakdown of the logic of the entire system to perform the various modes of operation described above. In conjunction with this, the logic of the system is shown in FIGS. 42–69, and reference should be made to these figures. In each instance the signal that supplies an input to the block is mentioned in the program, and the end resultant output is assumed.

In order to better understand the description which follows as well as to locate the major components of the circuitry referred to in FIGS. 42–69, the following glossaries of commands and signals and circuits are provided:

*Glossary—Commands and Signals*

| Abbreviation or symbol | Explanation |
|---|---|
| A | Mode A. |
| B | Mode B. |
| C | Mode C. |
| Card Cycle | One revolution of the cam shaft attached to the card drive mechanism. This is actuated by means of a one turn clutch. |
| Clocks | Signals generated within the programmer as a result of timing marks. |
| D | Mode D. |
| Drive Cycle | One revolution of the main drive cam shaft in the duplicator mechanical unit. This runs continuously as long as power is on. |
| EOC | End of Character Pulse—Indicates that the Flexowriter circuits are ready to accept the next character. |
| EOS | End of Scan signal supplied by scanner circuits and shaped in the programmer. |
| EOW | End of Word Pulse—Indicates the finish of a Flexowriter operation. |
| Film Cycle | One revolution of the cam shaft attached to the film drive mechanism. This is actuated by means of a one turn clutch. |
| FP-1 | Film Pulse-1—Occurs at the beginning of every film cycle to detect a program break. Generated by FC3 leading edge. |
| FP-2 | Film Pulse-2—Occurs after FP-1 to act on a detected program break. Generated by FC3 trailing edge. |
| Index Card | The command to actuate a card cycle in the following drive cycle. |
| Index Film | The command to actuate a film cycle in the following drive cycle. |
| LN | Leader edgemark code. |
| M | The multiplicity number—The number of cards in the set. Stored in the N counter of the programmer. |
| $\underline{M}$ | Used to designate that the M check switch is in the off position. |
| Read | Command to recognize the scanner output after the next start scan signal. This sets the Read delay flip-flop. |
| RN | Reject edgemark code. |
| $S_o$ | The S tagged code word (DN) appearing on a card. |
| S Clock | The signal coincident with the S tagged code word, identifying the document number (DN). |
| SFP | Stop Film Pulse—Occurs whenever the film cycle one turn clutch is released. Used to detect the end of film cycles. |
| $S_m$ | The S tagged code word (DN) appearing in the programmer memory output buffer. |
| SS | Start Scan signal—Supplied by scanner circuits and shaped in the programmer. |
| TM | Timing Marks—Supplied by the scanner from the coded area of a card. |
| TN | Trailer edgemark code. |
| Z Clock | The signal coincident with the Z tagged code word, identifying the number of cards in the set—the multiplicity number. |
| ——→ | Is transferred to: e.g. 3——→C means three is transferred to the C Counter, 0——→T means 0 is transferred to the T flip-flop, i.e., it is reset. |

*Glossary—Circuits*

| Abbreviation | Designation | Fig. | Explanation |
|---|---|---|---|
| Alarm | B57 | 69 | Alarm Flip-Flop—Set when an alarm condition occurs—i.e. M check error, memory error, card nonfeed, etc. |
| Bootstrap | H10, G10 | 63 | Bootstrap Univibrator and Flip-Flop—Used to detect an all zero condition in the memory. |
| C | B13, B14 | 54 | C Counter—Keeps track of empty card disc positions. Is also used to detect an empty input hopper. |
| Card | H13 | 59 | Card Flip-Flop—Stores the fact that a card was present at the read station during a scan. |
| CC | A11 | 43 | Card Cycle Flip-Flop—Indicates that a card cycle is in process. |
| CD | B60 | 43 | Count Duplicate Flip-Flop—Set at end of leader and reset at start of trailer. |
| CM | B59 | 43 | Count Card Flip-Flop—Set when a card may be detected and counted. |
| Compare | F12 | 62 | Compare Flip-Flop—Retain the result of the most recent DN comparison until just before the next. |
| CR | H59 | 67C | Carriage Return Flip-Flop—Is used only in type-out to maintain format of typeout. |
| EOC | J58 | 67C | End of Character Schmitt Trigger—Shape signal from Flexowriter translator cam. |
| EOW | I59 | 67C | End of Word Pulse—Indicates the finish of a Flexowriter operation. |
| F | H56-58 | 67C | F Counter—Used in Flexowriter output control to count characters typed and insert Tab command after each word. |
| FC | E17 | 47 | Film Cycle Schmitt Trigger—Used to indicate the start of a film cycle. Is set by FC-3. |
| FCY | E55 | 47 | Film Cycle Flip-Flop—Indicates that a film cycle is in process. |
| Film | H18 | 56 | Out of Film Flip-Flop—Set when machine is ready to act on out of film condition. |
| FR | KE4, 5 | 56 | Film Relays—Hold out of film condition until machine can act on it. Held on by KE3. |
| FS | KD12 | 52 | Film Sense—Follows out of film sensing switch when supply gets below minimum level. |
| G | B9, B10 | 55 | G Counter—Used only in Mode D1 to keep track of groups of words stored in the memory. |
| GO | B11 | 60 | GO Univibrator—Generates pulses that inspect Stop circuits for program break. |
| IC | J14 | 51 | Initial Clear—Generates signal to set circuits to starting conditions. |
| L | E56, E57 | 47 | Leader Register—Keeps track of leader, trailer, entry and reentry conditions. |
| m | G1-6, 19-54 | 57A, 57B | Memory—42 magnetic core shifting registers, each 32 bits long. This is the main store in the machine. |
| N | B44-51 | 64 | N Counter—Stores the document multiplicity number and counts down to perform the M check. |
| NC | C16, C17 | 51 | Edgemark Counter—Locates the film frame to be edgemarked. |
| NR | B16, B17 | 45 | Edgemark Register—Stores edgemark code prior to marking. |
| Q | H16 | 55 | Q Flip-Flop—Used in Mode B2—So that DN is typed out once per set only. |
| R | C1-6, 19-54 | 57A, 57B | R Register—42 bit flip-flop shifting register used as memory output buffer. |
| Read | H14 | 59 | Read Flip-Flop—Enables the card detector circuits to accept information from the scanner. |
| Read Delay | H15 | 59 | Read Delay Flip-Flop—Stores the read command to place the programmer in step with the scanner. |
| Scan | H12 | 59 | The Scan Flip-Flop—Enables the reader timing mark channel only between start and end scan time. |

*Glossary—Circuits*—Continued

| Abbreviation | Designation | Fig. | Explanation |
|---|---|---|---|
| SFP | E18 | 47 | Stop Film Pulse Schmitt Trigger—Is reset at start of film cycle and remains until the end of a cycle not followed by another. Used to detect the end of film cycles. |
| Start | B18 | 60 | Start Flip-Flop—Stores the fact that the machine is in a condition from which it can be started. |
| Stop | B56 | 60 | Stop Flip-Flop—Stores the manual stop condition until the machine is restarted. |
| Stop Delay | B55 | 60 | Stop Delay Flip-Flop—Stores the manual stop command until the machine comes to a program break where it can stop. |
| T | H17 | 55 | T Flip-Flop—Tape or Type indicator, is set when the Flexowriter is in operation. |
| Timer | | 49 | Film Cycle Timer—Used to determine time of leader and trailer film run-out. |
| W | D14 | 62 | Single File Word Flip-Flop—Used in Mode C when only one file word is added to a set. |

The card cycle control circuits shown in FIG. 42 supply energizing signals through interlocks to the card clutch 53 and reading station clamp relay 141 so as to provide for proper card indexing. Relay contacts KF11–12 are associated with the initial clear circuits and before pressing the IC push button 427, this contact is as shown in order to prevent spurious signals which may be generated when D.C. voltages are turned on, thereby preventing the spurious signal from initiating a card cycle. Upon pressing the IC push button 427, contact KF11–12 closes and will remain closed until either the D.C. voltages are turned off or film breakage is detected. Thereafter, whenever the index card clutch relay KE12 is energized, the card clutch 53 will be energized. As a result of internal programming, the operation of initial clear causes an index card signal which results in the occurrence of one card cycle. Card indexing is controlled by the index card delay relay KE11 and this relay may be energized in two different ways: first by a signal from the programmer firing thyratron F59M and secondly by the index card push button 452 for manual indexing of cards. For the purpose of describing card indexing, assume that initial clear set (KF11 contacts closed) and an index card signal to thyratron F59M at $t$=200 ms. (69°). At $t$=200 ms. (69°) KE11 is set thereby enabling the gating to the card clutch relay KE12 and the card clutch 53. At $t$=824 ms. (284°), DC1–2 operates to apply +90 volts to KE12 which when set energizes the card clutch 53, see FIG. 21. KE11–2 and KE12–2 now provide a holding path for KE12 while DC1–2 returns to its normal state. At $t$=0 ms. the card cycle begins and at $t$=14 ms. (5°) CC1–1 resets KE11 and at $t$=72 ms. (25°) CC1–1 enables KE11 so it may be set by subsequent programmer signals. At $t$=824 ms. (284°) DC1–2 operates to break the holding circuit through KE12–2. If KE11 has been again set by this time, KE11–2 and KE12–2 will provide a holding path for KE12 and cause another card cycle to occur. If KE11 has not been set, KE12 will reset and the card clutch 53 will be deenergized. The card cycle terminates at $t$=1044 ms. (360°). It should be noted that KE12 is set just prior to the first card cycle and reset during the last cycle of a group of card cycles.

The read station clamp is controlled by drive cam contacts DC2–2, relay KE13 and card cycle cam CC2–1. DC2–2 operates at $t$=0 ms. and supplies +90 volts to pick up relay KE13 and the read station clamp solenoid 141. Relay KE13–2 supplies a holding path through cam contact CC2–1. When a card cycle takes place, CC2–1 breaks the holding path at about $t$=464 ms. (160°) to release the read station clamp well before the disc motion begins.

Figure 43:
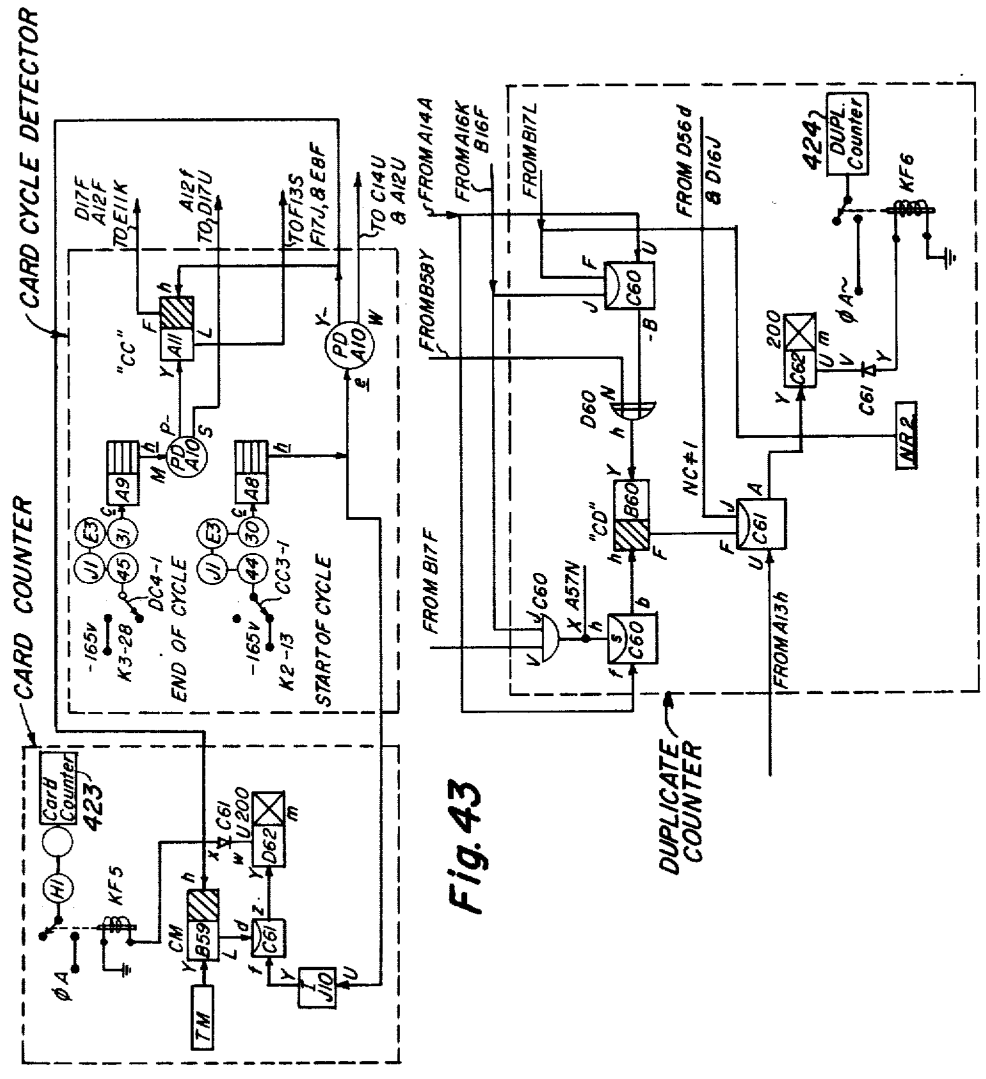
Figure 45:
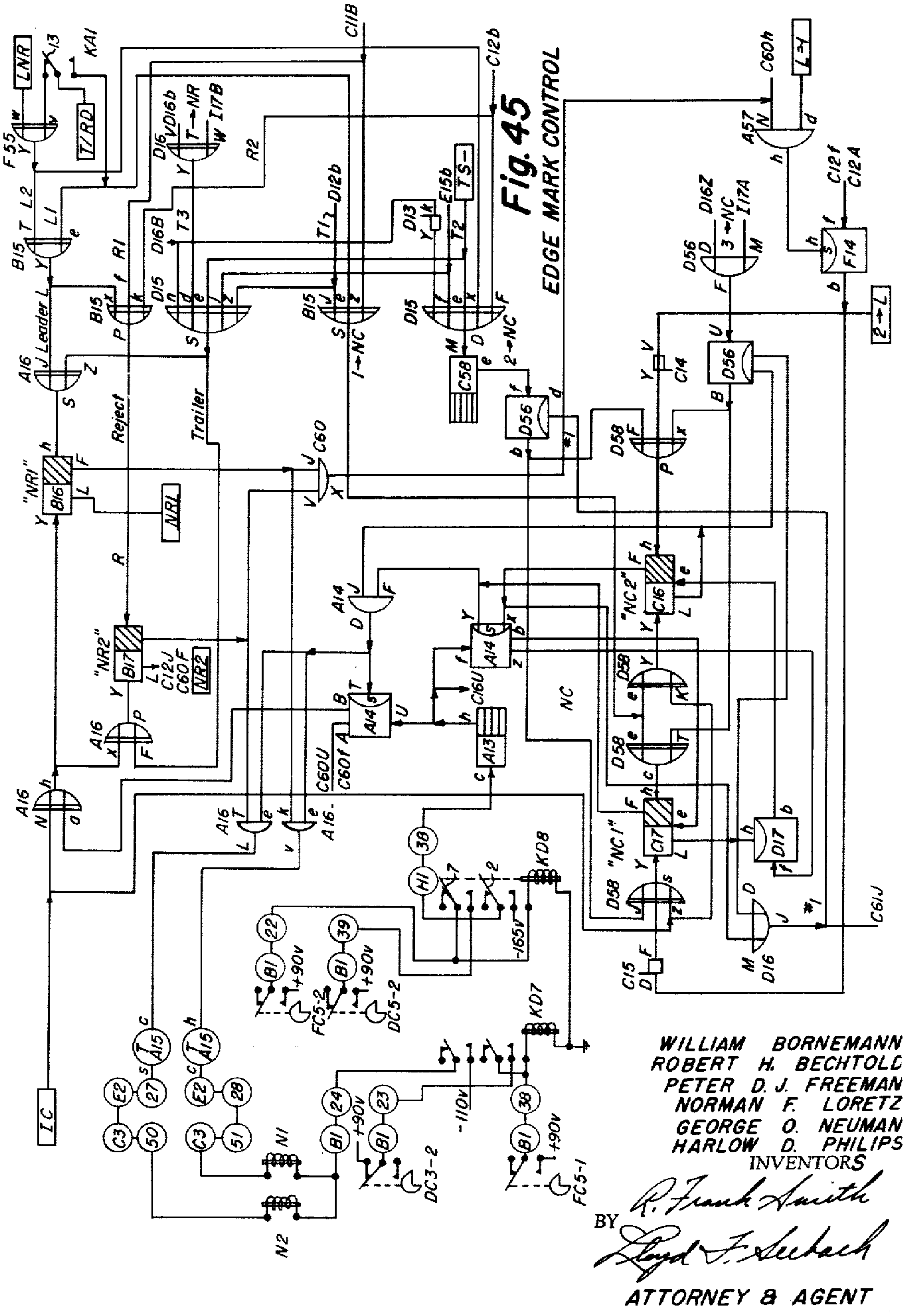

The card cycle action is indicated by the state of "CC" and the card cycle flip-flop A11, see FIG. 43. Signals which set "CC" and those which indicate the state of "CC" are used in other parts of the programmer. The circuit operation and timing can best be understood with respect to the timing diagram shown in FIG. 21. The signals derived from cams CC3 and DC–4 are subsequently filtered and shaped and labeled as "Start of Cycle" A8 and "End of Cycle" A9. The two cycles of operation are typical of the card disc movement and of the disc movement during a cycle without a card but immediately following one with a card.

The code target bit shutter control circuits, see FIG. 44, supply energizing signals to each of the forty-two bit code target latching type solenoids 148 during film cycles in Modes B and C only. The word contained in the R-register is switched by the plugboard to accommodate N or P type cards before latching the grid inputs of the thyratron A23—A43. At $t$=28.4 ms. (10°) FC3–2 energizes relay KE14 and the setting of KE14 applies +110 volts to the thyratron firing those with bit inputs, see FIG. 48. The thyratrons are conductive for an interval which is sufficient to allow the bit solenoids to unlatch their respective levers 239 whereby pins 231 are moved away from aperture 232. FC3–2 resets relay KE14 which in turn extinguishes the thyratrons. At $t$=580 ms. (200°) FC4 actuates the code target reset solenoids 149 which by means of reset bar 250 moves the released pins 231 into their aperture blocking position.

The edge mark control circuits provide for the proper placement and coding of exposed marks on the edge of the film. These marks are used to denote the end of the film leader and the beginning of the film trailer. The edge marks are also used to mark as rejects any incorrect exposures generated during the operation of the machine. The code to be marked or exposed on the edge of the film is set into a two flip-flop register NR1 and NR2, designated as B16 and B17 in FIG. 45. The coding to denote the end of the leader is both bits set to one. For trailer marking only B16 is set and for rejected single frames B17 is set. The input connections to the register are arranged so that the entry of a trailer code will override any code stored. This is required because it signifies termination of the program and can occur at a time when another code is still being stored. When the edge mark is to be made the code contained in this register is gated through diode gates A16L and A16V to the edge mark actuating circuits which comprise thyratrons A15 and solenoids N1 and N2.

The edge mark counter provides for the correct placement of the edge marks on the frame to be so marked. The counter counts the film cycles required to locate the mark on the film and if an error occurs in the entry of file code during an exposure, then the edge mark counter NC is preset to the correct state to produce a mark when the rejected frame arrives at the exposure station. The edge mark counter is a two flip-flop gated counter consisting of flip-flops C16 and C17. The counting signal is taken from cam FC5 through relay KD8. It is shaped in Schmitt trigger A13 for use in both the document counter and the edge mark counter. In the edge mark counter the signal from A13 is gated on two conditions; when the counter is not equal to zero, pulse gate A14*f* is enabled and its output steps the counter down, and when the count contained is equal to one (binary code decimal), pulse gate A14U is enabled and its output clears the edge mark register.

The preset inputs to the edge mark counter set the counter to a number equal to the number of film cycles if the marking is to be delayed. These inputs are gated on the state of the counter so that if the counter is set when an input is presented, whichever of the two is lower will predominate. This gating is accomplished by pulse gate D56 and the input to set the counter to two is inhibited if the stored count already equals one. One special case is the input of pulse gate F14*f* in which this gate increases the state of the counter from one to two.

Its function is apparent in the case of Mode C2 when out of film re-entry is followed by a search sequence.

The edge mark is made at the end of any film cycle when the edge mark counter equals one. Thyratrons A15 are enabled according to the code stored in the edge mark register when the edge mark counter equals one by diode gate A16. Film cam FC5 energizes relay KD7 during the last 20 ms. of the film cycle and this relay remains energized through drive cam DC–3 and also supplies +110 volts to the plate of the thyratrons A15 through relays N1 and N2. Relays N1 and N2 energize the edge mark lamps 145 directly, and the circuit is cleared when DC3 opens during the first part of the next cycle.

Figure 46:
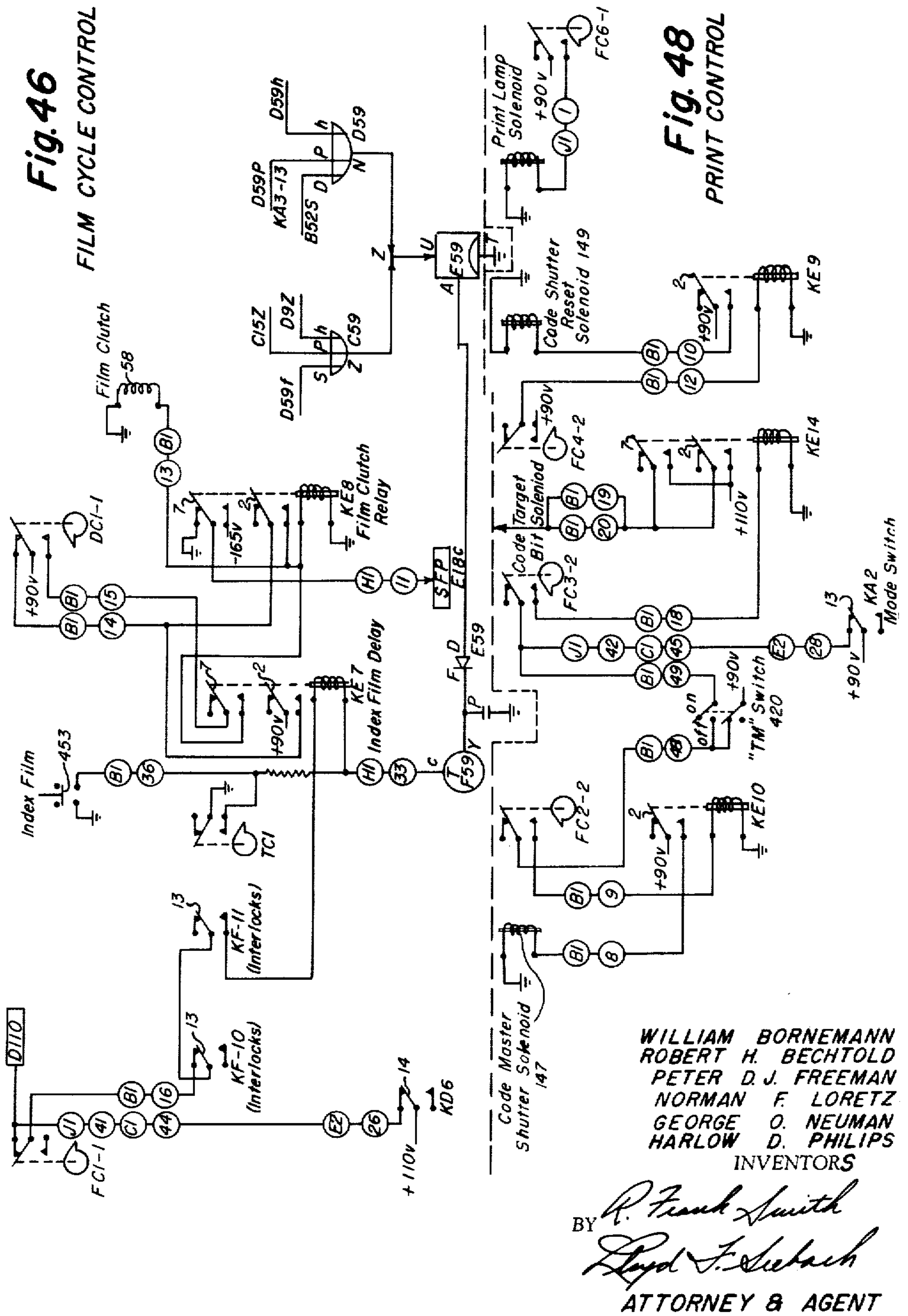

The film cycle control circuit supplies energizing signals through interlocks to the film clutch to provide for film indexing. The +110 volts side of KE7 may be interrupted by any one of four sets of contacts, as shown in FIG. 46. Once any one of these sets of contacts is opened KE7 resets and thyratron F59 becomes nonconducting. Relay KE7 cannot again be set until all contacts are closed. Relay contacts KF10–13 and KF11–13 are associated with the initial clear circuit and before the IC push button 427 is actuated these contacts are as shown in FIG. 42. Open relay contact KF11 prevents spurious index film signals which may be generated when D.C. voltages are turned on and prevents these signals from causing a film cycle. Upon pressing the IC button 427, contacts KF10 open and contacts KF11 close thereby breaking the +110 volt line to KE7. This arrangement of interlocks also prevents spurious index film signals which may be generated during the initial clear operation to prevent initation of a film cycle. Upon release of the IC push button, contact KF10 closes and contact KF11 remains closed and will remain closed until the D.C. voltages are turned off. Contact KF10 will operate as described above each time the IC button is actuated. Relay contact KD6–14 disables the film cycle control during the D modes of operation because film indexing is not required for this group of modes of operation.

Film indexing is controlled by the film index delay relay KE7, and this relay can be energized in three different ways: first by a signal from the programmer firing thyratron F59Y, secondly by timer contact TC1 closing (for generating leader or trailer), and thirdly by the index film push button 453 for manual indexing of film. Cam FC1–1 is normally closed and opens for 30 ms. early in each cycle to allow relay KE7 to reset. For the purpose of describing the film cycle control assume Mode A, B or C (KD6 as shown), initial clear set (KF10 and KF11 contacts closed), and an index film signal to thyratron F59 at $t=200$ ms. (69°). At $t=200$ ms. (69°) KE7 is set thereby enabling the gating to the film clutch 58 and film clutch relay KE8. At $t=824$ ms. (284°) DC1–1 operates to apply +90 volts to the film clutch and KE8. KE7–2 and KE8–2 now provide a holding path for the film clutch 58 and KE–8 while DC1–1 returns to its normal state. At $t=0$ ms. the film cycle begins and at $t=14$ ms. (5°) FC1–1 resets KE7 and at $t=72$ ms. (25°) (FC1–1 enables KE7 so it may be set by subsequent programmer signals. At $t=824$ ms. (284°) DC1–1 operates thereby breaking the holding circuit through KE8–2. If KE7 has again been set by this time, KE7–2 and KE8–2 will provide a holding path for the film clutch 58 and KE8 thereby causing another film cycle to occur. If KE7 has not been set the film clutch 58 will deenergize and KE8 will reset. It is important to note that KE8 is set just prior to the first film cycle and reset during the last cycle of a group of film cycles.

Figure 47:
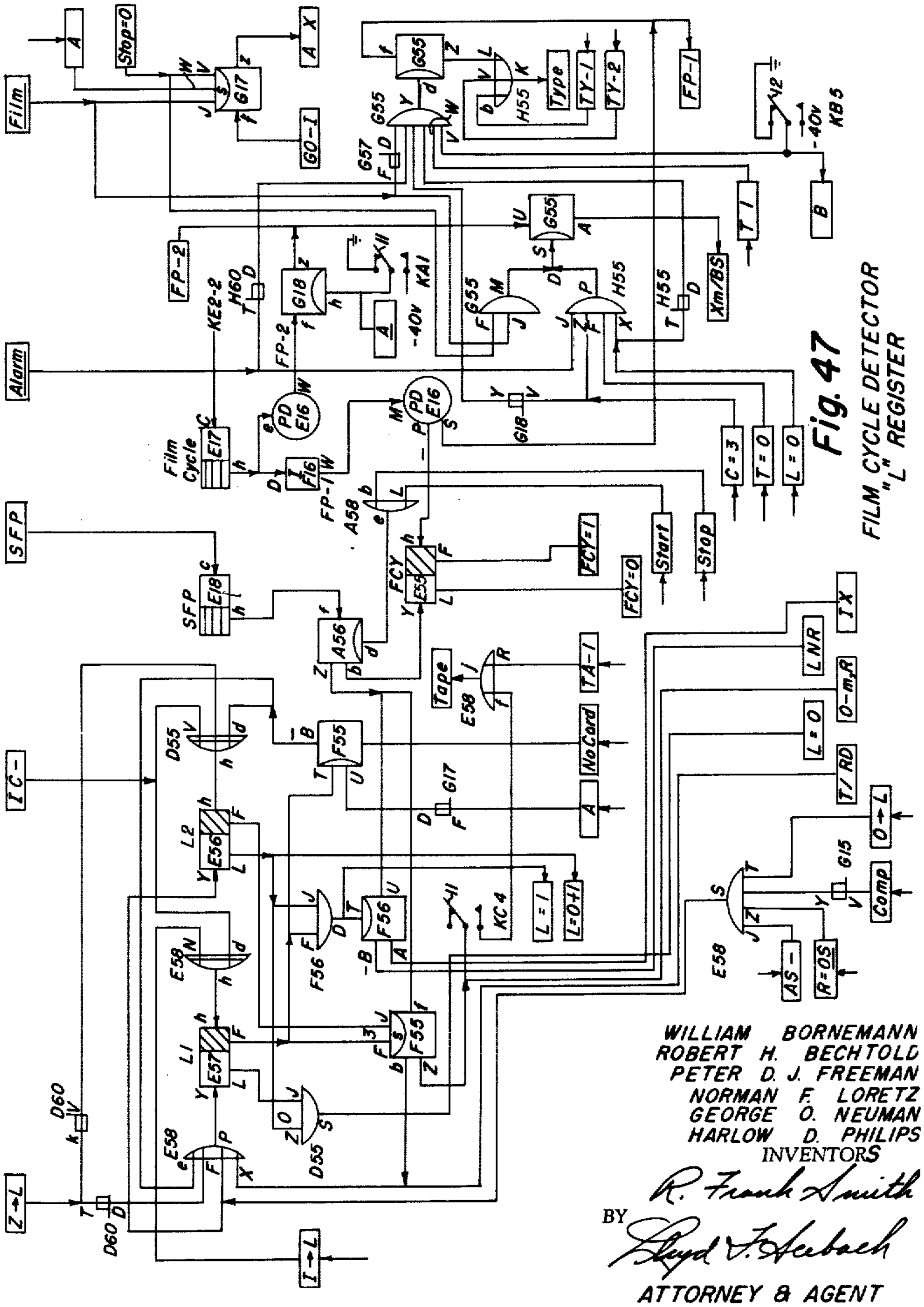

The film cycle detector circuit, as shown in FIG. 47, by means of the film cycle flip-flop E55, designated FCY, indicates that film cycles are in progress. FCY is set at the beginning of a film cycle by a signal generated from FC3–1 and is reset by SFP which occurs at the end of film indexing providing gate A56*f* is enabled. The outputs of FCY are used in conjunction with the edge mark circuits. The operation of film cam FC3 indicates that a film cycle is under way. FC3–1, see FIG. 56, energizes film cycle relay KE–2 which, in turn, operates the film cycle Schmitt trigger E17. At $t=29$ ms. (10°) FC3–1 closes thereby setting KE2 and resetting E17 (*h* output of E17 falls). This signal inversion by inverter F16, generates FP1 (film pulse one) from pulse driver E16M. This signal sets FCY and is supplied to other portions of the programmer for additional control. During the last one of a group of film cycles, KE8 resets at $t=824$ ms. (284°). At this time KE8–7, see FIG. 46, returns to ground to produce a signal for E18 which generates SFP (stop film pulse) from pulse gate A56. SFP resets FCY and inspects the state of the L-register to be described hereinafter. SFP gated on the L-register produces program continuing signals only during entry and re-entry portions of the program. FP1 interrogates three pulse gates which in turn initiate a routine which will delay the machine operation; a type out command G55*f*; an out of film stop J56*f*, see FIG. 56; or a manual stop C55U, see FIG. 60. In each case, a flip-flop, T (H17), Film (H18) or Stop (B56), will indicate the delaying action to inhibit continuation of the program. Pulse gate G55U is gated on all possible delay actions and this gate is inspected by FP2 (film pulse 2). FP2 is generated by the resetting of FC3 and is therefore delayed from FP1 by the period of FC3. If the program is not to be delayed, FP2 is interrogated through G55U and continues the program.

The print control circuits supply energizing signals to the code master shutter relay 147, code target bit shutter reset relay 149, and the relay for print lamp 152. The TM switch 420 enables the operator to control the addition of timing marks in Mode A. Since timing marks are exposed only when the code master shutter 246 is operated, the addition of timing marks is controlled by controlling the operation of the master shutter. The circuit of KA2 assures the operation of code master shutter 246 and therefore the addition of timing marks in Modes B and C because in these modes of operation addition of file words and timing marks to the sort field of the duplicates is a requirement. The TM switch 420 gives manual control of the line to KE10 in Mode A. The setting of relay KE14 for energizing the code target bit shutter solenoids 148, the energization of relay KE9 for controlling the code shutter reset solenoids 149 and the energization of print lamp 152 is evident from the circuits disclosed in FIG. 48 and a further explanation is not believed to be necessary.

The function of the timer circuit disclosed in FIG. 49 is to allow a specified number of film cycles to occur thereby generating a leader or trailer. The leader or trailer is generated in order to preserve the integrity of the correctly exposed sections of film and to provide lengths of film for threading into various other types of equipment such as a processor for developing the exposed film. The need for a trailer or leader is determined by the program and signals signifying such need pass through OR gate E15W to set univibrator D18. D18 remains in the set state for 200 ms. thereby applying A.C. power through KF4 to the timer 454 for that interval of time. Timer contact TC4 closes as soon as the timer begins to run and remains closed during the remainder of the period which is approximately 18 seconds. TC4 also serves as a holding contact for the timing motor after D18 has reset. When TC1 closes, KE7 is picked up by causing film cycles during the period of the timer and this allows for a leader or trailer of approximately thirty-two card frames. Under trailer conditions ($L=0$) TC2 allows thyratron F57C and relay KD10 to set thereby causing the buzzer to sound. TC1, TC2 and TC4 are timer contacts and are actuated by cams in timer 454. Relay contact KC6–11 disables the timer during the D modes of operation since film indexing is not required.

Figure 50:
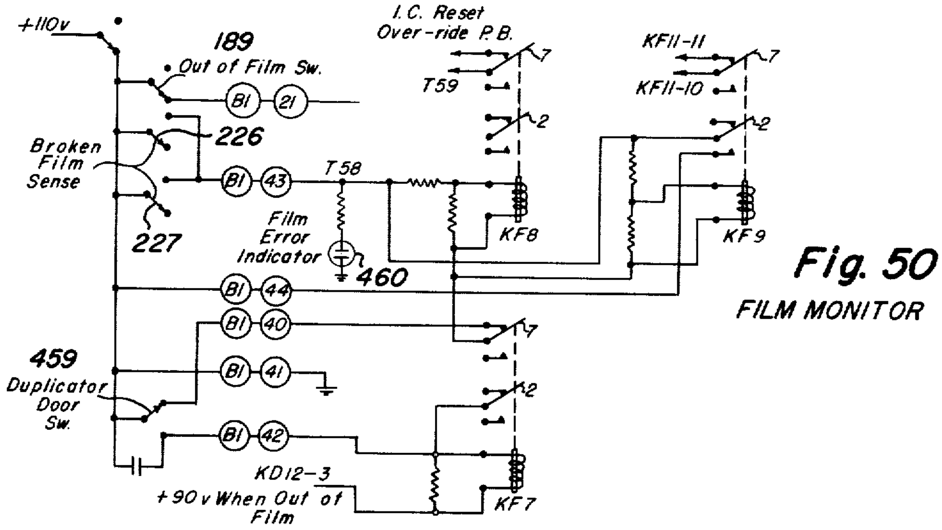

The duplicator unit is provided with circuitry for monitoring film threading which serves to stop the duplicator unit when such an error occurs, see FIG. 50. In Modes A, B or C, +110 volts is present at the out-of-film microswitch 189 and film-thread-alarm microswitches 226 and 227. During normal operation in these modes, if such an error occurs as indicated by closure of any one of these switches, relays KF8 and KF9 will be energized as well as the film error lamp 460. Operation of these relays will cause immediate interruption of power to the film and card disc clutches and also to the Flexowriter. This is accomplished by deenergizing the IC relays which also extinguish the IC lamp indicator 427'. Upon opening of the front access door 29 of the duplicator unit, switch 459 energizes relay KF7, relays KF8 and KF9 will be deenergized, and the film error light 460 will be extinguished. As long as the door remains open, IC can be reset for manual operation of card and film index cycles by pushbuttons as required for reloading of film after any trouble has been corrected. The door 29 can then be closed with reenergizing of relays KF8 and KF9. In the out-of-film alarm condition, +90 volts from KD12–3 will energize relay KF7 when the door 29 is open. This relay by virtue of its holding circuit makes relays KF8 and KF9 inoperable during film loading operations even if the door 29 is accidentally closed or if the operator forgets to reload film and then closes the door. It is necessary to restart the cycle (by pushing the start button 428) which will deenergize relays KF7 and thus allow the relay circuit to be re-established at this time as desired.

The initial clear signal sets all necessary circuits to starting condition, connects the +90 volts to the Flexowriter and enables the film cycle control and card clutch. With reference to FIG. 51, the intial clear signals are generated by pushing the initial clear push button 427 providing the initial clear circuits were not previously set. The push button provides energizing voltage to relays KF10 and KF11, and KF11 has a holding circuit which can be reset by turning the machine power off or by a broken film alarm. Contact KF11–12 is in series with the card clutch solenoid 53 and contact KF11–13 is in series with the index film delay relay KE7. Both contacts are open during the initial power turn on to prevent any power transients from starting card or film cycles. Contact KF11–14 connects the Flexowriter to the +90 volt power supply. Relay KF10 is held in a set condition as long as the intial clear push button is held closed. Contact KF10–14 fires thyratron A6 which in turn energizes relay KE1. Contact KF10–13 is in series to disable the index film delay relay KE7, and this insures that any transients associated with initial clearing will not cause a film cycle to occur. Contact KF10–12 removes the plate voltage from the alarm thyratrons B54, J16 and J17, see FIG. 68, to clear them and energization of relay KE1 energizes the initial clear lamp 427' and switches Schmitt trigger J14 so that the output is changed from a low to a high voltage state. The positive going wave form is differentiated by pulse driver I14 which generates both positive and negative initial clear pulses. These pulses and the Schmitt trigger output level are used for setting the initial conditions throughout the programmer.

The initial clear thyratron A6 plate circuit is in series with relay KE1, contact KF1–3 and one section of the mode selector switch contacts as shown in FIG. 51. Opening of either set of contacts accomplishes the initial clear reset by deenergizing relay KE1 and extinguishing thyratron A6. An initial clear reset override push button 455 is provided to inhibit the initial clear reset when changing from one mode to another and is used during maintenance testing of the programmer. Contact KF1–3 can break the holding circuit by means of either the tab stop signal TS+ or the initial clear reset pulse O→IC. These pulses are derived from OR circuit J15 and trigger univibrator I15 which energizes relay KF1. The tab stop pulse TS+ is generated by the Flexowriter control and the initial clear reset pulse is generated as part of the alarm sequence, see FIGS. 67A and 69.

Figure 52:
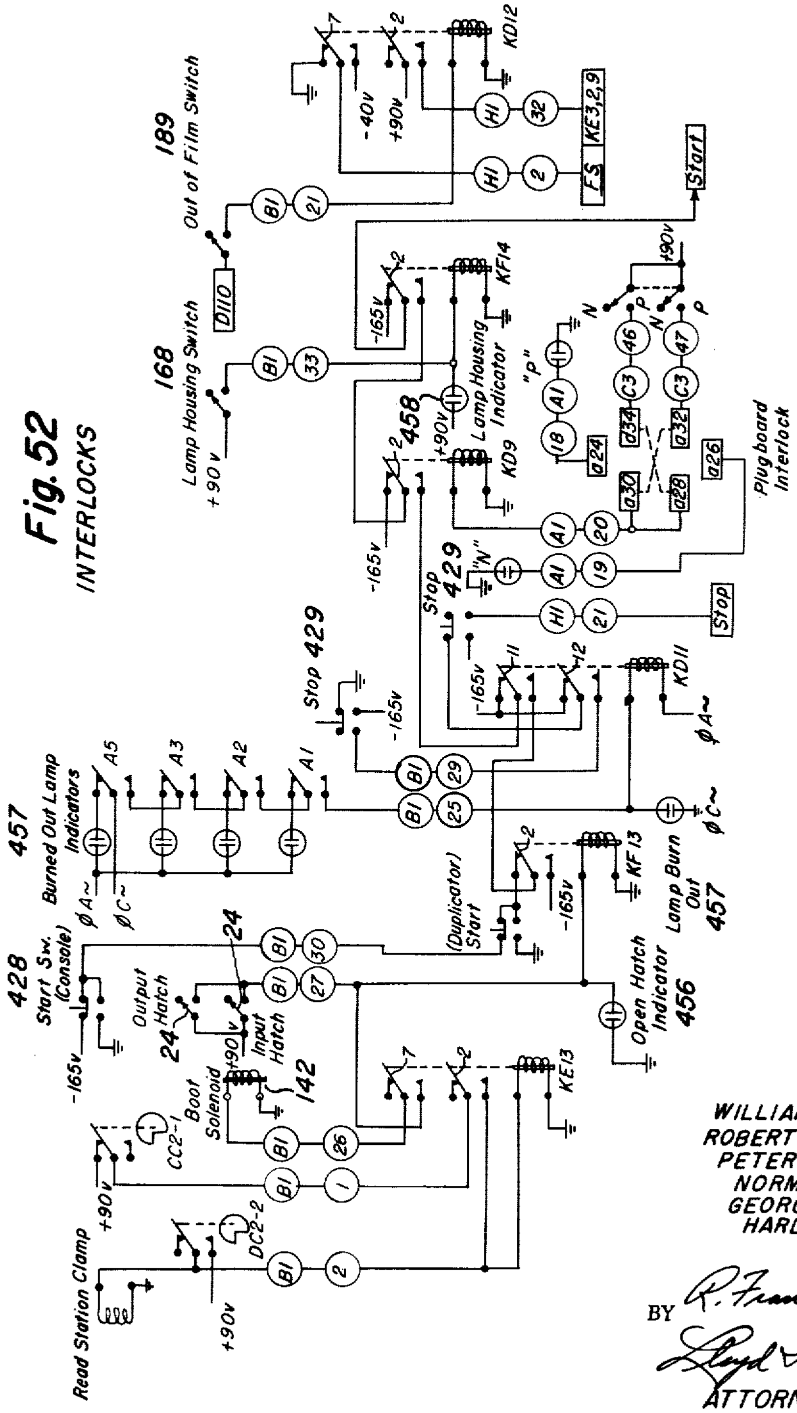

Interlocking circuits are provided in the programmer to prevent the operator from starting the machine under a number of conditions, see FIG. 52. Some of these circuits also provide for stopping the machine if certain conditions should arise during the course of operation. In either event, the cause of stopping or nonstarting is indicated by a light on the console control panel 26 as described above. The start signal is generated by the start push button 428 at either the console or the duplicator unit. This signal must thread its way through a series of four relays to reach the Start Schmitt trigger A18, see FIG. 60. If any one of these relays is in the inhibit state, the input of A18 is −165 volts and cannot be influenced by the push buttons.

The first circuit in the series string interlocks the start signal against the open card magazine hatch. Either the input or output hatch sensing microswitch 24 can supply +90 volts to energize relays KF13. If this relay is energized, the line from the start signal is broken and the open hatch indicator 456 is lit. The open hatch sensing switches 24 are also used to pick up the light trap boot solenoids 142 at the bottom of each of magazines 33 and 34. The power to the boot solenoids is switched through relay KE13 and this relay will break the circuit to the boot solenoids at any time a card cycle is in progress and just before the card disc begins to move. The timing is determined by card cam CC–2 and drive cam DC–2, and relay KE13 also actuates the read station clamp solenoid 141 at the same time. The second circuit in series with the start signal is relay KD11, and it is normally energized by the lamp current sensing relays located in the base cabinet 21 of the duplicator unit 20. Each of the current sensing relays is energized by the current in the lamp being monitored and when the lamp fails, the corresponding relay drops out. This causes a break in the phase C supply line to KD11 and causes it to drop out and break the line of the start signal. The burned out lamp indicator 457 on the console is energized by a parallel path through the coil of KD11. The contact KD11–12 is used to generate a Stop signal to the programmer in case a lamp burns out during operation.

Since the duplicator unit is designed to print from either negative or positive cards some circuit and optical modifications are required when changing from one type of card to another. In the duplicator unit a small crank must be set to accommodate either negative or positive cards and in the programmer it is necessary to insert a prewired plugboard for either negative or positive cards. The interlock circuit will prevent the machine from starting by not energizing relay KD9 if both the plugboard insert and the crank position are not in agreement. If they are in agreement, then the corresponding generation indicator will be energized on the console and the start circuit signal enabled.

The scanner lamp housing 162 in the duplicator unit is mounted on a spring loaded pivot 159 and this permits the operator to swing the housing up out of its normal position to gain access to the film transport mechanism for loading the film. The lamp housing sensing switch 168 picks up relay KF14, if the housing is in its correct and normal position, and this enables the start signal to reach Schmitt trigger A18. If the housing is not in position, the relay is not energized, the start line is broken and the lamp housing indicator 458 on the console is energized by a parallel path through the coil of relay KF14.

Figure 53:
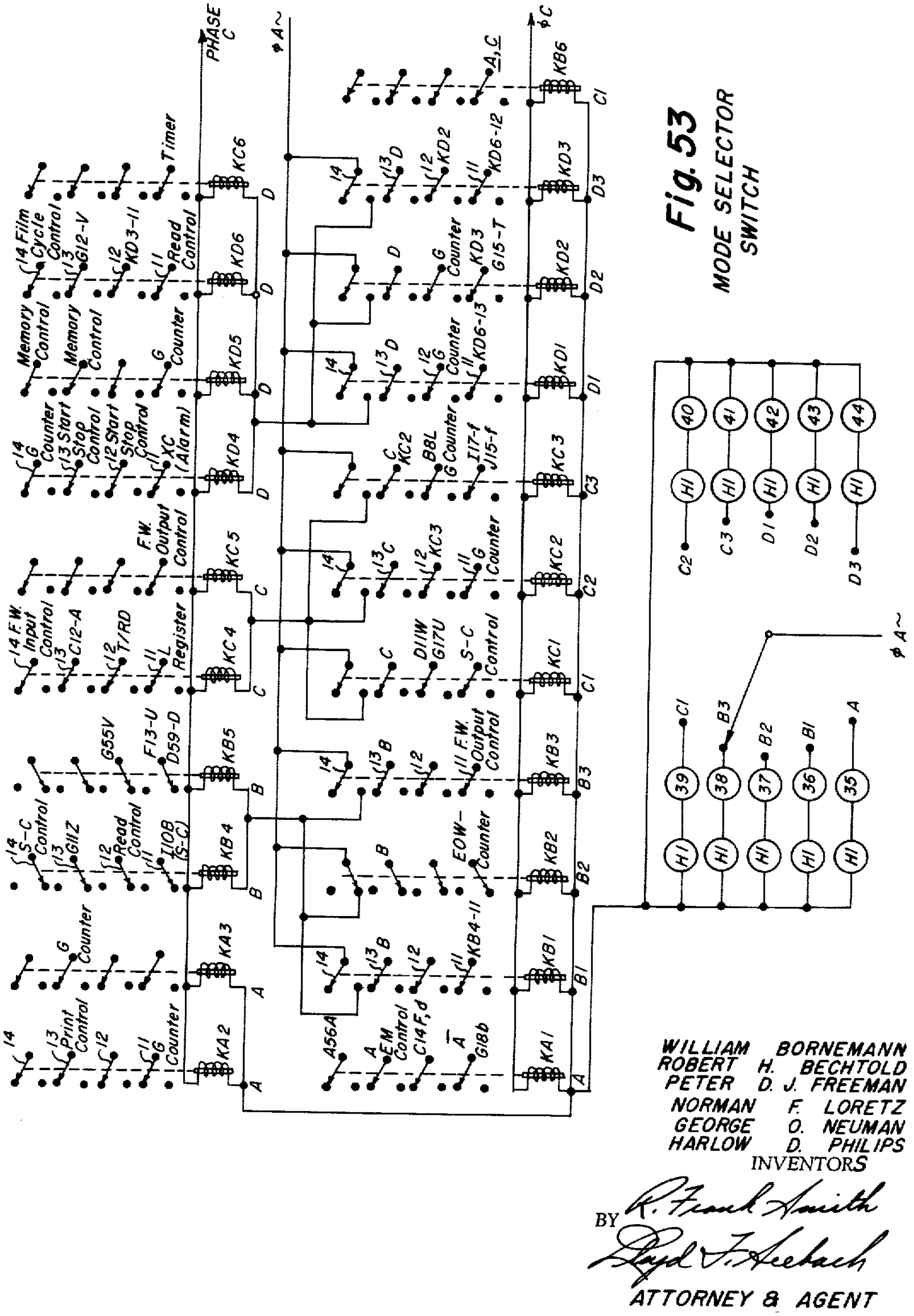

Each position of the mode selector switch 422 modifies the machine internal program and changing this switch from one mode designation to another also resets the initial clear circuits, see FIGS. 51 and 53. The mode selector switch comprises two wafer sections each of which has one pole and ten positions, one for each mode. One wafer of the switch has all contacts connected to each other and is in series with the +110 volt line to the initial clear circuit through relay KE1, see FIG. 51. Thus by changing the switch position, the voltage to relay KE1 is broken and the initial clear circuits reset. When required, resetting of the initial clear circuits can be inhibited by the override push button 455. The other wafer has its contacts connected to a group of relays for each switch position which must be modified to change the program in view of the large number of circuits. Since each switch position corresponds to a mode, the contacts of the relay are used to set up gating, switching and other miscellaneous conditions required for each mode of operation. The various relays and circuits to which the selector switch is connected is shown in FIG. 53.

Figure 54:
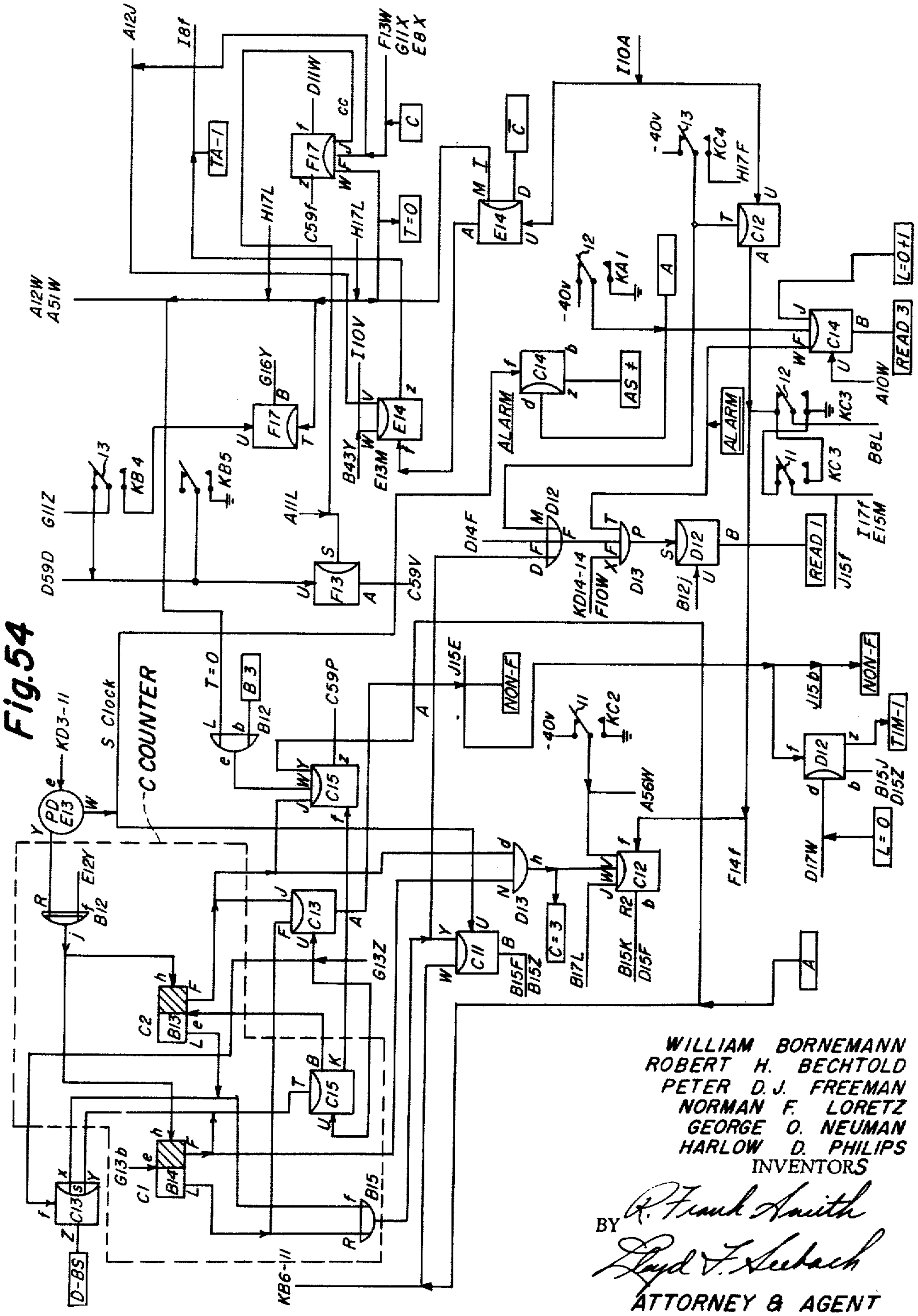

The C counter, see FIG. 54, keeps track of the number of successive empty card nests 256 that pass the reading station 160, and this information is used to detect that cards are not feeding. The C counter consists of two flip-flop stages B13 and B14 and associated control pulse gates. The counter is set to three by the initial clear pulse when starting from initial entry or, after cards reach the reading station, by the S clock pulse from the card. If a card is not detected and the Read flip-flop H14 is set, see FIG. 59, pulse gate G13*f* is enabled for all counts except two and its output indexes the card disc 35 to seek the next card. The search continues until the count reaches two and if no card has been read, pulse gate C13*f* is disabled, inhibiting card indexing and enabling gate C13U thereby permitting a card nonfeed sequence to start. If a card had been found before the C counter reached two, the S clock which is read from the card would have set the C counter back to its normal count of three.

The G counter, see FIG. 55, is used only in Mode D1 and in this mode the programmer memory is used as a buffer during the type out of all the code on each card. However, the maximum number of words on a card can exceed the thirty-two word memory capacity. The thirty-third word is stored in the R register when the memory overflowed condition is detected and the boundary conditions to be established in this mode of operation are as follows: less than thirty-three words on a card, exactly thirty-three words on a card, more than thirty-three words on a card but less than sixty-six, exactly sixty-six words on a card, and more than sixty-six words on a card. These five conditions can be handled by the four states of the G counter by utilizing the existing redundancies and the output of the boot strap circuit in the memory control. The G counter keeps track of the number of groups of memory loads required per card and consists essentially of the two flip-flop circuits B9 and B10. The numerical states of this counter are based on binary coded decimal notation in which the zero state is the cleared state. The counter is set to one the first time the memory overflows during the reading of a card, and this establishes that there are thirty-three or more words on the card. After the contents of the memory have been typed out, the G counter is inspected by pulse gate C9*f* and this starts the second reading (Read 2) of the card. Since the memory overflowed during the first reading, it must overflow again at the thirty-third word during the second reading, and this time the state of the counter is sensed by pulse gate C9U which causes the memory control to clear the memory and the R register and sets the counter to two through pulse gate C10U. This takes place between the reading of the thirty-third and thirty-fourth word. If there is no thirty-fourth word on the card, the counter will be reset to zero by the boot strap G10 signal from the memory control circuit. If there are sixty-six or more words on the card, then the memory will overflow again at the sixty-sixth word. Pulse gate C10*f* is open because $G=2$ and starts the type out, resets the Read flip-flop H14 and sets the counter to three. When the content of the memory has again been typed out, the G counter is inspected by pulse gate C9*f* and the card is read a third time. This time the memory overflow signal clears the R register and the memory through pulse gate C9U after the thirty-third and sixty-sixth words. The state of the counter is not changed because pulse gate C10U is closed. If there is no sixty-seventh word, the counter will be reset to zero by the boot strap G10 signal from the memory control circuit. If there are more than sixty-six words on the card, then there must not be enough words to again overflow the memory and this limits the card to ninety-eight words and insures a partially loaded memory and no third overflow. Whenever the memory is only partially loaded, pulse gate G12*f* will be open at End of Scan time, and this sets the G counter to two for all remaining conditions of less than thirty-three words, thirty-four to sixty-five words and sixty-seven to ninety-eight words. When the memory is cleared, the state of the G counter enables pulse gate C8*f* which clears the counter to zero and continues the program.

The L-register, see FIG. 47, is used in all modes and consists essentially of two flip-flop circuits E56 and E57. In all Modes A, B and C the states of the register represent the phases of starting, making a leader, making duplicates and making a trailer. The output states of the register control pulse gates which, in turn, select the next machine routine. The state of the L-register also determines whether a trailer is made and the buzzer is sounded during an alarm condition. In Mode D, the L-register controls the signal for initiating card reading. The states of the L-register are as follows: for $L=3$—machine has been cleared and is ready to start operation or is making initial leader; $L=2$—leader has been made and machine has not yet begun to make duplicates; for $L=1$—machine is making leader after out-of-film re-entry; and $L=0$—machine has no good duplicates and must run out trailer before stop and, if in mode D, enables Read signal after card cycles.

The L-register is initially set to three by the initial clear pulse, and the register is inspected and set to two by the stop film pulse SFP at the end of the leader in Modes A, B and C through pulse gate F55*f*. The register remains set at two until the programmer determines that good duplicates are going to be made. At that time the register is then set to zero. In Mode A, the S clock (AS–), during reading, is used to set the L-register to zero. In Modes B and C, the output of pulse gate G12U (Comp) is used to set the L-register to zero because it implies a DN compare has been correctly made. In these modes of operation the output of pulse gate D9*f* ($R=\underline{OS}$) is also used to set the L-register to zero because any file word released from the memory implies that a duplicate will be made. The two gates G12 and D9 are required to make initial entry and out of film re-entry. When the L-register equals zero, the gates for trailer run out are enabled. If the machine runs out of film in Modes A, B or C and $L=0$, it makes a trailer and stops and, at this time, the L-register remains at zero. Upon loading film and pushing the start button 428, the L-register is set to one by the start pulse from pulse gate A17*f* via relay contact KD4–13 and OR gate E58*h*, see FIG. 60. By this means the programmer executes a control routine for $L=1$ or film re-entry via pulse gate F56U when the leader SFP comes along. In the D modes, the L-register controls the Read signal command from pulse gate D17U and the Start pulse sets the L-register to zero via contact KD4–13 and OR gate E58*h*, see FIG. 60. During every card cycle a Read signal is generated from pulse gate D17U providing $L=0$. The gating of $L=0$ is required to inhibit the Read signal that would otherwise be generated during the card cycle that is part of the initial clearing operation, thereby causing a card reading before the machine is commanded to start.

The out of film circuits shown in FIG. 56 are utilized only in Modes A, B and C. In these modes of operation these circuits prevent the duplicator unit from being started without film and stop it when the film supply becomes too low during the course of operation. The machine is stopped in a manner that permits the operator to replace the film without losing any steps in the program. When the machine is initially cleared, the conditions of Start and Stop exist in the machine. Therefore, two inputs, Start and Stop, will be low at gate A58. If FS is also low, indicating an out of film condition, the input to the indicator will also be low and this low signal causes the indicator 460 on the console panel to be energized. Once the machine is in operation, only the Film signal can light the indicator. Since it is possible to detect an out-of-film condition long before the machine has reacted to it and has run out a trailer and stopped, this circuit prevents the indicator from being energized prematurely.

The film supply in the duplicator unit 20 is sensed by arm 104 actuating microswitch 189. The switch energizes relay KD12 in Modes A, B and C when the film spool diameter is below a predetermined minimum. When KD12 is energized, contact KD12–7 closes pulse gate A17*f*, see FIG. 60, and provides an interlock to prevent the machine from starting without film. KD12–2 picks up relay KE3 which arts as a synchronizing delay and holding circuit. The sensing circuits are interrogated by film cam FC3 through relay KE2 during the first film cycle to follow and this signal checks up relays KE4 and KE5.

Two different signals are used to set the film flip-flop H18 and stop the machine. In Mode A the S clock pulse AS is used to inspect pulse gate G18U and in Modes B and C film pulse FP–1 which is generated by pulse driver E16S is used. Each of these signals occur once per duplicate. Pulse gate G18U is gated on a number of signals each of which has been assigned priority over an out-of-film stop. This prevents the occurrence of simultaneous stops arising from several different sources. When pulse gate G18U is enabled, either FP–1, A, or AS clock will gate direct to set the Film flip-flop H18 and generate the end of film (EOF) signal. The setting of flip-flop H18 turns on the out of film indicator 460 and inhibits signals which normally would perpetuate the program. The EOF pulse is the new perpetuating pulse to generate trailer and trailer edge marks and the Start flip-flop A18 is also set to enable the re-entry after the film has been replaced.

The signal for re-entry from out-of-film is obtained through pulse gate A17*f* because the FR line is high. This signal resets the Start A18 and Film H18 flip-flops and the film sensing relays. The relays are cleared by pulsing univibrator D57 which picks up relay KF3 and thus breaks the holding circuit on relays KE3, KE4 and KE5. The output of A17*f* also starts the program again by resetting the L register to one and starting the timer to run out the leader.

The R register provides storage for the S tagged word ($S_m$) during the S compare operation in Modes B and C. It also serves as a buffer register between the memory and the code target bit shutter solenoid drivers in Modes B and C. This register contains the first six bits of the memory (tag character) which are monitored for certain tag characters that affect memory control in Modes B, C and D and hence, serves as a buffer register between the Flexowriter input-output circuits and the memory in these same modes of operation. The DN is stored in the R-register during the S Compare time and the R-register provides the compare circuits with the bit signals required to make the S compare check. The R-register also provides buffer storage for the code target word. Each stage of this register is connected to the input of its corresponding thyratron bit solenoid driver through the plugboard.

The R-register serves as an input buffer between the Flexowriter and the memory. It accepts six bit characters from the Flexowriter input circuits through gates D20, D22 and D24 and stores them in flip-flops C19–C24 until the shift command is received from the Flexowriter control crcuits, only gate D20 and flip-flop C19 being shown in FIG. 57B. The R-register is arranged in seven six-bit sections and a shift command transfers a character of six bits from one section to the next. The shifting operation can best be described with respect to FIGS. 57A and B in which each register flip-flop, except the last six C1–C6, has a pulse gate such as D54 connected to its one state output. These pulse gates have a 20 microsecond delayed D.C. gate input and by means of this delay the shifting is accomplished first by resetting all of the register flip-flops and then interrogating all the pulse gates with a delayed pulse within the 20 microseconds. Univibrator B26 in the Flexowriter input control circuit, see FIG. 67A, generates a 15 microsecond delayed pulse for this purpose and this delay is long enough to insure that the flip-flops have reset before the delayed pulse passes through those pulse gates that are still open thereby setting the corresponding flip-flops in the next section. This operation is continued until seven characters are loaded into the register. At this time the information is then ready to be transferred to the memory.

As mentioned above the R-register also serves as a buffer between the memory and Flexowriter. In this mode of operation it receives words from the memory and couples them to the Flexowriter tag decoder and parity generator circuits. This is accomplished by the shifting process that is described above, the only difference being that the register is unloaded at the tag end instead of being unloaded at the other end. Flip-flops C1–C6 are connected to supply the tag bit signal levels to the tag decoder and parity generator circuits. The signals derived from the R-register tag bits are inspected and used to control the programmer operation.

The read control circuits, see FIG. 59, provide for synchronization with scanner timing, detection of presence or absence of a card at the reading station and enable or inhibit the input of information from the card reader circuit. As described above, the code reader utilizes an oscillating mirror type of scanning device to produce synchronization, timing mark and data signals. These are produced during the forward scan of the mirror and the period of time when the mirror is traversing the area in which a card may be located is designated by Start Scan and End of Scan signals. These last mentioned signals are used to gate the Timing Mark signals derived from the scanning of the card. The gated Timing Mark pulses are the machine clock pulses for the program steps requiring card reading. Start Scan and End of Scan signals are shaped by a Schmitt trigger pulse driver combination consisting of J12, J13 and I13. The Timing Mark signals are shaped by a Schmitt trigger circuit and pulse gate combination consisting of J11 and I12, the pulse gate I12U being gated by the Scan flip-flop H12 which enables it only during the forward scan of the code reader. By this arrangement the possibility of any spurious signals entering the machine clock circuits is avoided.

Since the code reader is free running, synchronization with the programmer cycles must be provided. When it is desired to read data from a card, a suitable program signal sets the Read Delay flip-flop H15 and the next acceptable time for reading card data is preceded by a Start Scan signal. This signal inspects the state of H15 through pulse gate G15 and if it is set, sets the Read flip-flop H14. H14 enables the card detection circuits which determine whether or not a card is present at the reading station. When the presence or absence of a card is determined, H15 is reset. The order to read can be terminated at any time by resetting the flip-flop H14 with a suitable program signal. This closes pulse gate I12*f* and inhibits further clock pulses. The End of Scan signal will reset the Read flip-flop H14 if it has not been reset by any signals prior to that time.

Card detection is accomplished by recognizing the coincidence of the first S tagged code word and its Timing Mark signal from the code reader. This signal is generated by pulse gate I11*f* and sets the Card flip-flop H13 as well as supplying a signal to the programmer to inform it that there is a card present at the reading station. In Modes B3, D2 and D3 the clock pulses generated at the time prior to the setting of the Card flip-flop H13 pass through pulse gate G13U. These signals are used to set up the carriage return circuits of the Flexowriter for the next type out. If there is no card at the reading station, pulse gate G13*f* recognizes EOS, Read and $\overline{\text{Card}}$ and supplies a No Card signal to the programmer and resets flip-flop H15 thereby continuing the program on the basis of that information.

When a card is being read in any of the B modes, the result of the DN comparison initiated by the S clock pulse determines in part whether or not the memory is to be loaded with file words from the card being read. If $S_c$ is not equal to $S_m$, then the pulse generated by univibrator F11 passes through pulse gate I10U, see FIG. 62. This signal is further gated, on Mode B and $N=0$ or M check defeated, by pulse gate **I10*f*. From this point it enters the memory control circuits at I8S which clears the memory and the R-register and since Read H14 is set, loads the S tagged code word into the memory. Any other S tagged code words appearing on the card will be ignored by the tag selector circuits due to the gating of the Card flip-flop H15 on the S tag. The numeric clocks (#) supplied from the tag selector are gated on Mode B by pulse gate H11U and go directly to the memory control via G8R to load the respective file words into the memory. This process is stopped when the End of Scan signal from the scanner resets the Read flip-flop H14 and initiates the next step of the program. When a card is being read in Mode D1, the tag selector is bypassed by relays KB4 and KD6 and all clock pulses from pulse gate I12*f* go directly to the memory control. The memory can only be loaded as long as the Read flip-flop H14 is set. In Modes D2 and D3 the Read flip-flop H14 is reset by the Z clock pulse which is delayed by univibrator F15** for 50 microseconds to insure the loading of the Z tag word into the memory. In Mode D3 the tag selector is switched into use by KD3 to identify only the S clock pulse.

Figure 62:
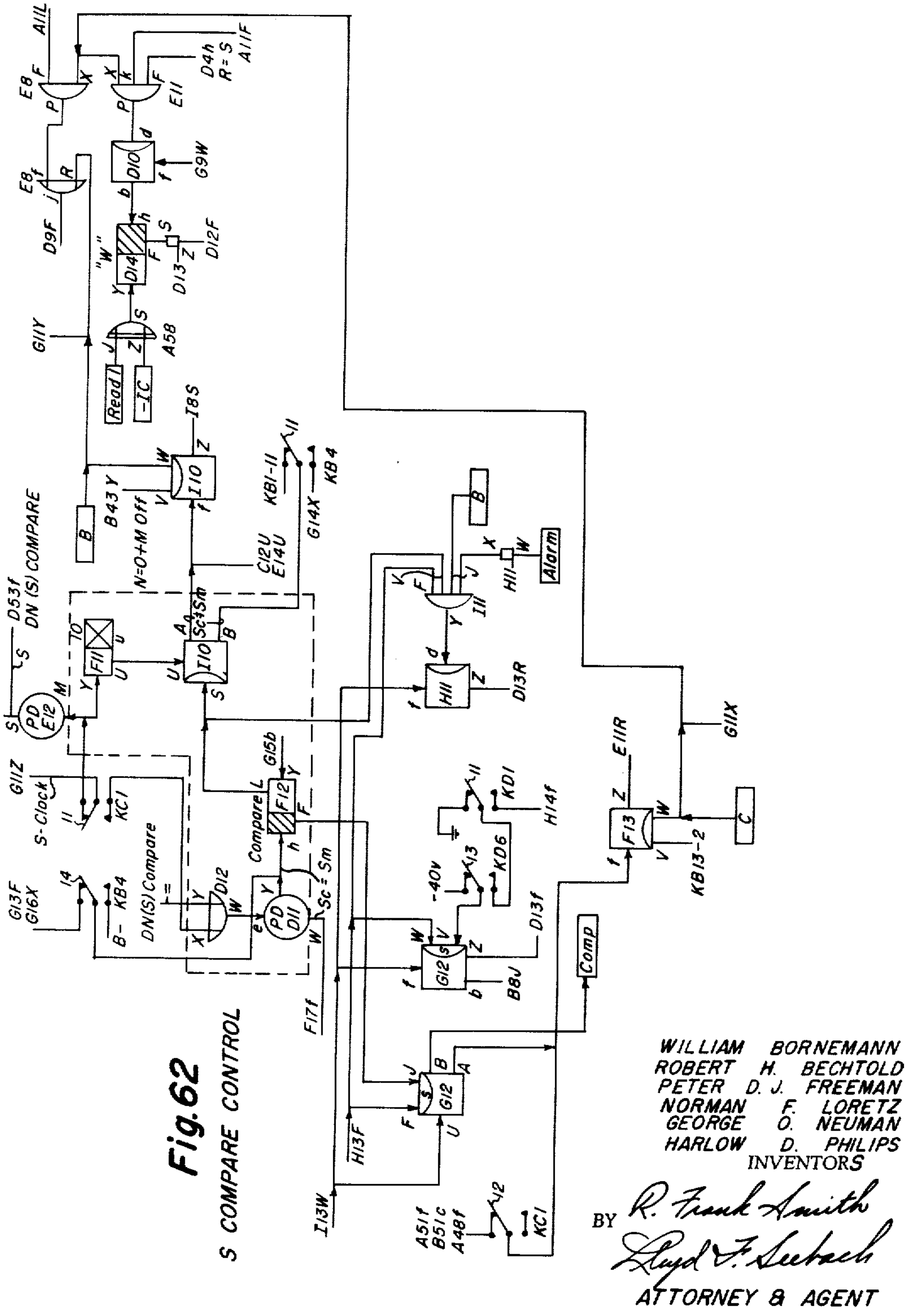
Figure 63:
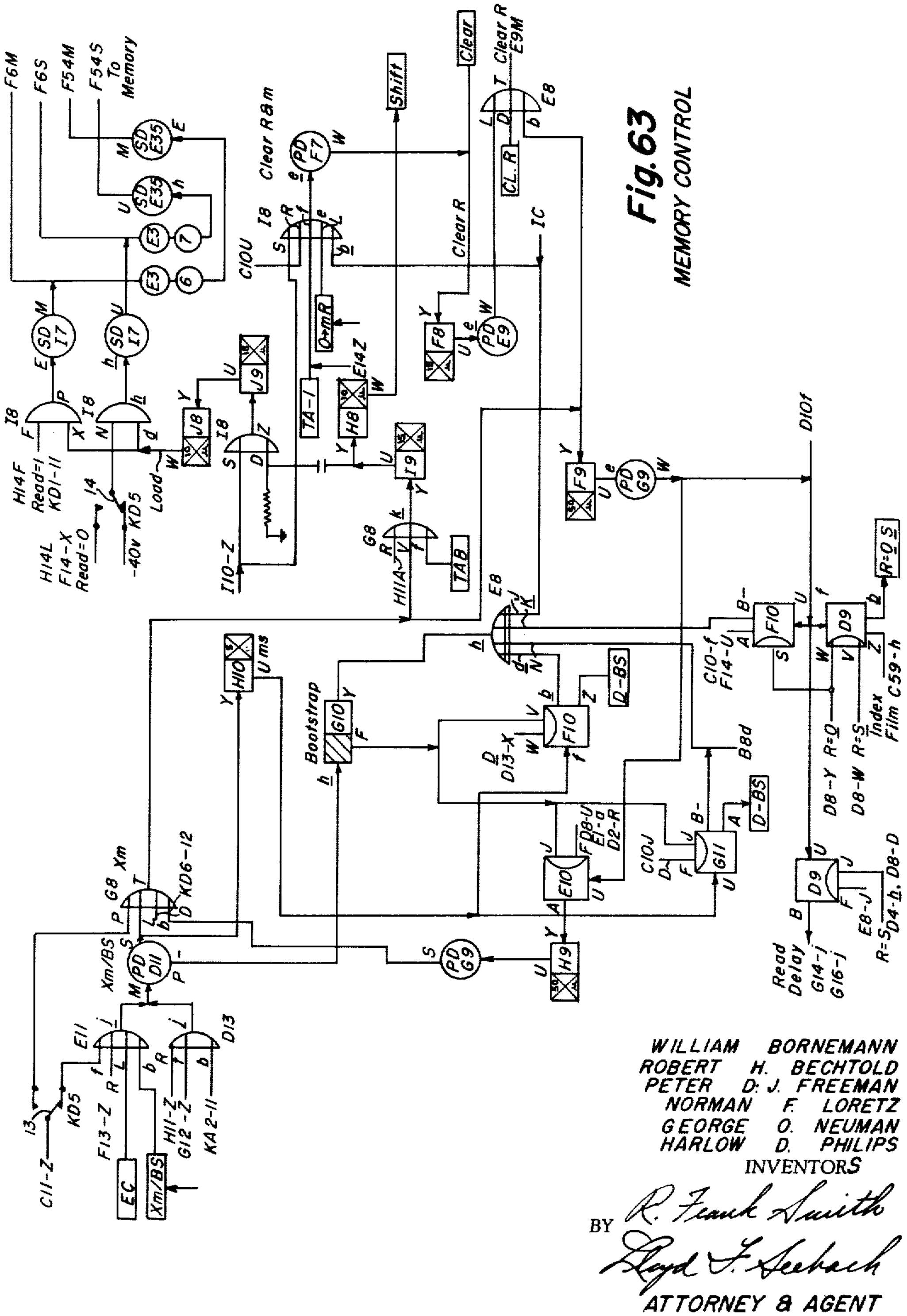
Figure 64:
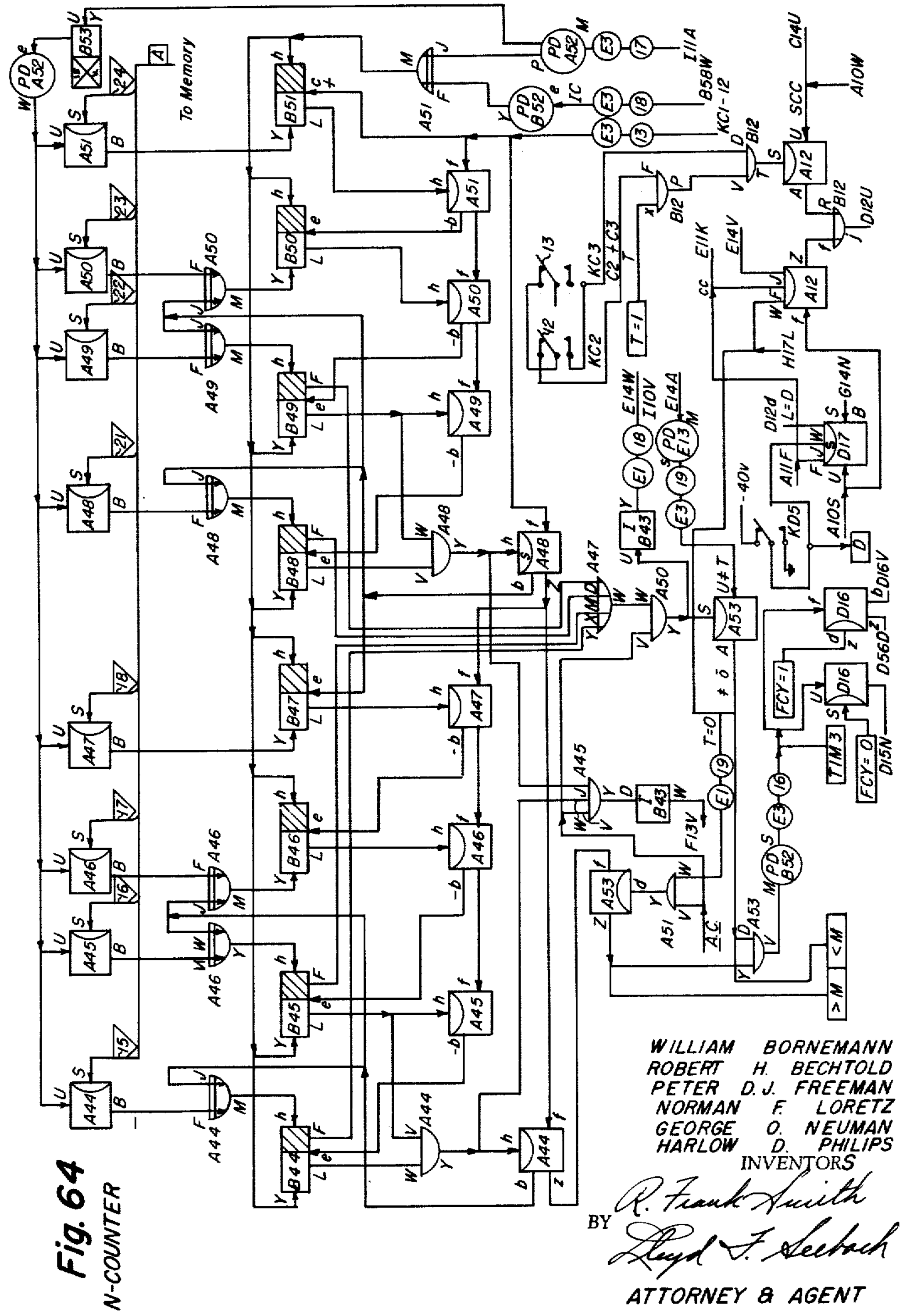

The W flip-flop D14, see FIG. 62, is used only in the C modes during the special case of adding one file word per set. This case is unique in that only one duplicate is made of each card with code addition. During duplication an S tag emerging at the tag decoder out of the memory initiates a read number. If only one file word is in the memory (besides the S tagged word) then the command to read would come during the card cycle that will carry the next card to be read to the reading station. The W flip-flop D14 stores the read command until the end of that card cycle. This is accomplished by gating the End of Card Cycle pulse from A10M, see FIG. 43, on W in pulse gate D12U, see FIG. 54, which then generates the read command (Read 1) by setting read delay H15.

The start-stop control circuit, as shown in FIG. 60, provides for stopping the machine and for starting it with respect to the correct program sequences in all modes of operation. To accomplish this, it is necessary that these circuits be gated on a number of conditions in the programmer. There are two basic methods of starting the duplicator, one requiring that a leader be generated in all but the D modes of operation which is for initial entry and out-of-film re-entry, and the other condition requiring no leader and in which re-entry is obtained from a manual stop. The start signal from Schmitt trigger circuit A18 must pass through one of two gates to determine which of the two starting conditions is to be used. Pulse gate A17U is used for starting from manual stop without a leader in all modes of operation and pulse gate A17*f* is used for starting from initial entry or out of film re-entry. With respect to pulse gate A17U, this gate is responsive to $\overline{\text{Film}}$, IC, Start and Stop, whereas gate A17*f* is responsive to IC, Start, $\overline{\text{FS}}$ and ($\overline{\text{Stop}}$+FR). The output signal from pulse gate A17U sets B11 for the GO circuit which further gates the pulse to re-enter the program. The output signal from A17*f* starts the timer and sets up conditions to start with a leader. These signals are also used in the Mode D operation without film cycle through suitable relay gating.

The function of the Start flip-flop B18 is to store the fact that the machine is ready to be started. The flip-flop is, therefore, set by initial clear (IC), end of film (EOF) and manual stop signals. Each of these signals represent a condition from which the machine may be started and the Start signal passed by either pulse gate A17*f* or A17U resets the flip-flop B18. The start indicator 461 on the console panel 26 is energized when flip-flop B18 is in the reset state and this flip-flop is also used to gate the hatch push button 462 interlock.

The programmer may also be stopped manually by actuation of either the stop button 429 on the console 26 or the stop button on the duplicator unit 20. The signal from either of these buttons actuates the stop Schmitt trigger B56. This in turn sets the stop delay flip-flop B55 which stores the command and provides synchronization between this random input and the programmer timing. Two sources supply signals to inspect the state of this flip-flop, one being the GO circuit through B11 and the other the film pulse FP1. If either of these signals are passed through pulse gate C55U, the Stop flip-flop B56 is set. With the setting of this flip-flop circuit, the circuits that would normally continue the program are disabled. A second pulse, either the GO reset pulse (GO–1) or film pulse FP–2 then inspects the stop flip-flop B56 and as the flip-flop is set, one of these pulses is passed through pulse gate **C55*f* and sets the Start flip-flop B18** preparatory to re-entry.

The GO circuits are used to inspect the Stop Delay flip-flop B55 during certain common steps of the program and to provide the delayed pulse to inspect the Stop flip-flop B56. The initiating pulse can come from any one of four sources in the program; three of which occur at a time when it is convenient to stop and the fourth is the re-entry start pulse. These pulses set GO univibrator B11 and the 50 μs. setting signal inspects Stop Delay flip-flop B55. The reset signal also inspects the pulse gate **C55*f* which is gated on Stop to set the Start flip-flop B18; pulse gate G17*f*, see FIG. 47, which is gated on $\overline{\text{Stop}}$, $\overline{\text{Film}}$ and A to continue Mode A; pulse gate C11*f*, see FIG. 55, which is gated on $\overline{\text{Stop}}$, $\overline{\text{A}}$ and ($\overline{\text{T}}$+$\overline{\text{C2}}$) to continue Modes B, C and D, when not in a search routine; and pulse gate A56U, see FIG. 69, which is gated on $\overline{\text{Stop}}$, $\overline{\text{A}}$, C2 and T to continue Mode C2 when in a search routine. When the machine is restarted from manual stop, the Stop and Stop Delay flip-flops B56 and B55 are reset and GO (B11**) is again inspected. At this time the program is continued exactly where it was interrupted by the stop signal.

Figure 61:
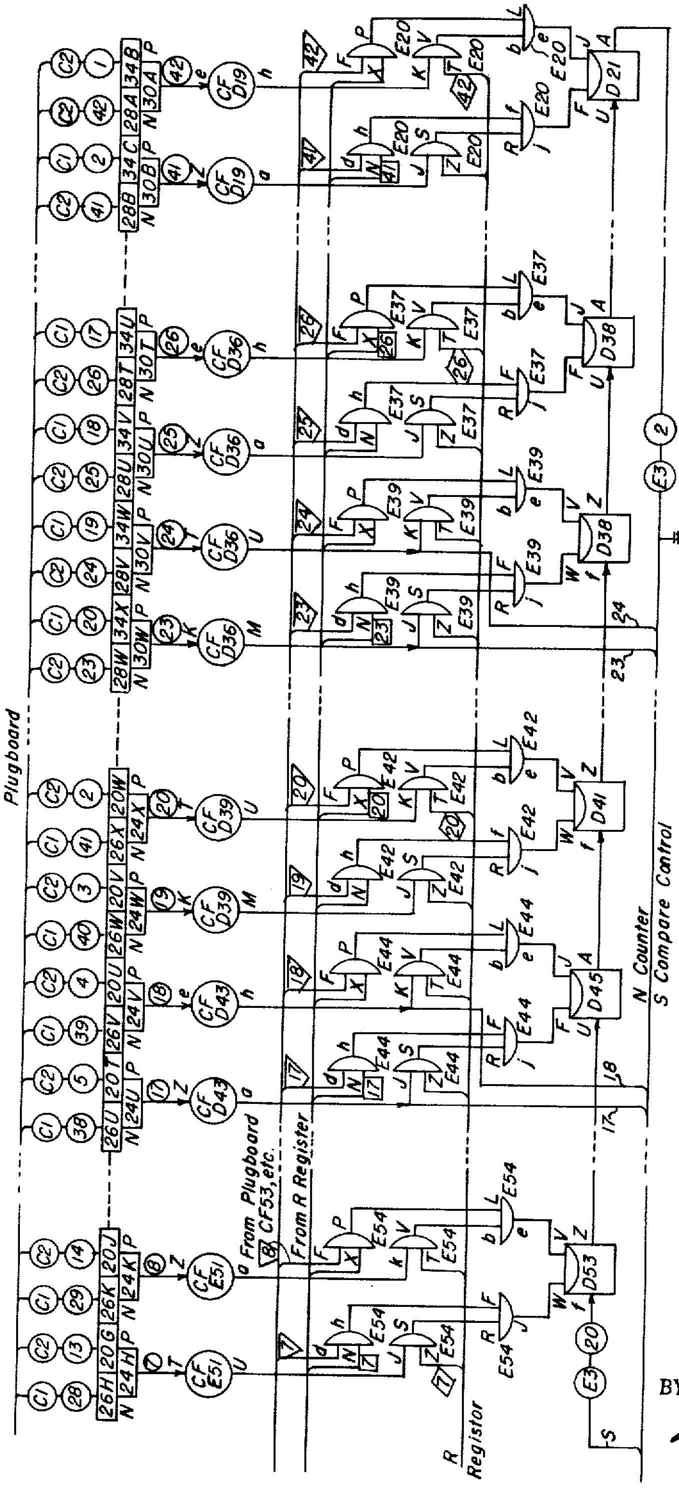

Comparison of the DN on the card being read against the DN stored in the memory is required in Modes B and C. This comparison is performed during the time the read routine is in progress and more specifically during the time the S tagged word on the card is being scanned. One of the words ($S_m$) is located in the R-register and the other ($S_c$) is the one being scanned. The first operation guarantees that the Compare flip-flop F12, see FIGS. 61 and 62, is set to the "zero" or "not equal state" and this is performed by Start Scan (Read Delay H15) from **G15*f* at the same time it resets the Read flip-flop H14 to start the read routine, see FIG. 59. Upon recognition of the S tagged word on the card, the S clock signal gated on Modes B or C by pulse gate G11F sets univibrator F11 and through pulse driver E12 interrogates the first of eighteen pulse gates, such as D53 in FIG. 61. Each of the eighteen pulse gates inspects two of the thirty-six bits comprising the DN. The gates will be open only if both corresponding bits are either one or zero. If the words are equal, the pulse from driver E12 will be transmitted through all gates in about 2 μs. and will set Compare flip-flop F12 and continue the program. Setting the Compare flip-flop F12 inhibits the reset pulse from univibrator F11. If the words are not equal, the Compare pulse from driver E12 will be inhibited and univibrator F11 generates a pulse delayed by 10 μs. from the DN Compare pulse when it resets. The delay allows the propagation of the comparison signal through the eighteen pulse gates and the setting time of the Compare flip-flop F12. If the words are not equal, as determined by the state of the Compare flip-flop F12, the delayed pulse from F11 continues the program through pulse gate I10U. Mode C1 does not require the comparison of the DN. However, because of program logic similarities, it is desirable to establish conditions simulating comparison equals. As a result, in Mode C1 the S clock signal is switched by relay KC1–11 directly to OR gate D12W through pulse driver D11 to set Compare flip-flop F12** to "equal" and supply the equal signal to continue the program.

The core memory of the programmer provides for storage of code words which may be derived either from a card read by the code reader or from the Flexowriter tape reader. The memory control circuits automatically load, shift, index or clear the memory when supplied with a command signal for the programmer. These circuits also provide signals to continue the program when the memory manipulation is completed, see FIGS. 57A and B.

The memory consists of forty-two core shifting registers each of which is thirty-two bits long and which has a storage capacity for thirty-two code words. During the B modes of operation the memory accepts and stores S, T and up to thirty numeric tagged file words from the first card of the set to be duplicated. During the C mode of operation the memory accepts and stores S and up to thirty-one file words from the Flexowriter tape. During the D mode of operation the memory serves as a buffer storage between the card and Flexowriter type out circuits.

Figure 57A:
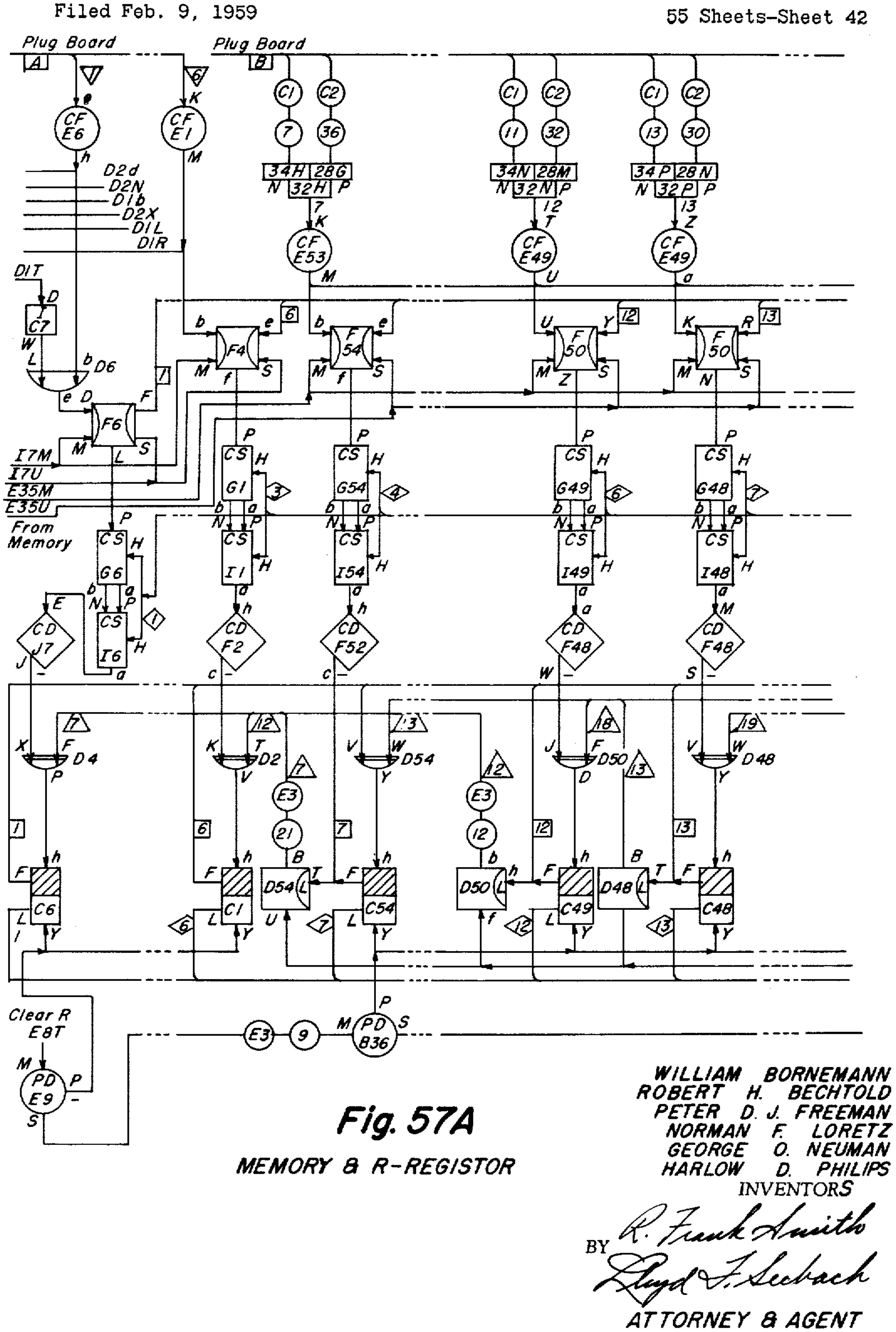
Figure 57B:
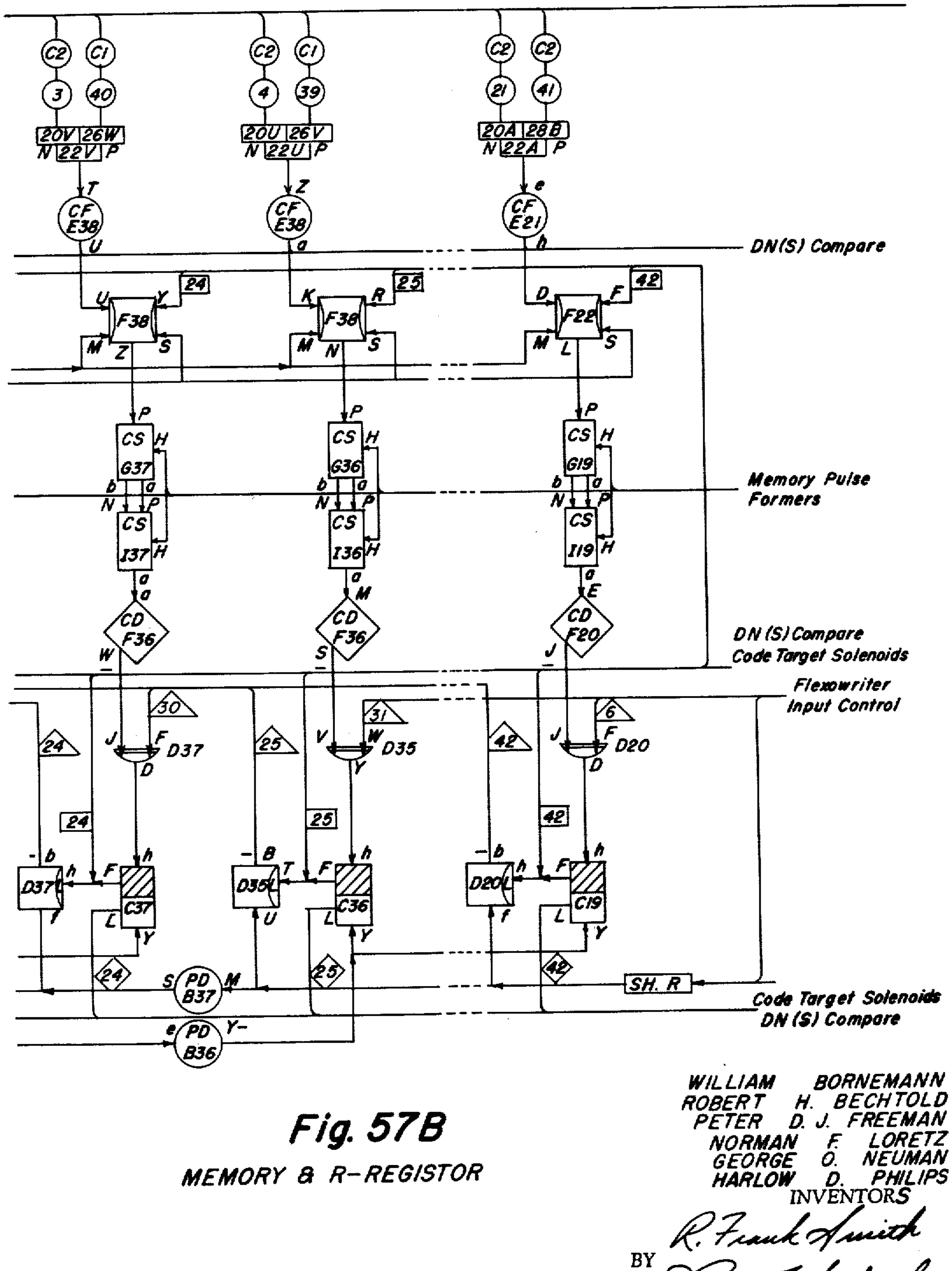

Each bit of a word stored in the memory is located in one of the thirty-two bit core shifting registers. Each of these registers consists of two core packages, such as G54 and I54, connected in series as shown in FIGS. 57A and B. The entire memory is always driven at once to give parallel operation so that a bit inserted into any core line is shifted one place down the line by an input to univibrator H8, see FIG. 63. This is accomplished in the following manner: univibrator H8 generates a 10 μs. square pulse which is power amplified and inverted by special driver H7, see FIG. 58. The leading edge of this negative signal starts a precisely tuned pulse forming circuit on the pulse former package F5. The pulse former output is a 2.1 μs. pulse capable of driving four core packages and on each core package the 2.1 μs. pulse turns on the shift current driver to generate a one bit shift.

The memory is loaded by setting the first bit of each core shifting register to the desired state which is then stored by shifting it down the register successively from core to core. The loading is accomplished by having the set windings of the first row of cores connected to the outputs of the core loader package such as F6. Each core loader is essentially a two input AND gate. The information to be stored is supplied at one input and a load pulse broad enough (10 μs.) to set the cores is applied at the other input. If both inputs to the gate are high, the core will be set to one. This is accomplished by using the Scanner clock or the Flexowriter tape Tab command as an input to the memory control at I9Y. The memory control takes care of the timing and shifting and then pulses univibrator J8 which generates the 10 μs. load signal.

The last core in each shifting register is connected to a core output driver, such as J7, which is an amplifier capable of receiving the carry pulse of a core and converting it into a pulse that can set a flip-flop. When the memory is shifted, the output of the last core in each register is used to set the corresponding flip-flop in the R-register, such as C6. The memory can be cleared to the state of storing all zeros by providing an extra long shift pulse. If the pulse is long enough, it can override all the set carry pulses it generates and force all cores to the zero state. The core clear circuits, such as G7 in FIG. 58, are essentially univibrators with a period of 8 μs. and when these circuits are pulsed they turn on all the shift drivers in the entire memory circuit. The carry pulses in the memory decay in about 7 μs. and since the clear shift is longer, the cores all return to the zero state. The outputs generated by the last row of cores will set the flip-flops in the R-register which can then be cleared by the pulse delayed by univibrator F8, see FIG. 63, to allow for all carry signals to emerge.

The timing of the various signals effecting the memory operation are generated by univibrator circuits in the memory control section. The period and the function of each circuit is as follows: J8 (10 μs.) shapes the memory load signal, J9 (15 μs.) delays the memory load until the memory has shifted or cleared, H8 (10 μs.) shapes the shift signal input to the pulse formers, I9 (15 μs.) delays the memory shift until the R-register has cleared, F9 (50 μs.) delays and generates the memory output interrogation pulse, H10 (5 ms.) generates the boot strap signal and H9 (50 μs.) continues the memory shift program.

In the programs the order "index memory" is referred to and means that the memory is to shift until the first word which is stored comes into the R-register. This is accomplished by the memory control and all shift command, except during loading, will cause the memory to index. The commands enter through diode OR gate G8T and set univibrators I9 and F9 and reset the entire R-register. Univibrator I9 generates the shift pulse and univibrator F9 generates a delayed interrogation pulse that inspects the several gates to identify the tag that came out of the memory and into the R-register. If no tag comes out of the memory (all bits zero) then pulse gate EIOU will be opened and the interrogation pulse will set univibrator H9. The resetting of H9 generates another shift command and the process repeats. The periods of F9 and H9 establish the rate at which the memory will shift to pass by the empty word spaces. Each of these univibrators has a 50 μs. delay so that the shift period is 100 μs. or at a rate of 10 kilocycles.

The procedure just described would continue indefinitely if the memory is completely cleared, except for the boot strap circuit. The boot strap univibrator H10 has a period of 5 ms. and is set along with flip-flop G10 when memory indexing is initiated. The words in the memory will emerge before 3.2 ms. (thirty-two shifts times 0.1 ms./shift) and will cause the reset pulse of univibrator H10 to be inhibited by resetting flip-flop G10 and closing pulse gates **F10*f* and G11U. If there are no words in the memory, then the indexing will continue until univibrator H10 resets and closes the shift gates by resetting flip-flop G10. The boot strap pulse continues the Mode D1 program and terminates the B and C modes of operation by indicating a memory error at 467 in the panel 26**.

The N counter is a two decimal digit counter operating in the card excess three code. This counter is an electronic flip-flop type, singly-gated counter and it accepts the numeric part of the multiplicity number M from the Z tag word. The counter stores this command and performs a count down in Modes B1, B2, B3, C2 and C3 for each card handled in a set. It continues this count down until the programmer control checks the count against the number of cards in the set handled. If the count is incorrect, the alarm for too few or too many cards is initiated. This M check feature may be bypassed by turning the M check switch 422 on the console to the off position. When this is done the programmer does not recognize any discrepancy in the number of cards in a set.

In the Z tag code word the characters in positions three and four indicate how many cards are in that particular set. This two decimal digit number is called the multiplicity number M and is represented by an excess three code. The programmer extracts only the last four bits of each number for its operation. The counter is set to zero by the initial clear pulse via B52*e* or the count load pulse from pulse gate I11U, see FIG. 59. The card timing mark signals come from pulse gate I12*f* and interrogated pulse gate I11U. This gate is enabled during the time the Z tagged word is read and its output sets the counter to zero and triggers delay univibrator B53. 15 μs. later the output of univibrator B53 interrogates counter output gates A44 to A51 inclusive and this delay is required to insure that the counter is reset before it is loaded and to insure that the counter load pulse gates are interrogated during the time the Z tag bit levels have reached their final value. The character in positions three and four of the Z tagged word determines which of these pulse gates A44–A51 are enabled. The counter stores this two decimal digit command and performs a count down each time a pulse is derived from G12U, see FIG. 62. Pulse gate G12U receives the EOS pulse at its input and is enabled if a card is detected and the DN on the card compares with the one of the set being duplicated. This count down continues subtracting one from the count for each card of the same set that is being processed. For the M check to be correct, the counter must have counted down to zero when the first card of the new set is read. If, however, this card has the same DN as the set completed, then the pulse out of G12U passes through gates **A48*f* and A44*f* to start the alarm sequences via OR gate A53 for too many cards. Gates A48F and A44F are enabled because the N counter contains zero. For the case of too few cards in a set the DN non-compare signal is detected before the N counter reaches zero. An N count other than zero with the M check switch 421 in the on position enables pulse gate A53U thereby allowing its input, the DN noncompare pulse from pulse gate I10U** via E14A to start the alarm sequence via OR gate A53.

The card counter, see FIG. 43, maintains a tally of cards which have passed through the reading station. The tally or count of each card is produced by the Start Card Cycle signal from pulse driver A10*e* which sets the CM flip-flop B59. If during the subsequent scanning of the card the timing marks are encountered (indicating the presence of a card in the reading station) then B59 is reset. After allowing sufficient time for recognition of a card, if present, card cycle cam CC3–1 connects the —165V line to A8 and causes the inverted signal from Schmitt trigger A8 to interrogate pulse gate **C61*f*. If B59 has been reset, pulse gate C61*f* is enabled and triggers univibrator D62 thereby energizing relay KF5. KF5 applies power to the counter 423** for 200 ms. and increases the count by one.

The duplicate counter, see FIG. 43, maintains a tally of duplicates made and counts only the good duplicates made by the leader and trailer edge marks. The tally or count of each duplicate is derived during the end of a film cycle by cam FC5–2 which sets relay KD8 thereby changing the high output state of Schmitt trigger A13 to the low state, see FIG. 45. At the start of the next cycle drive cam DC5–2 resets relay KD8 to allow the output of A13 to return to its high state. This positive going wave further is differentiated and produces a pulse that interrogates **A14*f*, A14U and C61U. Gate A14U is enabled when the edge mark counter equals one thereby permitting its output to interrogate both pulse gates C60*f* and C60U. If the leader code is in the edge mark register, the enabled pulse from C60*f* sets the CD flip-flop B60. When flip-flop B60 is set and NC is in equal to one, the enabled pulse from C61U triggers univibrator C62 and energizes relay KF6. KF6 applies power to the card counter 424 for 200 ms. and increases the count by one. The count continues for each film cycle providing the duplicate made is not rejected or that a trailer is not started. The count is inhibited for rejected duplicates by having the edge mark count of one disabled gate C61U. Gate C61U can also be disabled by resetting the CD flip-flop B60. This flip-flop is reset by either the initial clear pulse or by the pulse from pulse gate C60U** which is enabled when the trailer code is in the edge mark register.

Figure 65:
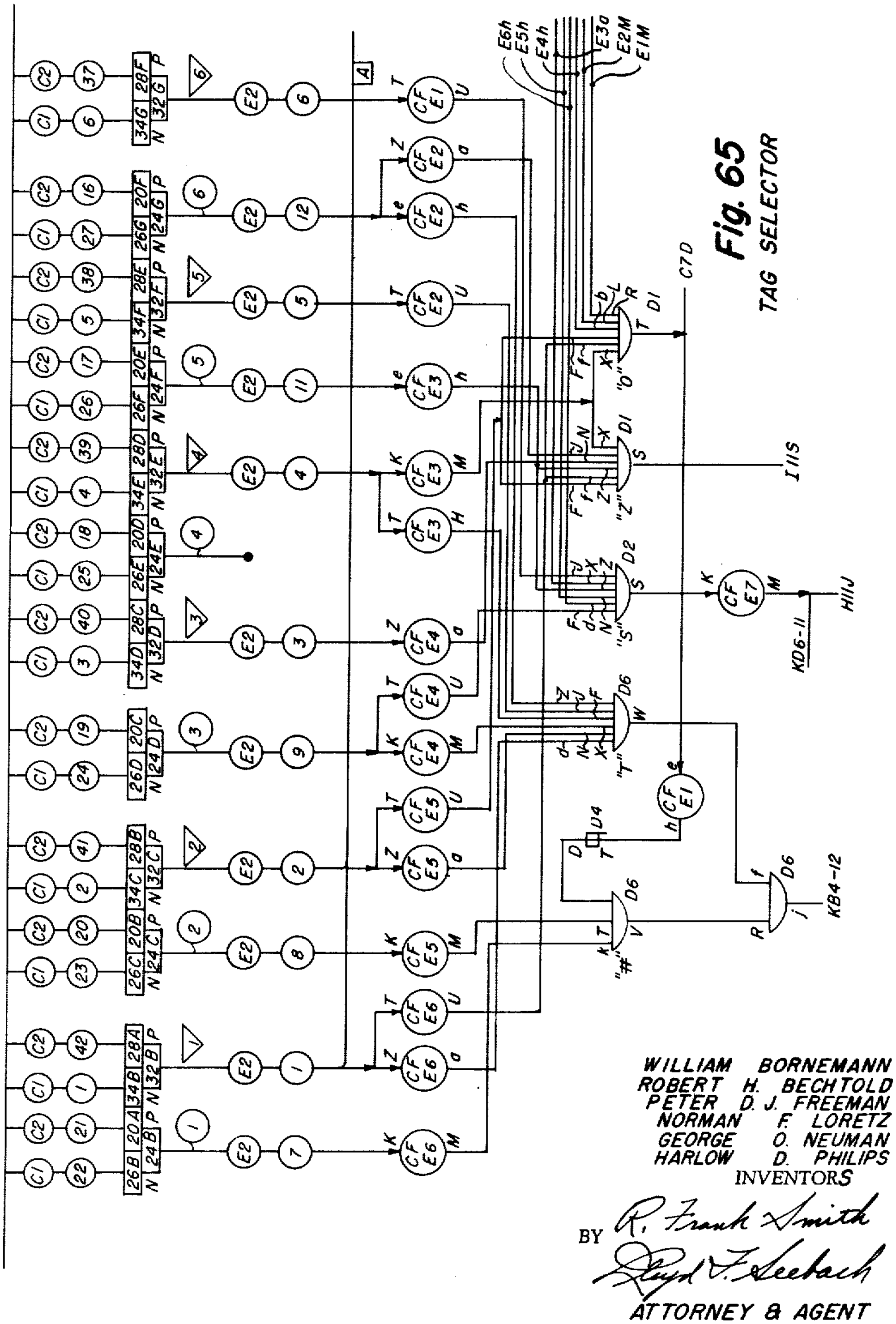
Figure 66:
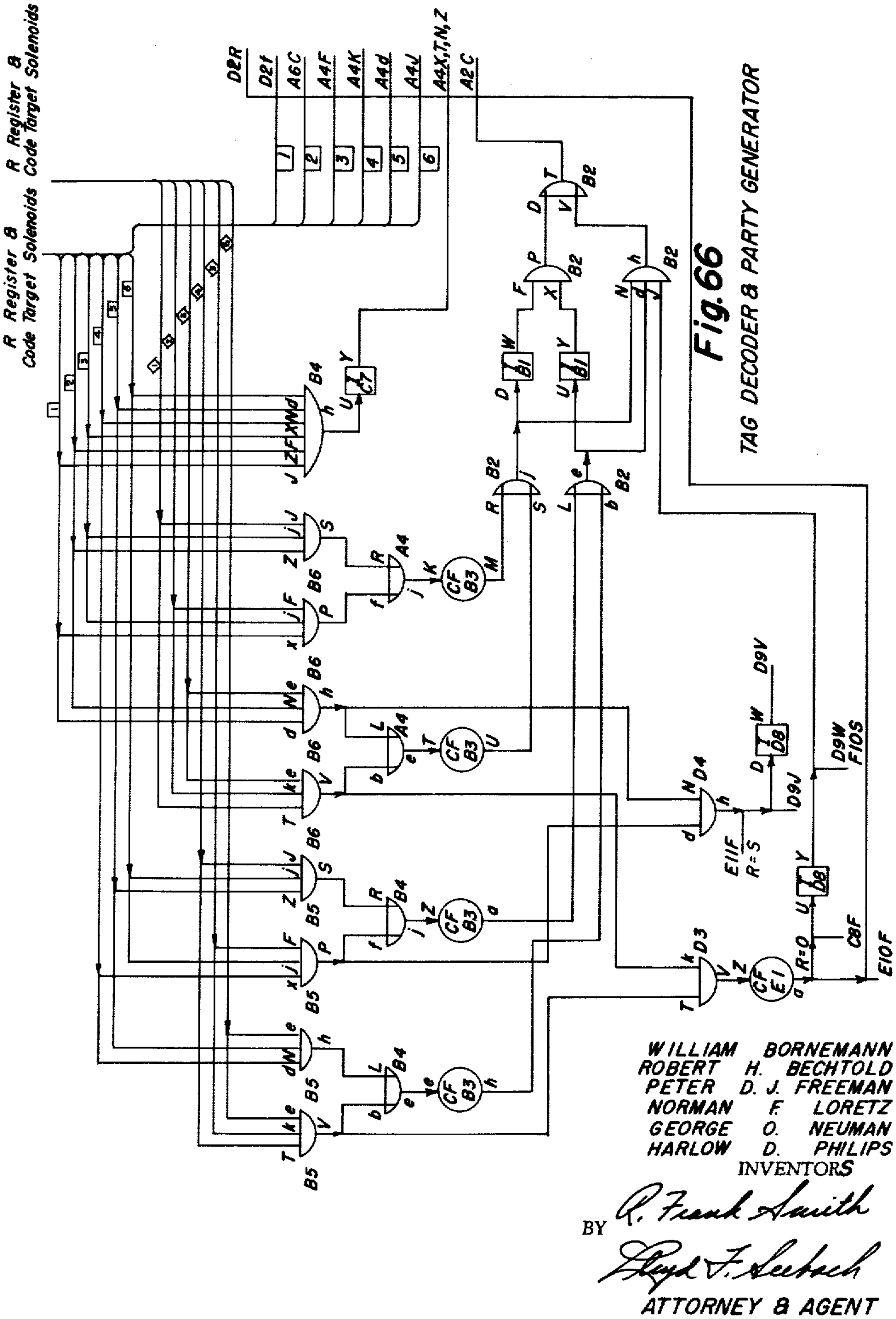

The tag selector, see FIG. 65, indicates to other portions of the programmer the presence of S, T, Z and other numeric tag words as the card is being scanned. The presence of one of these tag words is indicated by enabling the corresponding clock pulse. The S tag is recognized by diode gate D–2 and when the card code for S is scanned in the tagged part of the word, the output of diode gate D–2 and cathode follower E7K becomes high. This signal is then supplied to the read control circuit via K6–11 and I12W as a control signal, see FIG. 59, and also via H11J to I11*h*. The T tag is recognized by diode gate D6 and when a T tag is scanned the output of this gate becomes high. Since the programmer utilizes T and numerical tag words in the same way, a common signal indicating recognition of T or a numeric is formed by diode gate **D6*j* and is supplied to the read control circuit via KB4–12 to H11S as a control signal. Numeric tags are recognized by diode gate D6V and by inspecting the card codes for numerics, the numerics can be selected by recognition of binary zeros in code positions one and two. The only other card code with zeros in the code positions one and two is the character space. As a result, numeric codes can be recognized by the presence of zeros and the absence of a character space code. This logic being performed by diode gate D6V**.

The absence of a character space code is indicated by the signal from cathode follower E1*e* which is generated in diode gate D1. The OR of the "one" side of all code positions is generated since a "one" in any code position signifies zero. This zero gate also affects insertion of character space tagged words into the memory during the D modes of operation, because the memory control recognizes binary zero in the tag position as an empty memory position. The card code for character space (000000) must be converted to the Flexowriter code for character space (100000). The zero signal from diode gate D1 is inverted by inverter C7D and supplied as an input to core loader F6D through diode OR gate **D6*e***, see FIG. 57A, thus converting all zero characters to the Flexowriter character space code. The Z tag is recognized by diode AND gate D1S and this is utilized when transferring the multiplicity command from the Z tag word to the N counter via gate I11S in the read control circuit, see FIG. 59.

The decoding of certain characters (S, S̲, 0 and 0̲) in the tag portion of the R register is necessary to control shifting and circulating of the memory contents. Generation of a parity bit and recognition of character fill CF and character space CS codes is a requirement for Flexowriter output. The Flexowriter code is a seven bit code, the seventh bit being a parity bit which makes the number of ones in the character odd. The parity generator, see FIG. 66, enables the parity bit thyratron in the output circuits, if the character to be typed has an even number of ones. Bits one, two and three of the tag portion of the R-register are inspected for an even number of ones by diode gates B6S, B6P, **B6*h*, B6V, A4*e***, A4*j* and B2*j*. Bits four, five and six are inspected by diode gates B5S, B5P, B5*h*, B5V, B4*e*, B4*j*, and **B2*e***. A further parity is generated on the signals from diode gates B2*e* and B2*j* by inverters B1D and B1U and diode gates B2P, B2$h$ and B2T. The signal from B2T represents the character parity and is supplied as an input to the Flexowriter output circuits, see FIG. 67B.

Because the code for S requires a parity bit, it can be detected by combining certain logic existing within the parity generation circuits. As a result, the signals from diode gates B5P and B6$h$ are combined in diode gate D4$h$ to form a signal denoting the presence of the S tag in the R-register, this signal being supplied to W flip-flop D14 via E11F and D10$d$, see FIG. 62. Inverter D8D supplies $\underline{S}$ from the same source to D9V in the memory control circuit. Character space CS and R are identical as read from a card (0/000000). Because this is a character which requires a parity bit, it can be detected by also combining logic existing within the parity generation circuits. In this case the signals from diode gates B5V and B6V are combined in diode gate D3V to form a signal denoting the presence of CS or R equal zero. The $R=\underline{0}$ signal is formed by inverter D8U. When read from a card a character space CS in the tag position is converted to the Flexowriter code. However, the remaining characters are not converted and must be recognized and converted during the type out operation. Recognition of the character fill CF character is necessary for Flexowriter type out and is performed by diode gate B4$h$. Because this signal is used to inhibit, it is inverted by C7U before being supplied to the Flexowriter output circuits.

The plugboard is located in the cabinet housing the packages for the programmer circuits and this cabinet is not disclosed in the drawings since it represents a commercially available item. The plugboard is used to enable the code reader to read information from and generate duplicates of either negative or positive type cards. Because of black and white reversal encountered in the duplication process, the binary interpretation of black and white code areas is dependent upon the type of generation of card being scanned. Since the duplication process involves contact printing, cards must be handled emulsion side up. When a generated duplicate (printed emulsion side down) is passed through the duplicator unit, the bits of a column are reversed end for end with respect to the original. As a result, the logic of the programmer must be such as to accommodate the type of card being handled, that is to provide binary one for zero and column end for end reversal of bits.

The phase inverters are located in the base cabinet of the duplicator unit and supply both normal and complementary signals for each of the forty-two bits per column. These signals are passed through the plugboard for switching before reaching the programmer logic. The signals to actuate the code target shutters are also passed through the plugboard for shifting in order that code may be added to either negative or positive type generation cards. The program is supplied with two prewired plugboard inserts one for each generation being handled and the connections for duplicating negative and positive type cards are shown in FIGS. 44, 57A and B, 61 and 65. The plugboard inserts also contain wiring connections which in conjunction with microswitches in the duplicator unit serve as an interlock against using the plugboard insert of the type generation for controlling the other. The generation control setting and the plugboard insert must therefore be the same, that is, either for a positive card or for a negative card.

The Flexowriter input control, see FIG. 67A, serves the dual purpose of control and information sensing, and the operation of the circuits comprising this control constitutes a fixed routine which controls the programmer during input from punched paper tape in the C modes of operation. The punched paper tape via the Flexowriter tape reader is the only means of data input to the programmer other than from the cards per se. These circuits also decode the Flexowriter tape information in order to distinguish between coded information data and Flexowriter machine commands. Character space CS and character fill CF are further translated into the card format, that is, CS becomes all zeros and CF becomes all ones. End of code (EC), Tab and Stop code must each be decoded and presented to the programmer control when they occur. The special characters back space BS, carriage return, CR, code delete CD, and type space TS are completely ignored. The coded information characters are shifted serially, that is, six bits in parallel, into the memory output buffer register (R-register). When a complete word has been shifted into the register, the Tab command which follows the word on the tape causes the programmer control to load the word from the register into the core memory. When all of the file words of a group have been read, the EC command which follows groups of words transfers control to the programmer. The Stop command indicates that all file words have been read. The tape format has been described hereinbefore and is shown in FIGS. 67D and E.

The signal which initiates this routine is labeled Tape and this signal sets univibrator C57 which energizes relay KF2 for 200 ms. The contacts of relay KF2 close the circuit of Flexowriter relay K9 and this relay causes the Flexowriter paper tape reader to start. The operation of the programmer is now determined by the Flexowriter input control, the Flexowriter and the data on the punched paper tape. The Flexowriter reader contacts set relay KA7 through KA12 according to the character code being read from the punched paper tape. If a specific bit position has a hole punched, the corresponding relay is set. On the other hand, if the bit position does not have a hole, the relay is not set. These relays serve to convert the single end input signal from the reader contact to normal and complementary signals which are compatible with the programmer circuits. Selenium diodes 5–10 couple the reader contacts to the Flexowriter translator magnets so that the typer will reproduce the data being read from the punched paper tape. These diodes also serve to isolate the translator from relays KA7–KA12 in order that these relays are not energized during any Flexowriter output. Selenium diodes 11 and 12 are necessary for proper drop-out time of the translator magnets and are used to provide the proper current carrying capabilities.

The normal signals of a character are supplied as the gating signal to pulse gates B19U–B24U and these gating signals are modified only with respect to the characters CS and CF as will be described hereinafter. Both the normal and complementary signals are supplied to the character decoding matrices which convert specific characters as follows: any forbidden characters which are presented to diode gate A20$e$ are inverted to form card characters; card characters which are presented at inverter D23D are combined with CS+CF; CS+CF characters which are presented at cathode follower A22K are combined with card characters and decoded to CS and CF; card characters +CS and +CF which are presented at diode gate A20Z are utilized to enable pulse gate B23$f$; CS is presented at diode gate B25$b$ and inverted to form $\underline{CS}$; $\underline{CS}$ is presented at inverter D23U to convert CS (100000) to all zeros (000000) prior to transfer to the R-register; CF is presented to cathode follower A22Z to convert CF (110000) to all ones (111111) prior to transfer to the R-register; Tab provides diode gating on pulse gate B21$f$ to enable this gate; EC is presented for diode gating on pulse gate B22$f$ to enable this gate; and Stop is presented for diode gating on pulse gate B20$f$ to enable this gate.

The reader cam contact is in continuous operation but is synchronized with the reader action to operate 20 ms. after the reader contacts close and release when the reader contacts release. The reader cam in conjunction with Schmitt trigger A19 and pulse gate B19$f$ generates a signal used for character gating. The gating on pulse gate B19$f$ is (C) and ($\underline{Alarm}$), and the signals from B19$f$ are inhibited in the C modes of operation during alarm type out. The gated character signals are as follows: the card characters +CS and +CF signals are derived from pulse gate B23$f$ to shift the R-register; the Tab signal is derived from pulse gate B21$f$ and transfers the contents of the R-register to the memory; the EC signal is derived from pulse gate B22$f$ and indicates to the programmer the end of a file word group on the punched paper tape; and the Stop signal is derived from pulse gate B20$f$ and indicates to the programmer the end of the punched paper tape (no more file word groups). During the R-register shift operation pulse gate B24$f$ provides the signal for transferring the character being read to the R-register, and this signal is required only during the Flexowriter input and is therefore gated on the C modes of operation. Univibrator B38 and pulse driver B37$e$ delay the EC signal for 200 ms. to prevent the possibility of interaction with the Flexowriter output control circuits in the event of a noncompare alarm in Mode C3.

The Flexowriter output control circuits shown in FIGS. 67B and C provide pulse shaping, synchronization and format generation necessary for data output to the Flexowriter typer and punch. These circuits are utilized in Modes B and D for normal output operations and in Modes B and C for output under certain alarm conditions. Flexowriter carriage return can be accomplished in two ways. It can be caused by a programmed signal or by an automatic signal generated when the Flexowriter carriage reaches the end of a line of typing. Since the automatic signal is inherent in the circuitry of the Flexowriter, only the programmed signal will be described. The conditions under which a programmed carriage return is desired and the circuits associated with the programmer for producing such return are as follows: at the beginning of any type-out, diode gate H60P is set by the initial clear (IC); at the beginning of type-out for each new card set in Mode B3, pulse gate J57 is set by the gating of ZCL and B3; at the beginning of type-out of each card in Modes D1 and D2, pulse gate D10 and diode gate D10 are enabled by (ICL) $(G=0)$ and $(D1+D2)$; and at the beginning of an alarm type-out, pulse driver G58 is gated by TY-AL (type alarm). The signals just described pass through OR gate H60P and set the carriage return CR flip-flop H59. Subsequently, the signals TY-AL (type alarm) and Type (through enabled pulse gate G59) fire thyratron F58Y thereby setting relay KB14. Contact KB14–2 supplies a signal to the Flexowriter translator which, in turn, causes the Flexowriter to carriage return.

All outputs to the Flexowriter are accomplished by actuating the translator which can be accomplished in several ways. The translator has eight input lines, six being for the character bits, one for the parity bit, and the other for the translator clutch. During output, the bit and clutch lines are actuated simultaneously. If the character parity is incorrect, the translator will complete its cycle but no other action will occur. The translator mechanism comprises three cams of which only two are presently used. Translator cam 1 resets relay KB14, KC14 and KD14 as well as thyratron F57Y, F58M and F58Y to prepare these circuits for future type-out. Translator cam 3 in conjunction with Schmitt trigger J58 produces the end of character (EOC) signal.

Relay KD13 is normally energized and is connected to the Flexowriter CRTC contact so as to deenergize during carriage return and tab periods. Relay contact KD13–2 in conjunction with Schmitt trigger J18 produces a program continuing signal. When a Tab is immediately followed by an automatic (not programmed) carriage return, only one program continuing signal is desired. Univibrator J55 and pulse gate J56U provide this feature and operation of these circuits can best be understood with reference to FIG. 67C. The times for Tab and CR operation of the CRTC contacts is dependent on settings of Flexowriter tab and carriage return tabs and the position of the carriage. The time necessary for resetting and immediately setting the CRTC contact is approximately 150 ms. The gating on pulse gat J56U is such as to enable an output signal only when a Tab or carriage return CR is not in progress. The negative signal from J56U resets the carriage return flip-flop H59(CR) and the positive signal is gated on the state of CR. If H59 is set, it initiates the typing of characters and sets the F counter to the zero state. Pulse gate G59$f$ and diode gates I56$h$, H60$j$ and H60$e$ are involved in this control circuit. If H59 is reset, the signal from J56U passes through pulse gate I18$f$ and I59$f$ under normal conditions to signal end of word (EOW).

The sequence of events during the type-out of all but the first characters is to shift the R-register and then energize the Flexowriter translator. The R-register shift signal is inhibited when typing the first character by pulse gate J57. The F counter always contains a count of seven immediately prior to type-out of the first character in the R-register. Any one of three signals can cause a type-out and they are mixed at diode gates H60$j$ and H60$e$. These signals represent a program type signal from pulse gate I59U, the end of a carriage return from pulse gate G59$f$ (derived from a program type signal from pulse gate G59U) and the end of a translator cycle (end of character). The signal from diode gate H60$e$ sets thyratron F58$m$ which sets relay KC14. Relay contact KC14–2 applies plate voltage to the bit thyratrons A2$h$, A2C, A3$h$, A3C, A5$h$, A5C, A6C, and relays KC7–KC13. These relays are then set according to the character code at the thyratron input and transfer this information to the translator magnets. A common contact on all bit relays energizes the translator clutch allowing it to cycle. Relays KC7–KC14 and associated thyratrons are reset during the translator cycle by translator cam 1.

The characters, as stored in the memory, lack the parity bit required for Flexowriter operation. The parity bit for each character is generated by the tag decoder and parity generator circuits while the character is stored in the tag portion of the R-register. The generation of this parity bit occurs just prior to type-out.

There are two characters of the card code which are different from the Flexowriter code. These are the character space CS and the character fill CF, and in the event a CS is to be typed out, the tag decoder circuits supply a signal $(R=CS)$ to diode gate D2$j$ which enables thyratron A2$h$ when the type-out occurs. In this way the card code for CS (000000) is changed to the Flexowriter code for CS (100000). In the event a CF is to be typed out, the tag decoder circuits supply a signal $(R=CF)$ to diode gates A4P, V, $h$ and S which inhibits the firing of the associated thyratrons when the type-out occurs. By this circuitry the card code for CF (111111) is changed to the Flexowriter code for CF (110000).

Translator cam 3 in conjunction with Schmitt trigger circuit J58 produces the end of character (EOC) signal. This signal signifies that the typing of a character is complete. This same signal also serves as an input to the format control circuits. The end of character signal generated after Tab and carriage return CR is not used.

Pulse gates I58$f$ and I58U in conjunction with inputs from the F counter determine the typer format. Pulse gate I58U is enabled for states of the F counter less than six and is disabled for counts of six or seven. A signal through gate I58U steps the counter by one count and also initiates type-out of the next character by setting thyratron F58M. Pulse gate I58$f$ is enabled only for a count of six. A signal through this gate steps the F counter to seven and initiates a Tab by setting thyratron F57Y. As a result, after the seven characters of a word are typed, the carriage is tabbed to insert a standard space between character groups. The F counter is a conventional single-gated binary counter.

A programmed typer Tab is initiated by setting thyratron F57Y and this, in turn, results in energization of relay KD14. Contact KD14–2 energizes the proper translator lines so as to produce a tab. Thyratron F57Y and relay KD14 are reset after the translator cycle is initiated by translator cam 1. The end of word (EOW) signal is generated at the end of a typed word by a signal indicating termination of the tab portion of the output format. This signal is derived from the CRTC signal after suitable gating at pulse gates I59*f* and I18*f*. Gating on Film inhibits the end of word (EOW) signal in the event the supply of film is near depletion. Gating on Alarm inhibits the end of word (EOW) signal during alarm type-out. This gating is required because the end of word (EOW) signal is a program continuing signal. Punched paper tape output can be provided simultaneously with typer output by depressing the punch key on the Fexowriter control panel. This arrangement permits a check to be made and the punched paper tape can be utilized in the Fexowriter for a separate typing out of the words which then can be compared with the type-out derived from the card.

Five programmer functions are monitored and in the event of their malfunction start the alarm sequence. The following conditions start the alarm sequence: more than M cards in the set occurring during Modes B, C2 and C3; less than M cards in the set occurring during Modes B, C2 and C3; DN non-compare during Mode C3; memory error occurring during Modes B and C; and cards not being fed during all modes. The alarm sequence, see FIG. 69, consists of setting the Alarm flip-flop B57; starting the timer for a trailer runout and sounding the buzzer, providing good duplicates were made (L-Register=0); setting the edgemark circuits; turning one of the alarm indicator lights on; typing out the DN if there is an M check error or DN non-compare; resetting the Read flip-flop H14; and resetting the initial clear circuits.

The alarm flip-flop B57 is reset by the initial clear pulse and set by any one of the following alarm conditions: more than M cards in a set; less than M cards in a set; DN non-compare; memory error; and cards not feeding. The state of B57 serves to enable and disable control gates in other sections of the programmer.

During modes B, C2 and C3, the N counter is set to the M number by the tag character in the column of the first card of the set which contains the M number. The first card also supplies the tag word to the programmer which it uses for identifying subsequent cards of the same set, as described above with respect to S compare operation. The conditions that a card be in the read station and that its tag character equals the stored tag character is required to enable pulse gate G12U. This allows the end of scan pulse to pass through gate G12 and reduce the count of the N counter by one. The count down reaches zero when all the cards of the set have been counted. A zero count enable pulse gate A48*f* and A44*f*. At this time, pulse gate G12U should be disabled because the card in the read station has a tag character that belongs to a new set of cards and the count down ceases. If the card has the same tag character, gate G12U is enabled and its output pulse passes through N counter pulse gates A48*f* and A44*f* to initiate the alarm sequence for too many cards.

The operations of loading the N counter and performing the count down for less than M cards are the same as those described above. The differences arise when a tag character non-compare signal from pulse gate I10U interrogates counter pulse gate A53U and finds it enabled because it contains a count other than zero. This pulse continues through OR gate A53V starting the alarm sequence.

If during Mode C3, the S compare circuits fail to make a comparison between tag characters, one on the card and one from the input tape, a non-compare pulse is generated by pulse gate I10U. This pulse passes through gate C12U, relay contacts KC3–12 and –11, and OR gate I17*f* starting the alarm sequence. If no output is detected from the memory after shifting for an interval of 5 ms., as determined by univibrator H10, a memory error alarm condition is started by the output of pulse gate F10*f* in Modes B and C. This pulse continues through OR gate E15*j* starting the alarm sequence. If, after three successive card indexes, no card is detected in the read station, pulse gate C13U is enabled, the output pulse starting the card non-feed alarm sequence. This operation is described in more detail in connection with the C counter hereinbefore.

The invention has been described in detail with particular reference to a preferred embodiment thereof, and it will be understood that various modifications thereof can be effected within the scope of the invention as defined by the appended claims.

Having now particularly described our invention, what we desire to secure by Letters Patent of the United States and what we claim is:

1. In apparatus for selectively providing any one of the hereinafter listed plurality of modes of operation with respect to discrete photographic elements having a code area containing a plurality of columns of coded words and a transverse mask portion, said modes being, (1) at least one duplicate is made of every element, (2) at least one duplicate is made of each element of a set designated by a coded word and a coded word is added to each duplicate for each of the coded words obtained from the set, (3) at least one duplicate is made of each element of a set designated by a coded word and a coded word is added to each duplicate for each of the coded words obtained from the set, the designated coded word being recorded once for each set as it is being duplicated, (4) at least one duplicate is made of each element of a set designated by a coded word and a coded word is added to each duplicate for each coded word obtained from the set, the coded words associated with each set being recorded once for each set as it is being duplicated, (5) at least one duplicate is made of each element with a coded word added thereto which is derived from an external source, (6) at least one duplicate is made of each element of a preselected set for each of the coded words associated with said set and with a coded word added thereto, each coded word being derived from an external source, (7) at least one duplicate is made of each element of a plurality of sets for each of the coded words associated with each of said sets and with a coded word added thereto, each coded word being derived from an external source, (8) all coded words on each element are recorded, (9) only the coded words in a preselected group of columns of each element are recorded, and (10) only a preselected coded word on each element is recorded, the combination comprising a supply station for said elements, a receiving station for said elements, an exposure station arranged between said supply station and said receiving station, a reading station arranged between said supply station and said exposure station, drive means, carrier means selectively and operatively connected to said drive means for intermittent movement with respect to said stations and provided with a plurality of apertures over which said elements are positioned, an aperture being aligned with each of said stations when said carrier is stationary, said carrier means also having an elongated opening adjacent each aperture and spaced therefrom in accordance with the location of the mask portion of said elements, transfer means selectively and operatively connected to said drive means and arranged with respect to said carrier means and said supply and receiving stations for withdrawing said elements individually from said supply station and positioning them on said carrier means and for removing each element from said carrier means, when positioned with respect to said receiving station, and inserting them into said receiving station, a light source aligned with said exposure station, means for advancing equal lengths of a light-sensitive material into said exposure station, means selectively and operatively connected to said drive means for intermittently moving said light-sensitive material advancing means during the interval of movement of said carrier and independently of said carrier means, means for selectively clamping the element moved into said exposure station and said light-sensitive material together during exposure, means for selectively reading said coded words on each element moved into said reading station to derive electrical signals therefrom, recording means for selectively suppliyng electrical signals corresponding to said coded words and selectively responsive to the electrical signals from said reading means for converting said coded words into legible representations, means selectively responsive to said electrical signals derived from said reading means and said recording means for forming and projecting a light pattern of code corresponding to said electrical signals into the elongated opening adjacent the aperture then aligned with said exposure station to expose said pattern on said light-sensitive material simultaneously with the exposure of the element in said exposure station, said mask portion of the element in said exposure station blocking exposure of the area corresponding thereto and exposed together with the preceding element, and means for selecting and rendering operative the predetermined combinations of said carrier means, transfer means, light-sensitive material advancing means, clamping means, reading means, recording means and light patterns forming means, to establish a cycle and sequence of operation for any one of said modes of operation.

2. In apparatus selectively providing any one of the hereinafter listed plurality of modes of operation with respect to discrete photographic elements said modes being, (1) at least one duplicate is made of each element, (2) at least one duplicate is made of each element with the addition of a coded word derived from the element, (3) at least one duplicate is made of each element with the addition of a coded word derived from an external source, and (4) the coded words on each element are read out and recorded in legible form, each of said elements having an image area, a code area containing a plurality of columns of coded words, and a transverse mask portion, the combination comprising a supply station for said elements, a receiving station for said elements, an exposure station arranged between said supply station and said receiving station, a reading station arranged between said supply station and said exposure station, drive means, carrier means selectively and operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of the mask portion of said elements, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means selectively and operatively connected to said drive means for intermittently moving said light-sensitive material advancing means independent of and during the interval of movement of said carrier, means for selectively clamping the element moved into said exposure station and said light-sensitive material together during exposure, means for selectively reading said coded words on each element moved into said reading station to derive electrical signals therefrom, recording means for selectively supplying electrical signals corresponding to coded words on said elements and selectively responsive to said electrical signals from said reading means for converting said coded words into legible representations, means selectively responsive to said electrical signals derived from said reading means and said recording means for forming and projecting a pattern of light corresponding to the code representative of said electrical signals into said elongated opening positioned with respect to said exposure station to expose said pattern on said light-sensitive material simultaneously with the exposure of the element in said exposure station, said mask portion of the element in said exposure station blocking exposure of the area corresponding thereto and exposed with the preceding element, and means for selecting and rendering operative predetermined combinations of said carrier means, transfer means, light-sensitive material advancing means, clamping means, reading means, recording means and light pattern forming means to establish a cycle and sequence of operation for any one of said modes of operation.

3. In apparatus for making a number of duplicates of each of a group of photographic elements in accordance with the number of coded words derived from the first element in said group and by which each duplicate has one of said coded words added thereto, each element having a code field containing at least two columns of coded words, with one of said columns designating in code the number of elements in the group, the number of the element and the last element of the group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for reading the columns of code in said code field of the first card of a group when in said reading station to derive electrical signals representative of each of said coded words, means for storing only said electrical signals derived from the first element of a group and recirculating said electrical signals in accordance with the number of elements in the group and providing successive groups of output signals representative of each of said coded words, means responsive to each group of said output signals for forming and projecting a pattern of light corresponding to a coded word into said elongated opening positioned with respect to said exposure station to expose said pattern on said light-sensitive material in an area corresponding to the sort field of the next length of said light-sensitive material to be exposed in said exposure station and simultaneously with the exposure of the element in said exposure station, said sort field of the element in said exposure station blocking exposure of the area corresponding thereto and previously exposed, means operatively connected to said drive means for initiating a cycle of operation with respect to said light-sensitive material advancing means, said light source, said clamping means, said storing means, and said light pattern forming means for each duplicate to be made of the element positioned in said exposure station, and a programmer means for controlling the sequence of said cycle of operation and releasing said carrier means to advance said elements thereon only after the number of duplicates made of each element positioned in said exposure station corresponds to the number of coded words derived from the first element of the group.

4. In apparatus for making a number of duplicates of each of a group of photographic elements in accordance with the number of coded words derived from the first element in said group and by which each duplicate has one of said coded words added thereto, each element having an open code field containing a plurality of columns of coded words, a fixed code field containing at least two columns of coded words, each coded word including a tag character, with one of said columns designating in code the number of elements in the group, the number of the element and the last element of the group and another of said columns designating a coded word common to the group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for reading the columns of code in said open and fixed field of the first card of a group when in said reading station to derive electrical signals representative of each of said coded words, means for storing only said electrical signals derived from the first element of a group and recirculating said electrical signals in accordance with the number of elements in a group, means responsive to each advancement of said light-sensitive material for deriving a shift command to actuate said storing means for successively releasing groups of output signals representative of a coded word, means responsive to each group of said output signals for forming and projecting a pattern of light corresponding to a coded word into said elongated opening positioned with respect to said exposure station to expose said pattern on said light-sensitive material in an area corresponding to the sort field of the next length of said light-sensitive material to be exposed in said exposure station and simultaneously with the exposure of the element in said exposure station, said sort field of the element in said exposure station blocking exposure of the area corresponding thereto and previously exposed, means operatively connected to said drive means for initiating a cycle of operation with respect to said light-sensitive material advancing means, said light source, said clamping means, said storing means, and said light pattern forming means for each duplicate to be made of the element positioned in said exposure station, and a programmer means for controlling the sequence of said cycle of operation and releasing said carrier means to advance said elements thereon only after the number of duplicates made of each element positioned in said exposure station corresponds to the number of coded words derived from the first element of the group.

5. Apparatus in accordance with claim 4 in which said programmer means includes means adapted to be preset to a predetermined count on entry of each element into said reading station and for counting down upon failure of said carrier means to move an element into said reading station, means responsive to the first count down of said counting means for initiating a predetermined number of indexes of only said carrier means to locate an element, and means responsive to said initiating means, after said predetermined number of indexes, for indicating non-feed of said elements and terminating said cycle of operation.

6. Apparatus in accordance with claim 4 in which said programmer means includes a counter means responsive to signals derived from the code column designating the number of elements in the group, when the first element of the group is in said reading station, for setting said counter to said number, and means responsive to corresponding signals denoting the coded word common to the group, as derived from said storing means and each element moved into said reading station, for enabling said counter means to count down one for each element.

7. Apparatus in accordance with claim 4 in which said programmer means includes a counter means responsive to signals derived from the code column designating the number of elements in the group, when the first element of the group is in said reading station, for setting said counter to said number, means responsive to corresponding signals denoting the coded word common to the group, as derived from said storing means and each element moved into said reading station, for enabling said counter means to count down one for each element, and means responsive to non-corresponding signals, as derived from said storing means and the element in said reading station, for initiating an alarm sequence.

8. Apparatus in accordance with claim 4 in which said programmer means includes means responsive to absence of output signals from said storing means, after a predetermined interval, for initiating an alarm sequence and terminating said cycle of operation.

9. Apparatus in accordance with claim 4 in which said programmer means includes a counter means responsive to signals derived from the code designating the number of elements in a group, when the first element of the group is in said reading station, for setting said counter to said number, means responsive to corresponding signals denoting the coded word common to the group, as derived from said storing means and each element moved into said reading station, for enabling said counter means to count down one for each element, and means responsive to non-corresponding signals, as derived from said storing means and the element in said reading station and with said counter means in a zero state, for rendering said storing means receptive to another group of signals for storage and releasing said carrier means to move the element in said reading station into said exposure station, upon completion of the cycle of operation with respect to the element in said exposure station.

10. In apparatus for making a number of duplicates of each of a group of photographic elements in accordance with the number of coded words derived from the first element in said group and by which each duplicate has one of said coded words added thereto, each element having a code field containing at least two columns of coded words, with one of said columns designating in code the number of elements in the group, the number of the element and the last element of the group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier and for removing each element from said carrier means, when positioned with respect to said receiving station, and inserting them into said receiving station, said transfer means being actuated after each movement of said carrier means and during the interval said carrier is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for reading the columns of code in the code field of the first card of a group, when in said reading station, to derive electrical signals representative of each of said coded words, means for storing and recirculating said electrical signals in accordance with the number of elements in a group, means responsive to each advancement of said light-sensitive material for deriving a shift command to actuate said storing means for successively releasing groups of output signals representative of a coded word, means responsive to each group of said output signals for forming and projecting a pattern of light corresponding to a coded word into said elongated opening positioned with respect to said exposure station to expose said pattern on said light-sensitive material in an area corresponding to the sort field of the next length of said light-sensitive material to be exposed in said exposure station and simultaneously with the exposure of the element in said exposure station, said sort field of the element in said exposure station blocking exposure of the area corresponding thereto and previously exposed, means responsive to said output signals corresponding to said common coded word for recording only once for said group of elements a legible representation of said common coded word, means operatively connected to said drive means for initiating a cycle of operation with respect to said light-sensitive material advancing means, said light source, said clamping means, said storing means, said light pattern forming means for each duplicate to be made of the element positioned in said exposure station, and a programmer means for controlling the sequence of said cycle of operation and releasing said carrier means to advance said elements thereon only after the number of duplicates made of each element positioned in said exposure station corresponds to the number of coded words derived from the first element of the group.

11. In apparatus for making a number of duplicates of each of a group of photographic elements in accordance with the number of coded words derived from the first element in said group and by which each duplicate has one of said coded words added thereto, each element having an open code field containing a plurality of columns of coded words, a fixed code field containing at least two columns of coded words, each column being preceded by a tag character, with one of said columns designating in code the number of elements in the group, the number of the element and the last element of the group and another of said columns designating a coded word common to the group and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for reading the columns of code in said open and fixed field of the first card of a group when in said reading station to derive electrical signals representative of each of said coded words, means for storing and recirculating said electrical signals in accordance with the number of elements in a group, means responsive to each advancement of said light-sensitive material for deriving a shift command to actuate said storing means for successively releasing groups of output signals representative of each coded word, means responsive to each group of said output signals for forming and projecting a pattern of light corresponding to a coded word into said elongated opening positioned with respect to said exposure station to expose said pattern on said light-sensitive material in an area corresponding to the sort field of the next length of said light-sensitive material to be exposed in said exposure station and simultaneously with the exposure of the element in said exposure station, said sort field of the element in said exposure station blocking exposure of the area corresponding thereto and previously exposed, means responsive to said output signals corresponding to the common coded word for recording only once for said group of elements a legible representation of said common coded word, means operatively connected to said drive means for initiating a cycle of operation with respect to said light-sensitive material advancing means, said light source, said clamping means, said storing means, and said light pattern forming means for each duplicate to be made of the element positioned in said exposure station, and a programmer means for controlling the sequence of said cycle of operation and releasing said carrier means to advance said elements thereon only after the number of duplicates made of each element positioned in said exposure station corresponds to the number of coded words derived from the first element of the group.

12. Apparatus in accordance with claim 11 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes, for indicating non-feed of said elements and terminating said cycle of operation.

13. Apparatus in accordance with claim 11 in which said programmer means includes a counter means responsive to signals derived from the code column designating the number of elements in the group, when the first element of the group is in said reading station, for setting said counter to said number, and means responsive to corresponding signals denoting the coded word common to the group, as derived from said storing means and each element moved into said reading station, for enabling said counter means to count down one for each element.

14. Apparatus in accordance with claim 11 in which said programmer means includes a counter means responsive to signals derived from the code column designating the number of elements in the group, when the first element of the group is in said reading station, for setting said counter to said number, means responsive to corresponding signals denoting the coded word common to the group, as derived from said storing means and each element moved into said reading station, for enabling said counter means to count down one for each element, and means responsive to non-corresponding signals, as derived from said storing means and the element in said reading station, for initiating an alarm sequence.

15. Apparatus in accordance with claim 11 in which said programmer means includes means responsive to absence of output signals from said storing means, after a predetermined interval, for initiating an alarm sequence and terminating said cycle of operation.

16. Apparatus in accordance with claim 11 in which said programmer means includes a counter means responsive to signals derived from the code column designating the number of elements in a group, when the first element of the group is in said reading station, for setting said counter to said number, means responsive to corresponding signals denoting the coded word common to the group, as derived from said storing means and each element moved into said reading station, for enabling said counter means to count down one for each element, and means responsive to non-corresponding signals, as derived from said storing means and the element in said reading station and with said counter means in a zero state, for rendering said storing means receptive to another group of signals for storage and releasing said carrier means to move the element in said reading station into said exposure station, upon completion of the cycle of operation with respect to the element in said exposure station.

17. In apparatus for making a number of duplicates of each of a group of photographic elements in accordance with the number of coded words derived from the first element in said group and by which each duplicate has one of said coded words added thereto, each element having a code field containing at least two columns of coded words, with one of said columns designating in code the number of elements in the group, the number of the element and the last element of the group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drvie means and arranged with respect to said carrier means and said supply station and said receiving station for withdrawing said elements individually from said supply station and positioning them on said carrier and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for reading the columns of code in the code field of each element of a group, when in said reading station, to derive electrical signals representative of each of said coded words, means for storing only said electrical signals derived from the first element of a group and recirculating said electrical signals in accordance with the number of elements in the group, means responsive to each advancement of said light-sensitive material for deriving a shift comand to actuate said storing means for successively releasing groups of output signals representative of each coded word, means responsive to each group of said output signals for forming and projecting a pattern of light corresponding to a coded word into said elongated opening positioned with respect to said exposure station to expose said pattern on said light-sensitive material in an area corresponding to the sort field of the next length of said light-sensitive material to be exposed in said exposure station and simultaneously with the exposure of the element in said exposure station, said sort field of the element in said exposure station blocking exposure of the area corresponding thereto and previously exposed, means responsive to said groups of output signals for recording only once for a group of said elements a legible representation of all coded words coresponding thereto, means operatively connected to said drive means for initiating a cycle of operation with respect to said light-sensitive material advancing means, said light source, said clamping means, said storing means, and said light pattern forming means for each duplicate to be made of the element positioned in said exposure station, and a programmer means for controlling the sequence of said cycle of operation and releasing said carrier means to advance said elements thereon only after the number of duplicates made of each element positioned in said exposure station corresponds to the number of coded words derived from the first element of the group.

18. In apparatus for making a number of duplicates of each of a group of photographic elements in accordance with the number of coded words derived from the first element in said group and by which each duplicate has one of said coded words added thereto, each element having an open code field containing a plurality of columns of coded words, a fixed code field containing at least two columns of coded words, with one of said columns designating in code the number of elements in the group, the number of the element and the last element of the group and another of said columns designating a coded word common to said group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality af apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for reading the columns of code in said open and fixed field of each element of a group, when in said reading station, to derive electrical signals representative of each of said coded words, means for storing only said electrical signals derived from the first element of a group and recirculating said electrical signals in accordance with the number of elements in the group, means responsive to a signal derived from said reading means for indexing said storing means, after storage of said electrical signals, to place said electrical signals corresponding to the first stored coded word in an output position, means responsive to each advancement of said light-sensitive material for deriving a shift command to actuate said storing means for successively releasing groups of output signals representative of each coded word, means responsive to each group of said output signals for forming and projecting a pattern of light corresponding to a coded word into said elongated opening positioned with respect to said exposure station to expose said pattern on said light-sensitive material in an area corresponding to the sort field of the next length of said light-sensitive material to be exposed in said exposure station and simultaneously with the exposure of the element in said exposure station, said sort field of the element in said exposure station blocking exposure of the area corresponding thereto and previously exposed, means responsive to said groups of output signals for recording only once for a group of said elements a legible representation of all coded words corresponding thereto, means operatively connected to said drive means for initiating a cycle of operation with respect to said light-sensitive material advancing means, said light source, said clamping means, said storing means, and said light pattern forming means for each duplicate to be made of the element positioned in said exposure station, and a programmer means for controlling the sequence of said cycle of operation and releasing said carrier means to advance said elements thereon only after the number of duplicates made of each element positioned in said exposure station corresponds to the number of coded words derived from the first element of the group.

19. Apparatus in accordance with claim 18 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes for indicating non-feed of said elements, and terminating said cycle of operation.

20. Apparatus in accordance with claim 18 in which said programmer means includes a counter means responsive to signals derived from the code column designating the number of elements in the group, when the first element of the group is in said reading station, for setting said counter to said number, and means responsive to corresponding signals denoting the coded word common to the group, as derived from said storing means and each element moved into said reading station, for enabling said counter means to count down one for each element.

21. Apparatus in accordance with claim 18 in which said programmer means includes a counter means responsive to signals derived from the code column designating the number of elements in the group, when the first element of the group is in said reading station, for setting said counter to said number, means responsive to corresponding signals denoting the coded word common to the group, as derived from said storing means and each element moved into said reading station, for enabling said counter means to count down one for each element, and means responsive to non-corresponding signals, as derived from said storing means and the element in said reading station, for initiating an alarm sequence.

22. Apparatus in accordance with claim 18 in which said programmer means includes means responsive to absence of output signals from said storing means, after a predetermined interval, for initiating an alarm sequence and terminating said cycle of operation.

23. Apparatus in accordance with claim 18 in which said programmer means includes a counter means responsive to signals derived from the code column designating the number of elements in a group, when the first element of the group is in said reading station, for setting said counter to said number, means responsive to corresponding signals denoting the coded word common to the group, as derived from said storing means and each element moved into said reading station, for enabling said counter means to count down one for each element, and means responsive to non-corresponding signals, as derived from said storing means and the element in said reading station and with said counter means in a zero state, for clearing said storing means to receive another group of signals and releasing said carrier means to move the element in said reading station into said exposure station, upon completion of the cycle of operation with respect to the element in said exposure station.

24. In apparatus for making a number of duplicates of each of a group of photographic elements in accordance with a number of stored coded words and by which each duplicate has one of said coded words added thereto, each element having a code field containing at least two columns of coded words, at least one of said columns including a tag character, and a sort field, the combination comprising a supply station for said elements, a receiving station for said element, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for suplying successive groups of electrical signals preceded by a start signal, each group of said signals being representative of a coded character, the end of each coded word being designated by one predetermined group of signals, and the end of the group of coded words being designated by a second predetermined group of signals, means responsive to said start signal for storing said groups of electrical signals, means responsive to said one predetermined group of signals for initiating said light-sensitive material advancing means and for releasing successive groups of output signals from said storing means, each group of output signals being representative of one of said coded words, means responsive to each group of said output signals for forming and projecting a pattern of light corresponding to said coded word into said elongated opening positioned with respect to said exposure station to expose said pattern on said light-sensitive material in an area corresponding to the sort field and simultaneously with the exposure of the element in said exposure station, said sort field of the element in said exposure station blocking exposure of the area corresponding thereto and previously exposed, means responsive to said second predetermined group of signals for determining the presence of an element in said reading station and, upon presence of an element, rendering said carrier means operative to move the element into said exposure station, means operatively connected to said drive means and responsive to said determining means and movement of an element into said exposure station for initiating a cycle of operation with respect to said light-sensitive material advancing means, said light source, said clamping means, said storing means and said light pattern forming means for each duplicate to be made of the element positioned in said exposure station, and a programmer means for controlling the sequence of said cycle of operation and releasing said carrier means to advance said elements thereon only after the number of duplicates made of the element in said exposure station corresponds to the number of coded words derived from said signal supplying means.

25. In apparatus for making a number of duplicates of each of a group of photographic elements in accordance with a number of stored coded words and by which each duplicate has one of said coded words added thereto, each element having an open code field containing a plurality of columns of coded words, a fixed code field containing at least two columns of coded words, each coded word including a tag character, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture said sort field, transfer means operatively connected and spaced therefrom in accordance with the location of to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, input means for supplying successive groups of electrical signals, each group of signals being representative of a coded character, each coded word being preceded by one predetermined group of signals and the end of the group of coded words being designated by a second predetermined group of signals, means for storing said coded words in the order received, an output register operatively connected to said input means and said storing means for receiving the successive groups of electrical signals comprising a coded word, responsive to each one predetermined group of signals for transferring each coded word to said storing means, and responsive to said second predetermined group of signals for indexing said storing means to position the first stored coded word in said output register, means responsive to each advancement of said light-sensitive material for releasing the coded word in said output register to provide a group of output signals corresponding thereto, for re-entering said group of output signal into said storing means and for shifting said storing means to position the succeeding stored coded word in said output register, means responsive to each group of output signals for forming and projecting a pattern of light corresponding to said coded word into said elongated opening positioned with respect to said exposure station to expose said pattern on said light-sensitive material in an area corresponding to the sort field and simultaneously with the exposure of the element in said exposure station, said sort field of the element in said exposure station blocking exposure of the area corresponding thereto and previously exposed, means responsive to the output signals corresponding to a predetermined tag character for scanning said reading station to determine the presence of an element therein and, upon presence of an element, rendering said carrier means operative to move the element into said exposure station, means operatively connected to said drive means and responsive to said scanning means and movement of an element into said exposure station for initiating a cycle of operation with respect to said light-sensitive material advancing means, said light source, said clamping means, said storing means and said light pattern forming means for each duplicate to be made of the element positioned in said exposure station, and a programmer means for controlling the sequence of said cycle of operation and releasing said carrier means to advance said elements thereon only after the number of duplicates made of the element in said exposure station corresponds to the number of coded words derived from said signal supplying means.

26. Apparatus in accordance with claim 24 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes for indicating non-feed of said elements and terminating said cycle of operation.

27. Apparatus in accordance with claim 24 in which said programmer means includes means responsive to absence of output signals from said storing means, after a predetermined interval, for initiating an alarm sequence and terminating said cycle of operation.

28. In apparatus for making a number of duplicates of each of a selected group of photographic elements in accordance with the number of coded words associated with said selected group and by which each duplicate has one of said coded words added thereto, each element having a code field containing at least two columns of coded words each coded word including a tag character and one of the coded words identifying the elements of the group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for supplying successive groups of electrical signals representative of each of the coded words to be added to the duplicates, including the identifying coded word and an end of code signal, means for storing and recirculating said groups of signals and responsive to each advancement of said light-sensitive material for providing successive groups of output signals, each group of output signals being representative of one of said coded words, means arranged with respect to said reading station for reading the columns of coded words on each element positioned in relation thereto, means for comparing the identifying coded word on the element in said reading station with the stored identifying coded word and upon an equal compare and movement of the element into said exposure station rendering said carrier inoperative and indexing said signal storing means to position the first coded word in an output position, means responsive to each group of said output signals for forming and projecting a pattern of light corresponding to a coded word into said elongated opening positioned with respect to said exposure station to expose said pattern on said light-sensitive material in an area corresponding to the sort field of the next length of light-sensitive material to be exposed in said exposure station and simultaneously with the exposure of the element in said exposure station, said sort field of the element in said exposure station blocking exposure of the area corresponding thereto and previously exposed, means operatively connected to said drive means for initiating a cycle of operation with respect to said light-sensitive material advancing means, said light source, said clamping means, said signal storing means and said light pattern forming means for each duplicate to be made of the element positioned in said exposure station, and a programmer means for controlling the sequence of said cycle of operation and responsive to said end of code signal for releasing said carrier means to advance the next element of said group into said exposure station only when the identifying coded word of the element in said reading station compares equally with the stored identifying coded word and, upon a non-compare, moving the element in said reading station into said exposure station and rendering said signal storing means receptive to another group of coded words from said signal supplying means.

29. In apparatus for making a number of duplicates of each photographic element of a selected group for each of the coded words associated with said selected group and by which each duplicate has one of said coded words added thereto, each element having an open code field containing a plurality of columns of coded words, a fixed code field containing at least two columns of coded words with at least the coded words of the fixed field including a tag character, one of the coded words in the fixed field identifying the elements of the set and another coded word denoting the number of elements in the set, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, input means for supplying successive groups of electrical signals, each group of signals being representative of a coded character, each coded word being preceded by one predetermined group of signals and the end of the group of coded words being designated by a second predetermined group of signals, means for storing said coded words in the order received, an output register operatively connected to said input means and said storing means for receiving the successive groups of electrical signals comprising a coded word, responsive to each one predetermined group of signals for transferring each coded word to said storing means, and responsive to said second predetermined group of signals for indexing said storing means to position the first stored coded word in said output register, means responsive to each advancement of said light-sensitive material for releasing the coded word in said output register to provide a group of output signals corresponding thereto, for reentering said group of output signal into said storing means and for shifting said storing means to position the succeeding stored coded word in said output register, means arranged with respect to said reading station for reading the columns of coded words on each element positioned in relation thereto, means for comparing the identifying coded word on each element moved into said reading station with the stored identifying coded word and upon an equal compare and movement of the element into said exposure station rendering said carrier means inoperative, means responsive to each group of said output signals derived from said output register for forming and projecting a pattern of light corresponding to a coded word into said elongated opening positioned with respect to said exposure station to expose said pattern on said light-sensitive material in an area corresponding to the sort field of the next length of light-sensitive material to be exposed in said exposure station and simultaneously with the exposure of the element in said exposure station, said sort field of the element in said exposure station blocking exposure of the area corresponding thereto and previously exposed, means operatively connected to said drive means for initiating a cycle of operation with respect to said light-sensitive material advancing means, said light source, said clamping means, said signal storing means and said light pattern forming means for each duplicate to be made of the element positioned in said exposure station, and a programmer means for controlling the sequence of said cycle of operation and responsive to the stored second predetermined group of signals for releasing said carrier means to advance the next element of said group into said exposure station and for indexing said storing means to position the first stored coded word in said output register so long as the identifying coded word of the element in said reading station compares equally with the stored identifying coded word and, upon a non-compare, moving the element in said reading station into said exposure station and rendering said storing means receptive to another group of coded words.

30. Apparatus in accordance with claim 29 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes for indicating non-feed of said elements and terminating said cycle of operation.

31. Apparatus in accordance with claim 29 in which said programmer means includes a counter means responsive to signals derived from the coded word designating the number of elements in the group, when the first element of the group is in said reading station, for setting said counter to said number, and means responsive to corresponding signals denoting the identifying coded word, as derived from said storing means and each element moved into said reading station, for enabling said counter means to count down one for each element and for rendering said carrier means operative to move the element in said reading station into said exposure station.

32. Apparatus in accordance with claim 29 in which said programmer means includes a counter means responsive to signals derived from the coded word designating the number of elements in the group, when the first element of the group is in said reading station, for setting said counter to said number, means responsive to corresponding signals denoting the identifying coded word, as derived from said storing means and each element moved into said reading station, for enabling said counter means to count down one for each element, and means responsive to non-corresponding signals, as derived from said storing means and the element in said reading station, for initiating an alarm sequence.

33. Apparatus in accordance with claim 29 in which said programmer means includes means responsive to absence of output signals from said storing means, after a predetermined interval, for initiating an alarm sequence and terminating said cycle of operation.

34. Apparatus in accordance with claim 29 in which said programmer means includes a counter means responsive to signals derived from the coded word designating the number of elements in a group, when the first element of the group is in said reading station, for setting said counter to said number, means responsive to corresponding signals denoting the identifying coded word, as derived from said storing means and each element moved into said reading station, for enabling said counter means to count down one for each element, and means responsive to non-corresponding signals, as derived from said storing means and the element in said reading station and with said counter means in a zero state, for clearing said storing means to receive another group of signals and releasing said carrier means to move the element in said reading station into said exposure station, upon completion of the cycle of operation with respect to the element in said exposure station.

35. Apparatus in accordance with claim 29 in which said programmer means includes a counter means responsive to signals derived from the coded word designating the number of elements in a group, when the first element of the group is in said reading station, for setting said counter to said number, means responsive to corresponding signals denoting the identifying coded word, as derived from said storing means and each element moved into said reading station, for enabling said counter means to count down one for each element, means responsive to non-corresponding signals, as derived from said storing means and the element in said reading station and with said counter means in a zero state, for rendering said storing means receptive to another group of signals associated with another group of elements upon completion of the cycle of operation with respect to the element in said exposure station, and means responsive to the last of said another group of signals entered into said storing means for releasing said carrier means to move elements successively into and out of said reading station until said reading means and said comparing means establishes an equal compare between the newly stored identifying coded word and the identifying coded word of the first element of another group of elements.

36. In apparatus for making a number of duplicates of each photographic element in a plurality of groups of elements in accordance with a number of coded words associated with each group and by which each duplicate of an element in a group has one of said coded words added thereto, each element having a code field containing at least two columns of coded words with one of the coded words including a tag character and another of the coded words identifying the elements of the group, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, means for supplying successive groups of electrical signals representative of the coded words to be added to the duplicates and an end of code signal for each group of elements, means for storing and recirculating said groups of signals associated with each group of elements until a duplicate has been made of each element in the group for each of the stored coded words and responsive to each advancement of said light-sensitive material for providing successive groups of output signals, each group of output signals being representative of a stored coded word, means arranged with respect to said reading station for reading the columns of coded words on each element positioned in relation thereto, means for comparing the identifying coded word on each element moved into said reading station with the stored identifying coded word and upon an equal compare and movement of the element into said exposure station rendering said carrier means inoperative and indexing said signal storing means to position the first coded word in an output position, means responsive to each group of said output signals for forming and projecting a pattern of light corresponding to a coded word into said elongated opening positioned with respect to said exposure station to expose said pattern on said light-sensitive material in an area corresponding to the sort field of the next length of light-sensitive material to be exposed in said exposure station and simultaneously with the exposure of the element in said exposure station, said sort field of the element in said exposure station blocking exposure of the area corresponding thereto and previously exposed, means operatively connected to said drive means for initiating a cycle of operation with respect to said light-sensitive material advancing means, said light source, said clamping means, said signal storing means and said light pattern forming means for each duplicate to be made of the element positioned in said exposure station, and a programmer means for controlling the sequence of said cycle of operation and responsive to the output signals corresponding to the identifying coded word for releasing said carrier means to advance the next element of a group into said exposure station and for recirculating said stored signals so long as the identifying coded word of the element in said reading station compares equally with the stored identifying coded word and, upon a non-compare for clearing and rendering said signal storing means receptive to storing of the coded words delivered thereto by said signal supplying means and associated with the next group of elements.

37. In apparatus for making a number of duplicates of each photographic element in a plurality of groups of elements in accordance with a number of coded words associated with each group and by which each duplicate of an element in a group has one of said coded words added thereto, each element having an open code field containing a plurality of columns of coded words, a fixed code field containing at least two columns of coded words with at least the coded words of the fixed field including a tag character and one of the coded words in the fixed field identifying the elements of the set, and a sort field, the combination comprising a supply station for said elements, a receiving station for said elements, an exposure station arranged between said supply station and said receiving station, a reading station arranged between said supply station and said exposure station, drive means, carrier means operatively connected to said drive means for intermittent movement with respect to said stations and provided with a plurality of apertures over which said elements are positioned, an aperture being aligned with each of said stations when said carrier means is stationary, said carrier means also having an elongated opening adjacent each aperture and spaced therefrom in accordance with the location of said sort field, transfer means operatively connected to said drive means and arranged with respect to said carrier means and said supply station and said receiving station for withdrawing said elements individually from said supply station and positioning them on said carrier means and for removing each element from said carrier means, when positioned with respect to said receiving station, and inserting them into said receiving station, said transfer means being actuated after each movement of said carrier means and during the interval said carrier means is stationary, a light source aligned with said exposure station, means for advancing equal lengths of a light-sensitive material into said exposure station, means operatively connected to said drive means for intermittently moving said light-sensitive material advancing means independent of and during the interval of movement of said carrier means, means for clamping the element moved into said exposure station and said light-sensitive material together during exposure, input means for supplying successive groups of electrical signals associated with each group of said elements, each group of signals being representative of a coded character, each coded word being preceded by one predetermined group of signals and the end of the group of coded words for a group of elements being designated by a second predetermined group of signals, means for storing said coded words associated with a group of said elements in the order received, an output register operatively connected to said input means and said storing means for receiving the successive groups of electrical signals comprising a coded word, responsive to each one predetermined group of signals for transferring each coded word to said storing means, and responsive to said second predetermined group of signals for indexing said storing means to position the first stored coded word in said output register, means responsive to each advancement of said light-sensitive material for releasing the coded word in said output register to provide a group of output signals corresponding thereto, for reentering said group of output signals into said storing means and for shifting said storing means to position the succeeding stored coded word in said output register, means arranged with respect to said reading station for reading the columns of coded words on each element positioned in relation thereto, means for comparing the identifying coded word on each element moved into said reading station with the stored coded word and upon an equal compare and movement of the element into said exposure station rendering said carrier inoperative, means responsive to each group of said output signals for forming and projecting a pattern of light corresponding to a coded word into said elongated opening positioned with respect to said exposure station to expose said pattern on said light-sensitive material in an area corresponding to the sort field of the next length of light-sensitive material to be exposed in said exposure station and simultaneously with the exposure of the element in said exposure station, said sort field of the element in said exposure station blocking exposure of the area corresponding thereto and previously exposed, means operatively connected to said drive means for initiating a cycle of operation with respect to said light-sensitive material advancing means, said light source, said clamping means, said signal storing means and said light pattern forming means for each duplicate to be made of the element positioned in said exposure station, and a programmer means for controlling the sequence of said cycle of operation and responsive to the output signals corresponding to the identifying coded word for releasing said carrier means to advance the next element of a group into said exposure station and for indexing said storing means to position the first stored coded word in said output register so long as the identifying coded word of the element in said reading station compares equally with the stored identifying coded file word and, upon a non-compare, rendering said storing means receptive to another group of coded words for comparing the identifying coded word thereof with that of the element in said reading station.

38. Apparatus in accordance with claim 37 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes for indicating non-feed of said elements and terminating said cycle of operation.

39. Apparatus in accordance with claim 37 in which said programmer means includes a counter means responsive to signals derived from the coded word designating the number of elements in the group, when the first element of the group is in said reading station, for setting said counter to said number, and means responsive to corresponding signals denoting identifying coded word, as derived from said storing means and each element moved into said reading station, for enabling said counter means to count down one for each element and for rendering said carrier means operative to move the element in said reading station into said exposure station.

40. Apparatus in accordance with claim 37 in which said programmer means includes a counter means responsive to signals derived from the coded word designating the number of elements in the group, when the first element of the group is in said reading station, for setting said counter to said number, means responsive to corresponding signals denoting the identifying coded word, as derived from said storing means and each element moved into said reading station, for enabling said counter means to count down one for each element, and means responsive to non-corresponding signals, as derived from said storing means and the element in said reading station, for initiating an alarm sequence.

41. Apparatus in accordance with claim 37 in which said programmer means includes means responsive to absence of output signals from said storing means, after a predetermined interval, for initiating an alarm sequence and terminating said cycle of operation.

42. Apparatus in accordance with claim 37 in which said programmer means includes a counter means responsive to signals derived from the coded word designating the number of elements in a group, when the first element of the group is in said reading station, for setting said counter to said number, means responsive to corresponding signals denoting the identifying coded word, as derived from said storing means and each element moved into said reading station, for enabling said counter means to count down one for each element, and means responsive to non-corresponding signals, as derived from said storing means and the element in said reading station and with said counter means in a zero state, for clearing said storing means to receive another group of signals for storage and releasing said carrier means to move the element in said reading station into said exposure station, upon completion of the cycle of operation with respect to the element in said exposure station.

43. Apparatus in accordance with claim 37 in which said programmer means includes means responsive to a third predetermined group of signals as derived from said input means for rendering said input means inoperative.

44. In apparatus for manipulating and transporting discrete photographic elements, each element having a code field containing a plurality of columns of coded words, the combination comprising a supply station for said elements, a receiving station for said elements, a reading station arranged between said supply station and said receiving station, drive means, carrier means operatively connected to said drive means for intermittent movement with respect to said stations and provided with a plurality of apertures over which said elements are positioned, an aperture being aligned with each of said stations when said carrier means is stationary, transfer means operatively connected to said drive means and arranged with respect to said carrier means and said supply station and said receiving station for withdrawing said elements individually from said supply station and positioning them on said carrier with respect to said apertures and for removing each element from said carrier means, when positioned with respect to said receiving station, and inserting them into said receiving station, said transfer means being actuated after each movement of said carrier means and during the interval said carrier means is stationary, means for reading said coded words on each element moved into said reading station to derive groups of electrical signals representative of each coded word, means responsive to said reading means for storing the groups of electrical signals and for providing a group of output signals representative of each character in each stored coded word, recording means responsive to each group of output signals for converting said output signals into legible representations of each character in the coded word on said elements, and means responsive to the last group of output signals read out of said storing means for rendering said carrier means operative to move the succeeding element into said reading station.

45. In apparatus for manipulating and transporting discrete photographic elements, each element having an open code field containing a plurality of columns of coded words and a fixed code field containing at least two columns of coded words, and in which at least the coded words in the fixed code field include a tag character, the combination comprising a supply station for said elements, a receiving station for said elements, a reading station arranged between said supply station and said receiving station, drive means, carrier means operatively connected to said drive means for intermittent movement with respect to said stations and provided with a plurality of apertures over which said elements are positioned, an aperture being aligned with each of said stations when said carrier means is stationary, transfer means operatively connected to said drive means and arranged with respect to said carrier means and said supply station and said receiving station for withdrawing said elements individually from said supply station and positioning them on said carrier with respect to said apertures and for removing each element from said carrier means, when positioned with respect to said receiving station, and inserting them into said receiving station, said transfer means being actuated after each movement of said carrier means and during the interval said carrier means is stationary, means for reading said coded words on each element moved into said reading station to derive groups of electrical signals representative of each coded word, means responsive to said reading means for storing the groups of electrical signals and for providing a group of output signals representative of each character in each stored coded word, a recording means responsive to each group of output signals for converting said output signals into legible representations of each character in the coded word on said elements, means operatively connected to said drive means for initiating a cycle of operation with respect to said carrier means, said transfer means, said reading means, said storing means and said recording means, and a programmer means for controlling said cycle of operation and responsive to each last group of output signals released by said storing means for rendering said carrier means operative to move the succeeding element into said reading station and initiating another cycle of operation.

46. Apparatus in accordance with claim 45 in which said programmer means includes a counter means responsive to said groups of electrical signals and having at least two stages, each stage establishing a boundary condition and being set by the group of electrical signals following the last coded word capable of being entered into said storing means, and means responsive to the last group of output signals read out of said storing means for initiating another reading of the element in said reading station to store another group of coded words commencing with the one creating the boundary condition, upon inspection and determination that one of said stages has been set.

47. Apparatus in accordance with claim 45 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes for indicating non-feed of said elements, and terminating said cycle of operation.

48. In apparatus for manipulating and transporting discrete photographic elements, each element having an open code field containing a plurality of columns of coded words, a fixed code field containing at least two columns of coded words, and a sort field and in which at least the coded words in the fixed code field include a tag character, the combination comprising a supply station for said elements, a receiving station for said elements, a reading station arranged between said supply station and said receiving station, drive means, carrier means operatively connected to said drive means for intermittent movement with respect to said stations and provided with a plurality of apertures over which said elements are positioned, an aperture being aligned with each of said stations when said carrier means is stationary, transfer means operatively connected to said drive means and arranged with respect to said carrier means and said supply station and said receiving station for withdrawing said elements individually from said supply station and positioning them on said carrier means with respect to said apertures and for removing each element from said carrier means, when positioned with respect to said receiving station, and inserting them into said receiving station, said transfer means being actuated after each movement of said carrier means and during the interval said carrier means is stationary, means for reading said coded words on each element moved into said reading station to derive electrical signals representative of only the coded words of said fixed field, means responsive to said reading means for storing the groups of electrical signals and for providing successive groups of output signals representative of each character in each stored coded word, recording means responsive to each group of output signals for converting said output signals into legible representations of each character in each coded word in the fixed field, and means responsive to the last group of output signals read out of said storing means for rendering said carrier means operative to move the succeeding element into said reading station.

49. In apparatus for manipulating and transporting discrete photographic elements, each element having an open code field containing a plurality of columns of coded words, a fixed code field containing at least two columns of coded words, and a sort field and in which at least the coded words in the fixed code field include a tag character, the combination comprising a supply station for said elements, a receiving station for said elements, a reading station arranged between said supply station and said receiving station, drive means, carrier means operatively connected to said drive means for intermittent movement with respect to said stations and provided with a plurality of apertures over which said elements said stations when said carrier means is stationary, transfer are positioned, an aperture being aligned with each of means operatively connected to said drive means and arranged with respect to said carrier means and said supply station and said receiving station for withdrawing said elements individually from said supply station and positioning them on said carrier means with respect to said apertures and for removing each element from said carrier means, when positioned with respect to said receiving station, and inserting them into said receiving station, said transfer means being actuated after each movement of said carrier means and during the interval said carrier means is stationary, means for reading said coded words on each element moved into said reading station to derive electrical signals representative of only the coded words of said fixed field, means responsive to said reading means for storing the groups of electrical signals and for providing successive groups of output signals representative of each character in each stored coded word, recording means responsive to each group of output signals for converting said output signals into legible representations of the fixed field coded words character by character, means operatively connected to said drive means for initiating a cycle of operation with respect to said carrier means, said transfer means, said reading means, said storing means, and said recording means, and a programmer means for controlling said cycle of operation and responsive to each last group of output signals released by said storing means for rendering said carrier means operative to move the succeeding element into said reading station and initiating another cycle of operation.

50. Apparatus in accordance with claim 49, in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes, for indicating non-feed of said elements and terminating said cycle of operation.

51. In apparatus for manipulating and transporting discrete photographic elements, each element having a code field containing a plurality of columns of coded words, one of which is an identifying coded word, and a sort field, the combination comprising a supply station for said elements, a receiving station for said elements, a reading station arranged between said supply station and said receiving station, drive means, carrier means operatively connected to said drive means for intermittent movement with respect to said stations and provided with a plurality of apertures over which said elements are positioned, an aperture being aligned with each of said stations when said carrier means is stationary, transfer means operatively connected to said drive means and arranged with respect to said carrier means and said supply station and said receiving station for withdrawing said elements individually from said supply station and positioning them on said carrier means with respect to said apertures and for removing each element from said carrier means, when positioned with respect to said receiving station, and inserting them into said receiving station, said transfer means being actuated after each movement of said carrier means and during the interval said carrier means is stationary, means for reading said coded words on each element moved into said reading station and deriving a group of electrical signals representative of only said identifying coded word associated with each element, means responsive to said reading means for storing the group of electrical signals and for providing successive groups of output signals representative of each character in the stored identifying coded word, recording means responsive to each group of output signals for converting said output signals into legible representations of the identifying coded word character by character, and means responsive to the last group of output signals read out of said storing means for rendering said carrier means operative to move the succeeding element into said reading station.

52. In apparatus for manipulating and transporting discrete photographic elements, each element having a code field containing a plurality of columns of coded words, one of which is an identifying coded word, and a sort field, the combination comprising a supply station for said elements, a receiving station for said elements, a reading station arranged between said supply station and said receiving station, drive means, carrier means operatively connected to said drive means for intermittent movement with respect to said stations and provided with a plurality of apertures over which said elements are positioned, an aperture being aligned with each of said stations when said carrier means is stationary, transfer means operatively connected to said drive means and arranged with respect to said carrier means and said supply station and said receiving station for withdrawing said elements individually from said supply station and positioning them on said carrier with respect to said apertures and for removing each element from said carrier means, when positioned with respect to said receiving station, and inserting them into said receiving station, said transfer means being actuated after each movement of said carrier means and during the interval said carrier means is stationary, means for reading said coded words on each element moved into said reading station and deriving a group of electrical signals representative of only said identifying coded word associated with each element, means responsive to said reading means for storing the group of electrical signals and for providing successive groups of output signals representative of each character in the stored identifying coded word, recording means responsive to each group of output signals for converting said output signals into legible representations of the identifying coded word character by character, means operatively connected to said drive means for initiating a cycle of operation with respect to said carrier means, said transfer means, said reading means, said storing means and said recording means, and a programmer means for controlling said cycle of operation and responsive to each last group of output signals released by said storing means for rendering said carrier means operative to move the succeeding element into said reading station and initiating another cycle of operation.

53. Apparatus in accordance with claim 52 in which said programmer means includes means adapted to be preset to a predetermined count on entry of an element into said reading station and for counting down upon failure of said carrier means to move an element into said reading station, means responsive to the first count down of said counting means for initiating a predetermined number of indexes of only said carrier to locate an element, and means responsive to said initiating means, after said predetermined number of indexes for indicating non-feed of said elements, and terminating said cycle of operation.

References Cited in the file of this patent

UNITED STATES PATENTS

| | | |
|---|---|---|
| 1,092,545 | Snapp | Apr. 7, 1914 |
| 1,958,727 | Sullivan | May 15, 1934 |
| 2,019,929 | Pupke | Nov. 5, 1935 |
| 2,124,906 | Bryce | July 26, 1938 |
| 2,172,330 | Bryce | Sept. 5, 1939 |
| 2,364,188 | Bryce | Dec. 5, 1944 |
| 2,377,754 | Bryce | June 5, 1945 |
| 2,493,858 | Carroll | Jan. 10, 1950 |
| 2,654,300 | Baker | Oct. 6, 1953 |
| 2,697,649 | Roth | Dec. 21, 1954 |
| 2,880,932 | Davis | Apr. 7, 1959 |
| 2,902,213 | Hamilton | Sept. 1, 1959 |
| 2,923,469 | Woodbury | Feb. 2, 1960 |

UNITED STATES PATENT OFFICE

CERTIFICATE OF CORRECTION

Patent No. 3,099,199 July 30, 1963

William Bornemann et al.

It is hereby certified that error appears in the above numbered patent requiring correction and that the said Letters Patent should read as corrected below.

Column 51, line 9, for "suppliyng" read -- supplying --; line 27, for "patterns" read -- pattern --; column 58, line 15, for "drvie" read -- drive --; line 53, for "legigible" read -- legible --; column 59, line 11, for "af" read -- of --; column 62, line 1, strike out "said sort field, transfer means operatively connected" and insert the same after "location of" in line 2, same column 62; column 72, line 10, strike out "said stations when said carrier means is stationary, transfer" and insert the same after "each of" in line 11, same column 72.

Signed and sealed this 25th day of February 1964.

(SEAL)
Attest:

ERNEST W. SWIDER
Attesting Officer

EDWIN L. REYNOLDS
Acting Commissioner of Patents